United States Patent [19]
Bain et al.

[11] Patent Number: 5,315,508
[45] Date of Patent: May 24, 1994

[54] LABEL GENERATING AND DATA TRACKING SYSTEM FOR PROCESSING PURCHASE ORDERS

[75] Inventors: James M. Bain, Beavercreek; David J. Best, Miamisburg; James G. Markham, Spring Valley; Mark S. Morrow; Debra A. Stellwag, both of Dayton; Raymond D. Tavener, Kettering, all of Ohio

[73] Assignee: Monarch Marking System, Dayton, Ohio

[21] Appl. No.: 940,383

[22] Filed: Sep. 3, 1992

[51] Int. Cl.[5] .............................................. G06F 15/22
[52] U.S. Cl. ..................................... 364/401; 364/400
[58] Field of Search ................................ 364/400, 401

[56] References Cited
U.S. PATENT DOCUMENTS 4,839,813  6/1989  Hills et al. ........................... 364/401
5,038,283  8/1991  Caveney ............................. 364/401

OTHER PUBLICATIONS

Microsoft Windows 3.0, User's Guide, 1985, pp. 15-53 & 195-211.

Primary Examiner—Roy N. Envall, Jr.
Assistant Examiner—Ari M. Bai
Attorney, Agent, or Firm—McAndrews, Held & Malloy, Ltd.

[57] ABSTRACT

A purchase order processing system allows purchase orders issued from a number of consignees each requiring different processing operations to be processed simply and in an error free manner. The system prompts a user for only that information required by a selected consignee to process a purchase order issued thereby. In processing a purchase order, the system verifies packing information against stored purchase order data. The system automatically generates shipping labels and advance shipping notices in compliance with the diverse requirements of the various consignees. In order to process purchase orders from different consignees, the system of the present invention utilizes nonconsignee specific software that operates in accordance with consignee specific data files that define the purchase order processing requirements of a consignee.

27 Claims, 54 Drawing Sheets

FIG-7

*Other Customers Pack and Record Screen*

| | |
|---|---|
| Purchase Order #: | Item #: |
| PO Date: | Qty Ordered: / Units: |
| Delivery Date: | Qty To Pack: |
| Type: | Qty Packed: / Units: |
| Dept: | Tracer #: |
| Ship To: | Container Code: BAG75 |
| Customer Name: | Carrier: UPS |
| Store #: | Ship Date: |
| Address: | Serial #: 000000015 |
| City: | Weight: / Units: LB |
| State: | User1: |
| ZIP Code: | User2: |
| Function Keys: | Hub Collect: |
| | Ship Charge: / Charge: |
| Enter - Pack Line Item | COD: / Amount: |
| F6 - Close Box/Print Label | Call Tag: |
| F12 - Close PO | Declared Value: |
| | Operator: |

FIG-8

*Label Printing Screen*

Ship To:

| | |
|---|---|
| Customer Name: | PO: |
| Store #: | Dept: |
| Address: | Order Type: |
| City: | Carrier: UPS |
| State: | Qty To Print: |
| ZIP Code: | User1: |
| Function Keys: | User2: |
| F6 - Print Compliance Label | |
| ESC - Return To CatMan | |

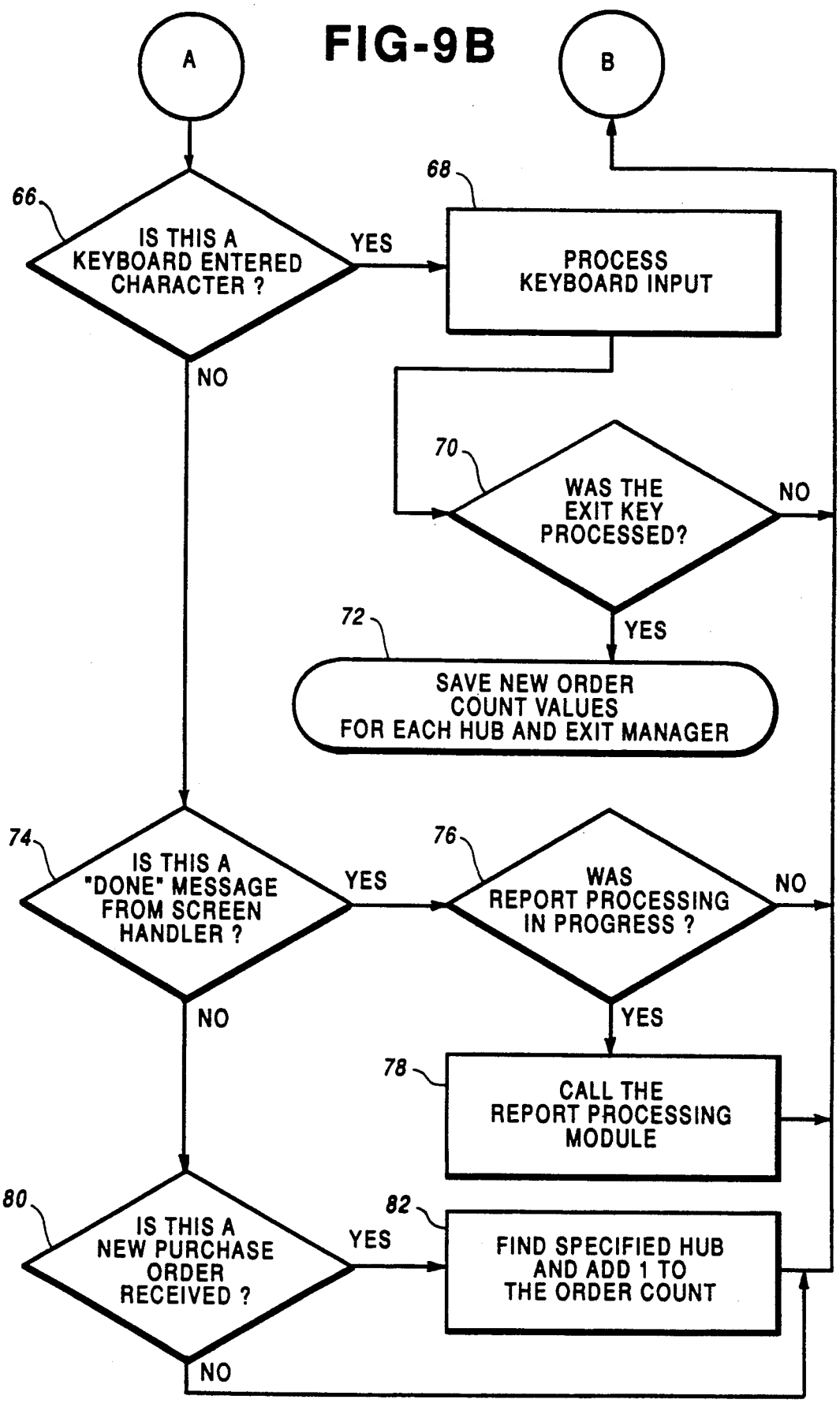

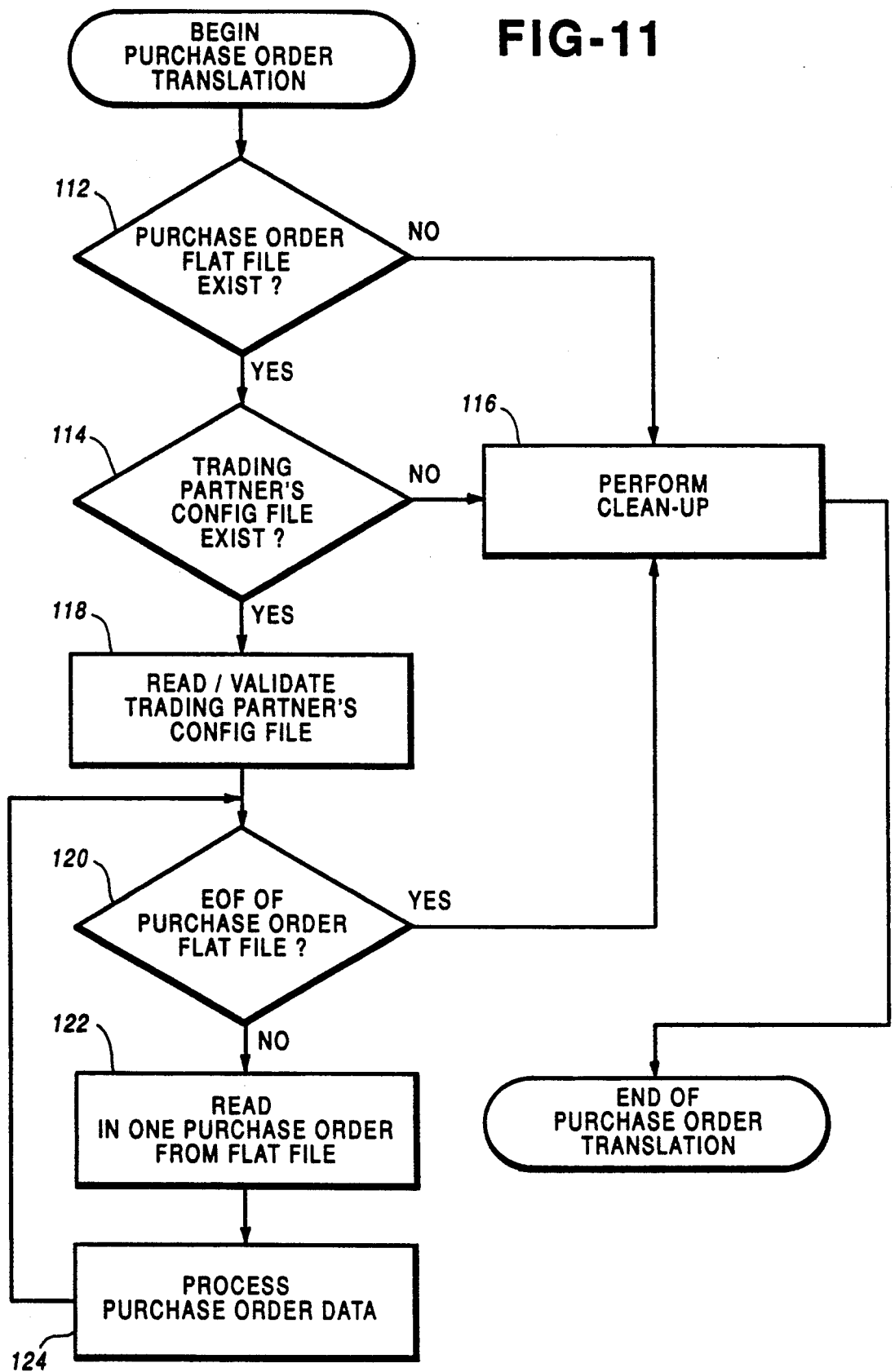

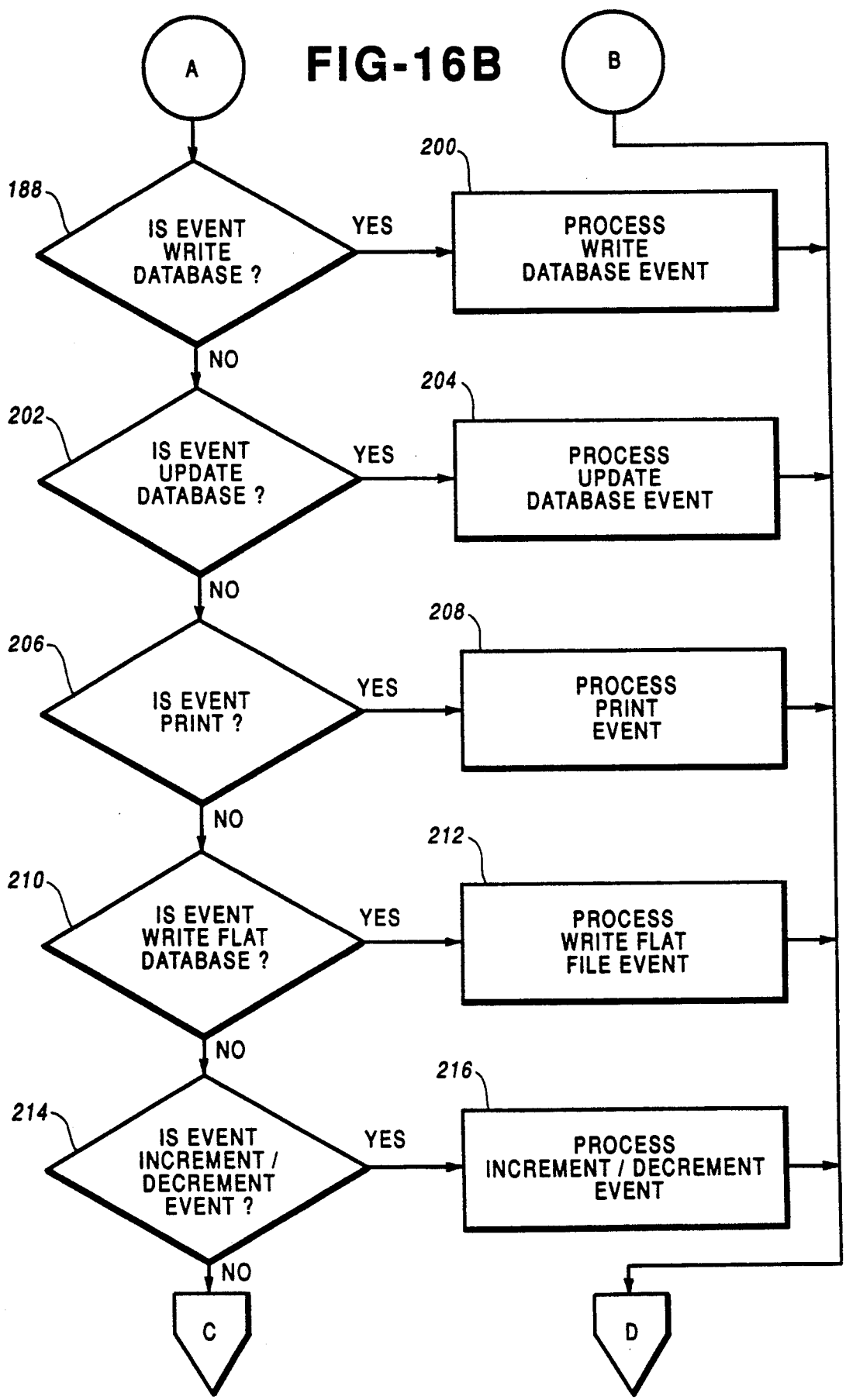

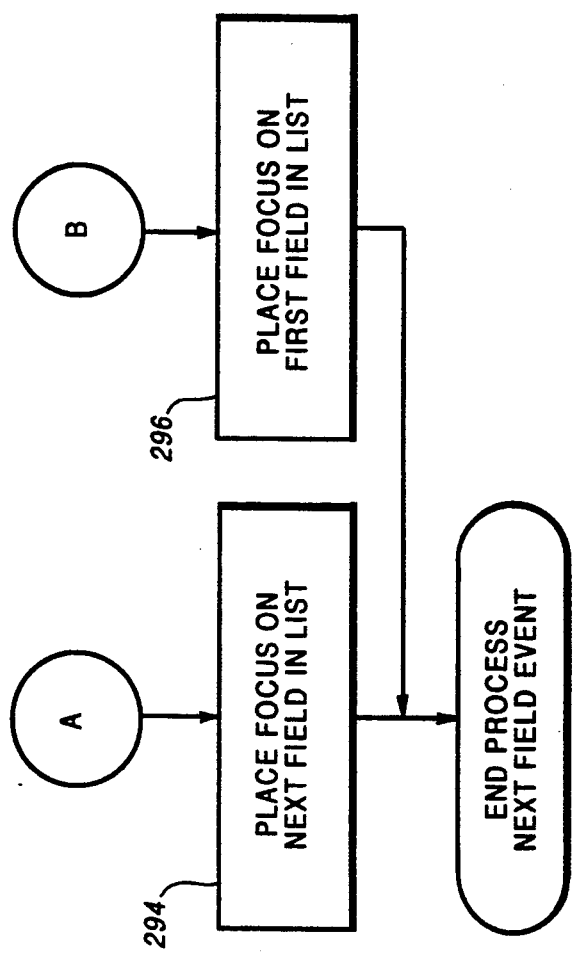
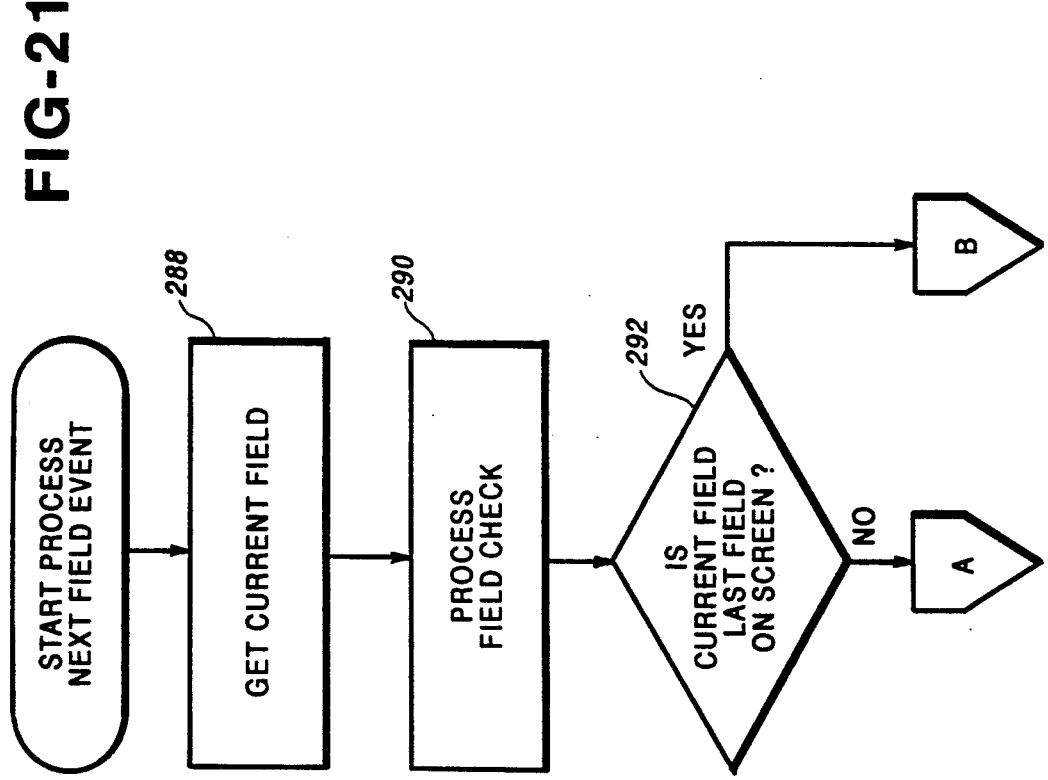
FIG-21

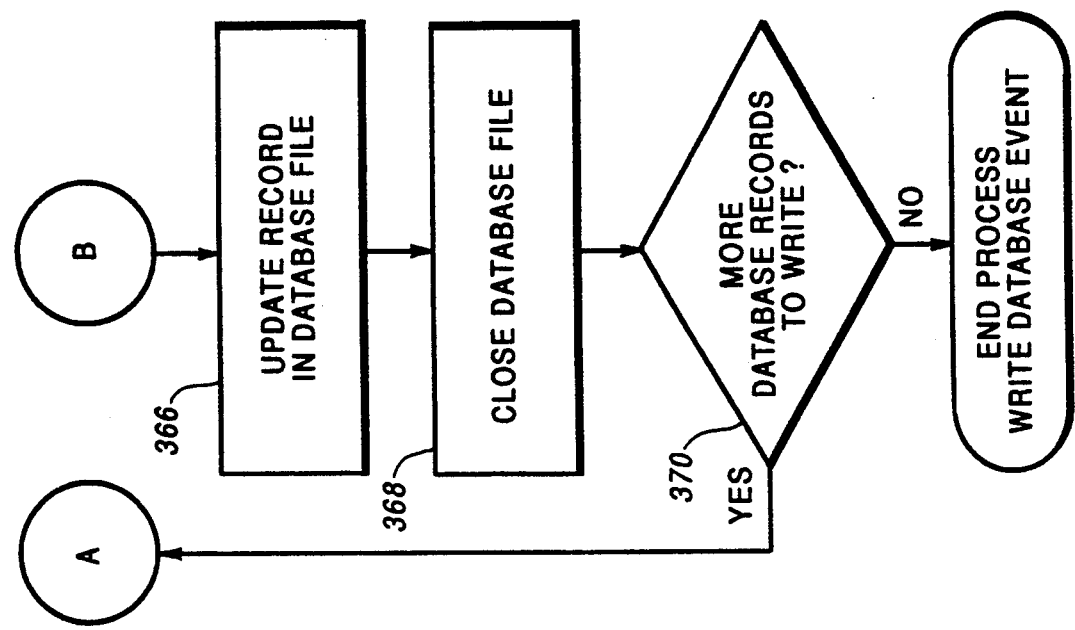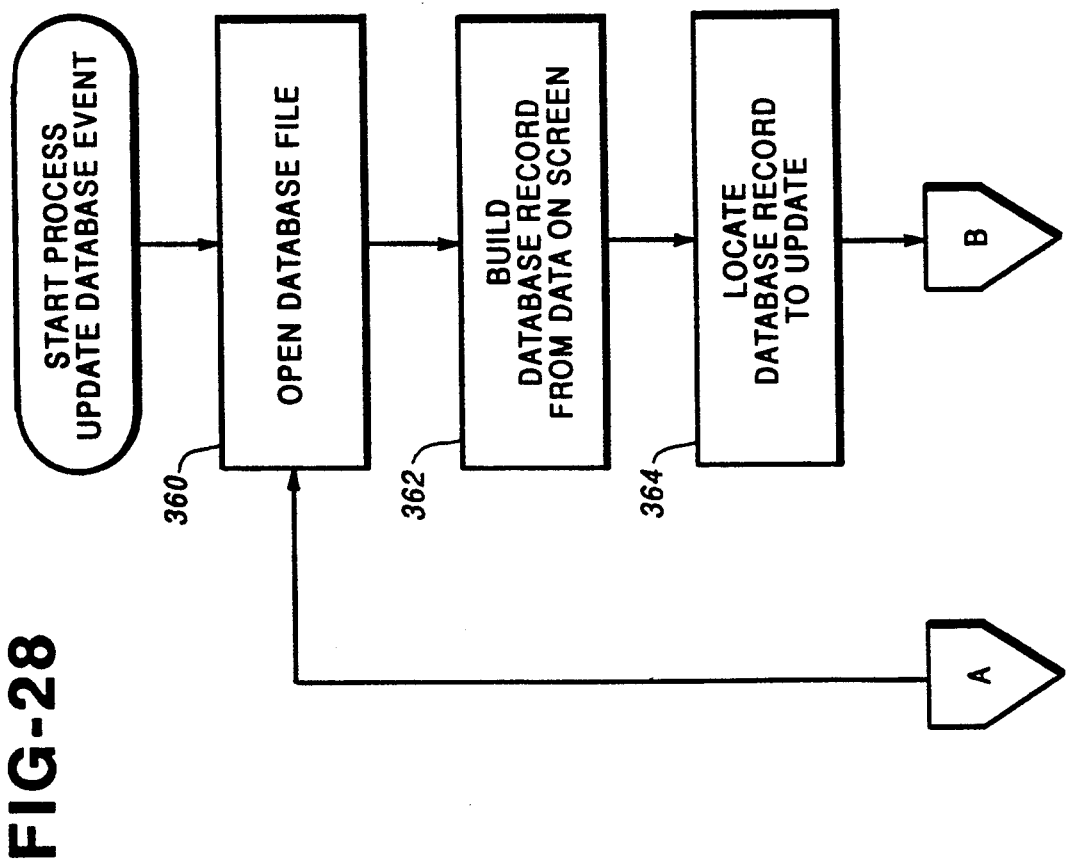
FIG-28

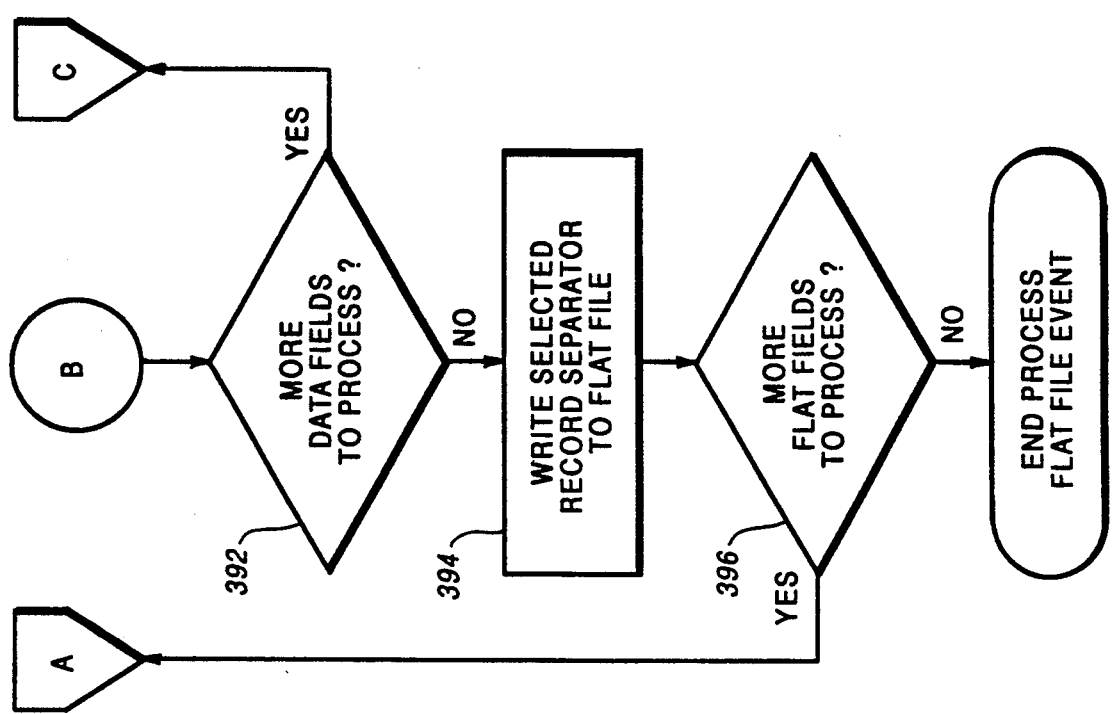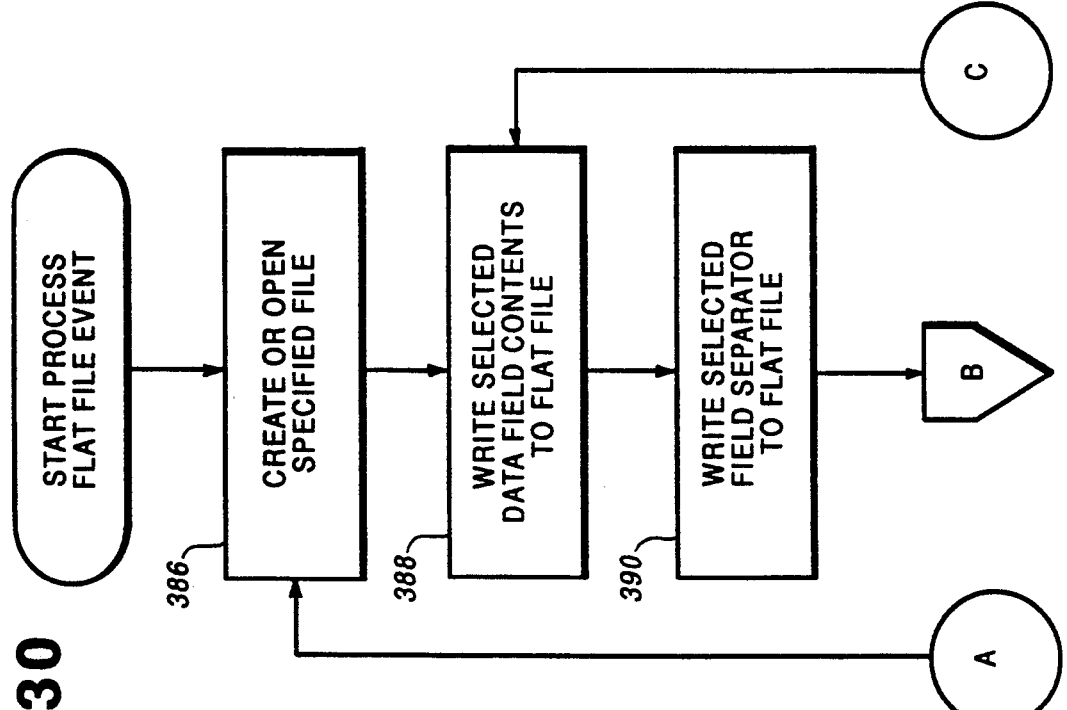
FIG-30

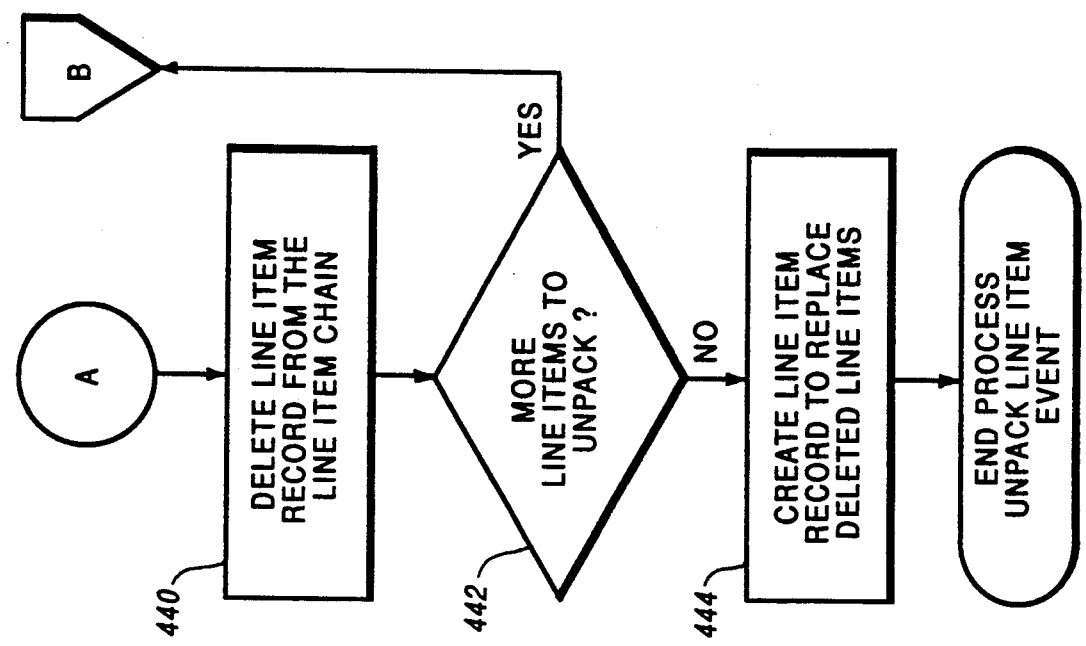
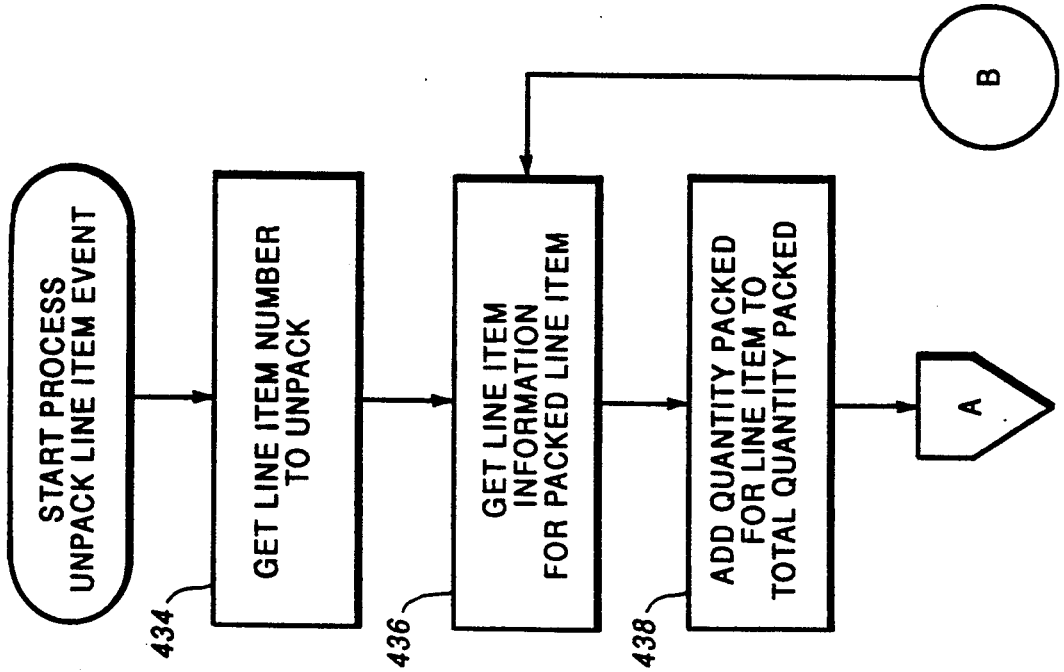
FIG-35

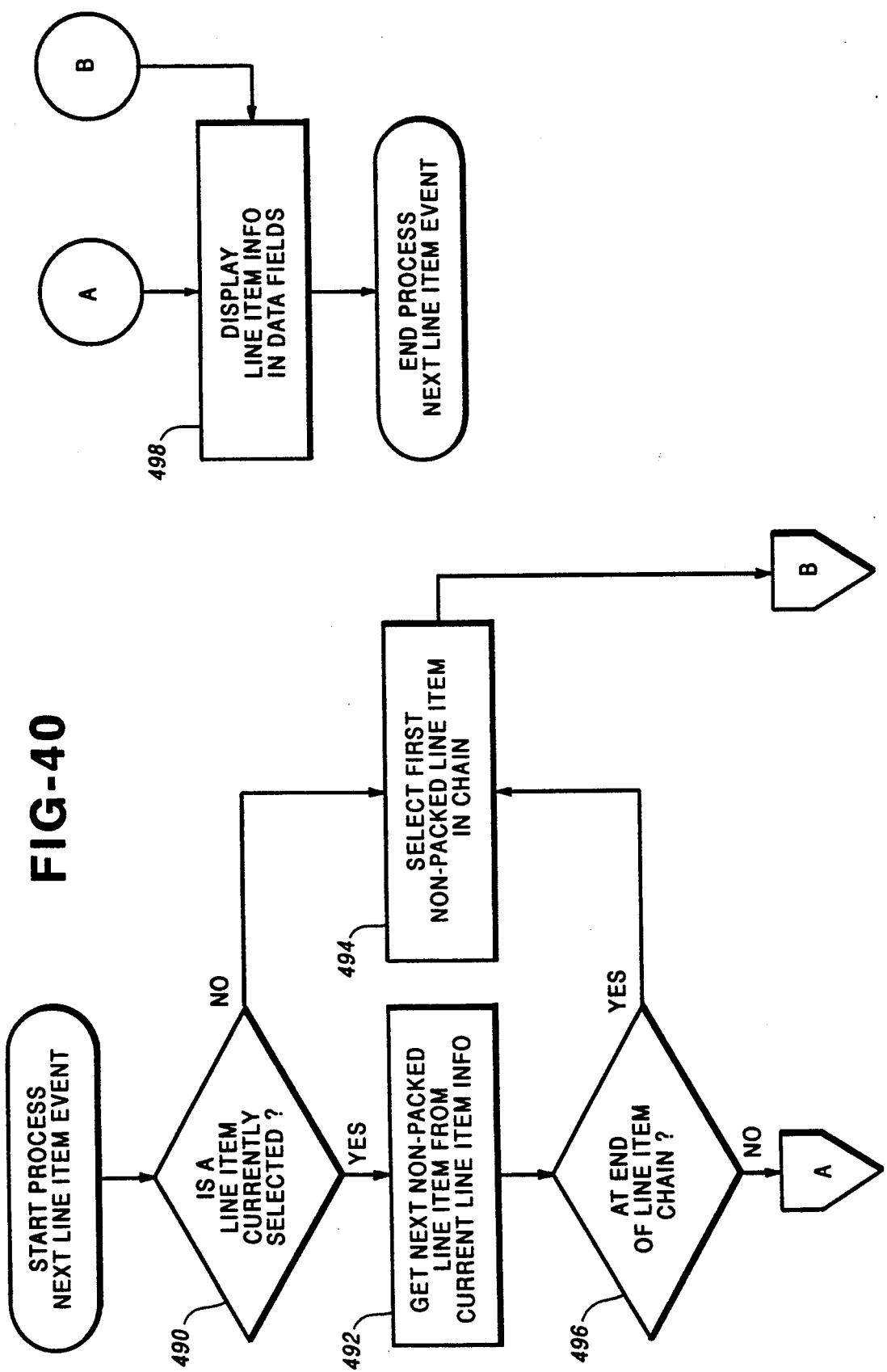

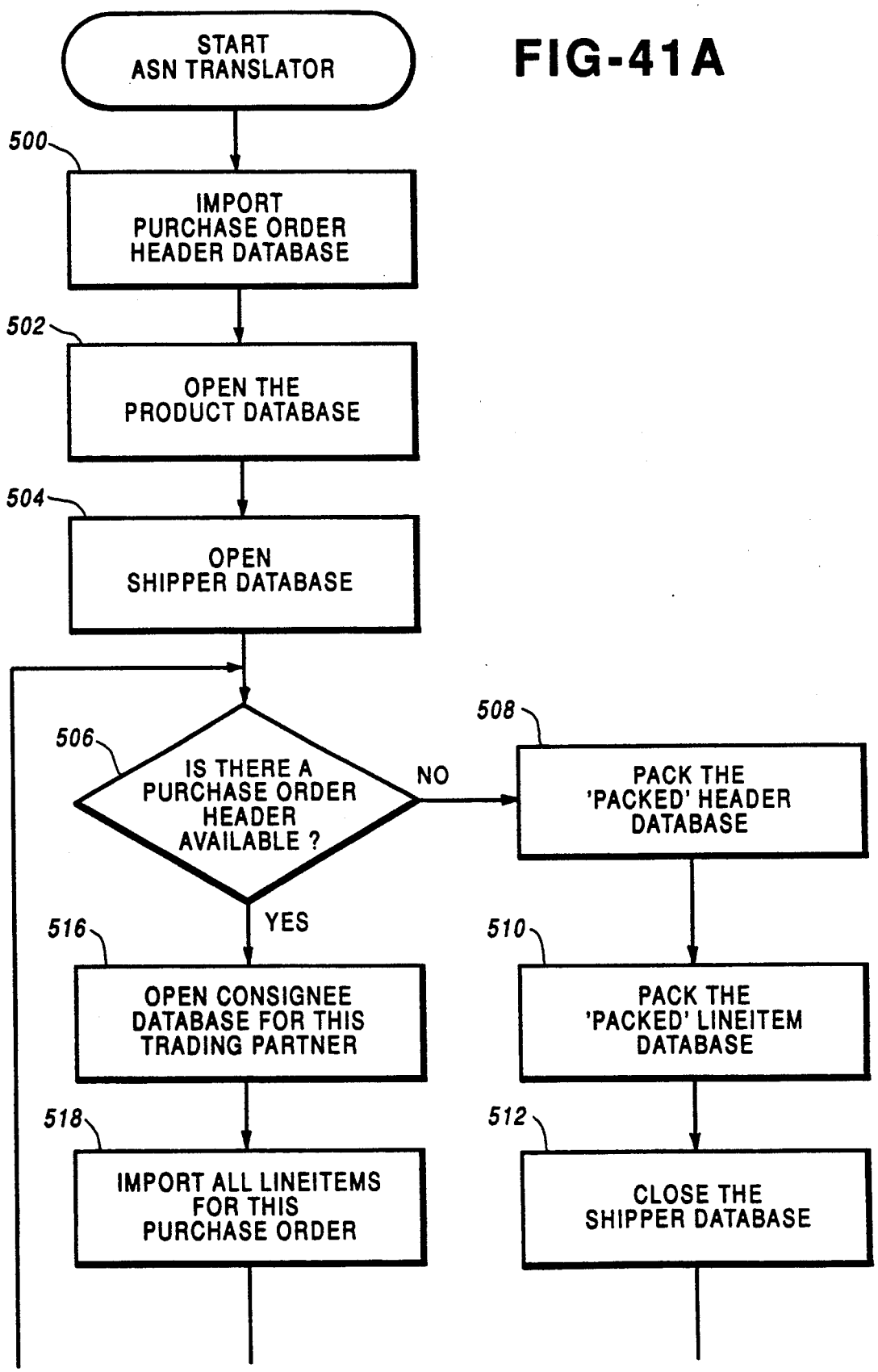

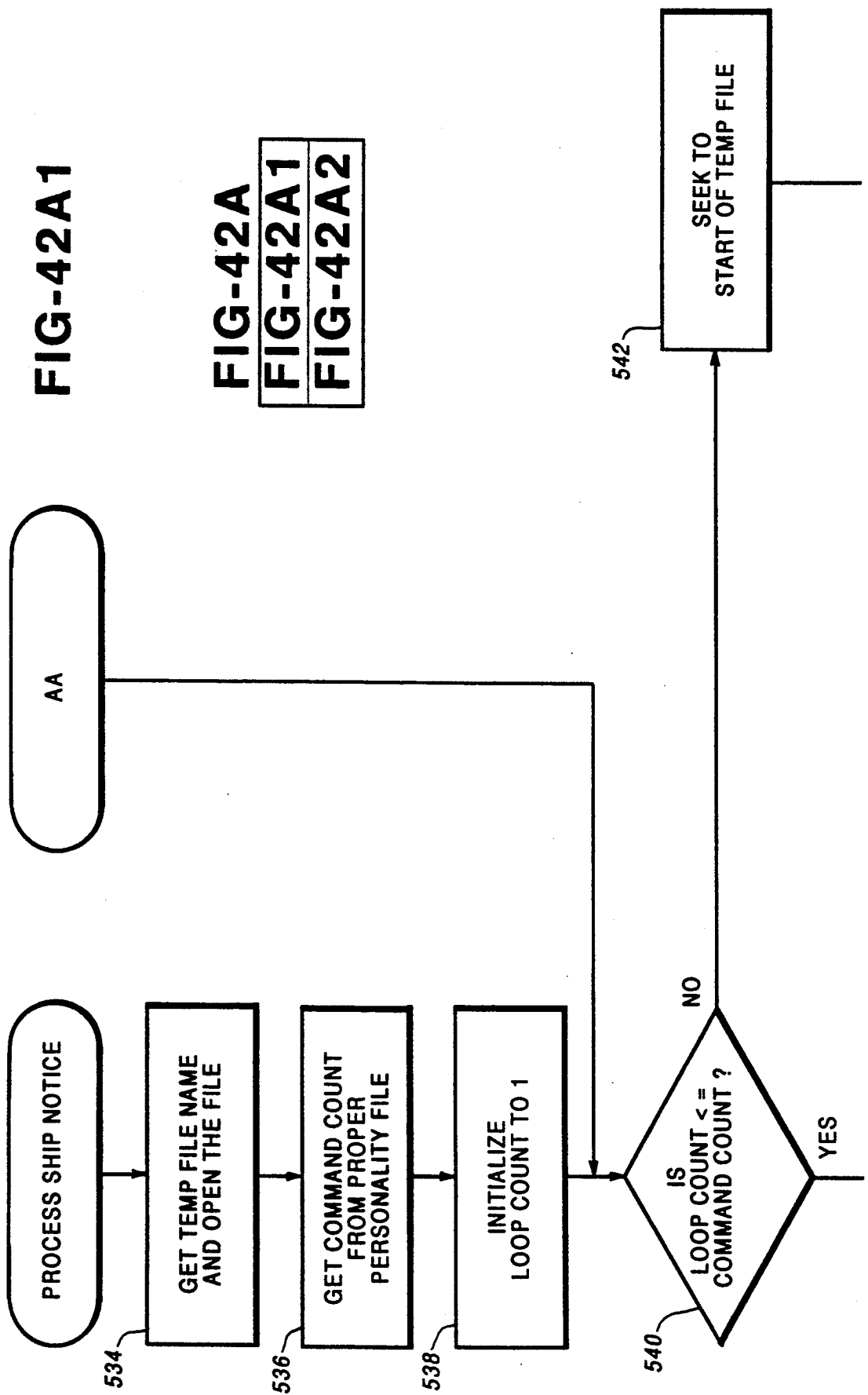

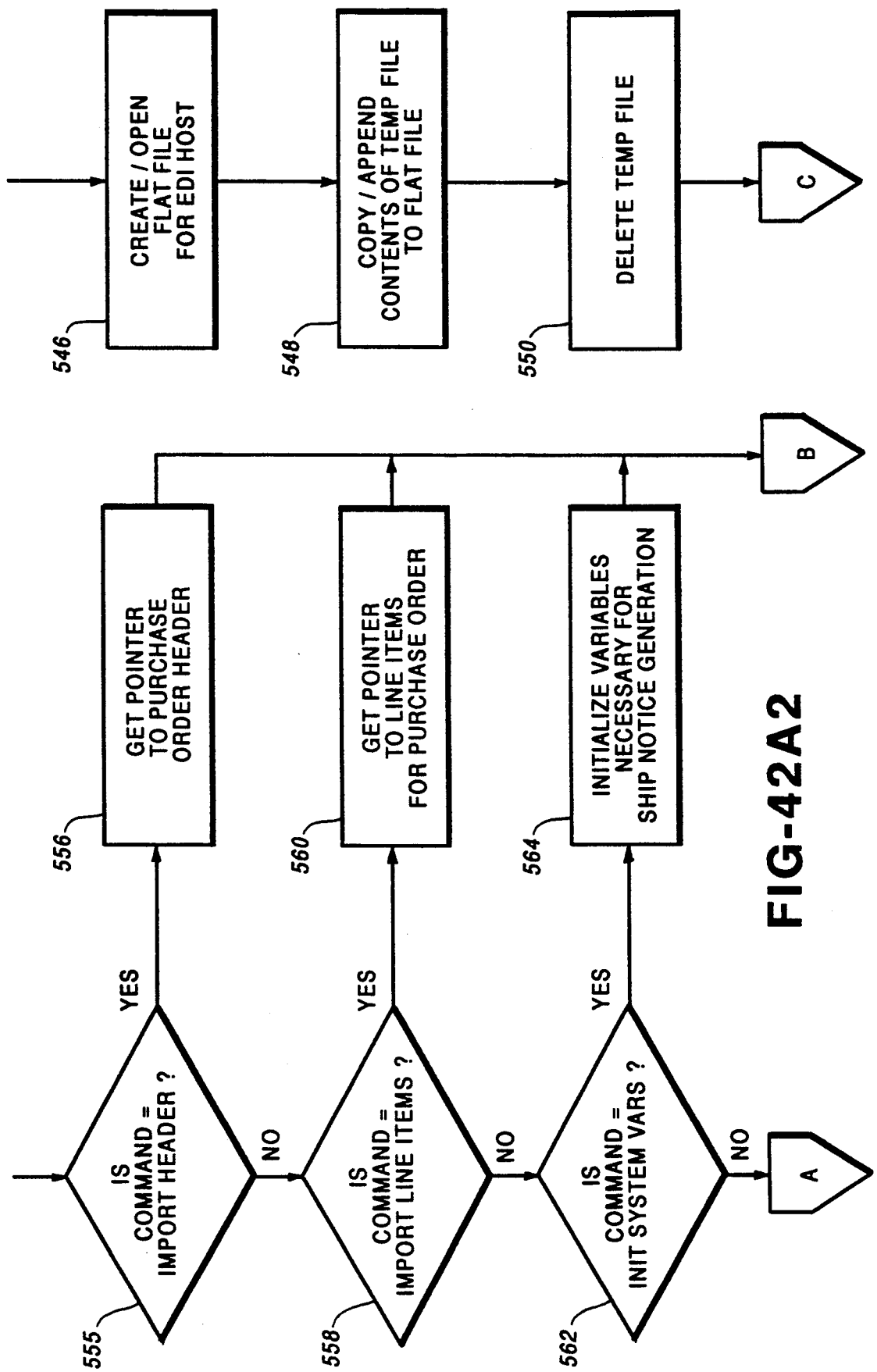
FIG-42A2

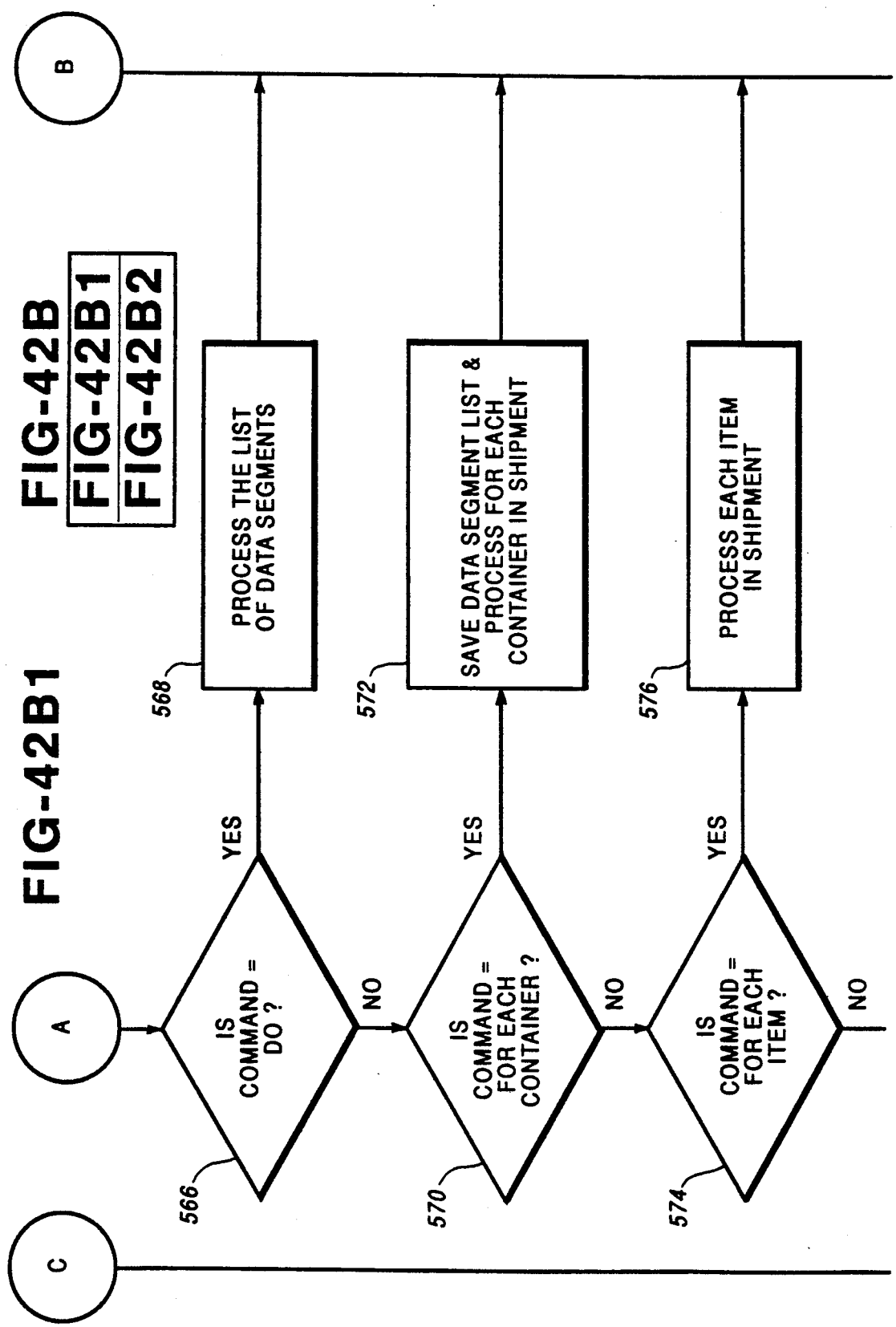

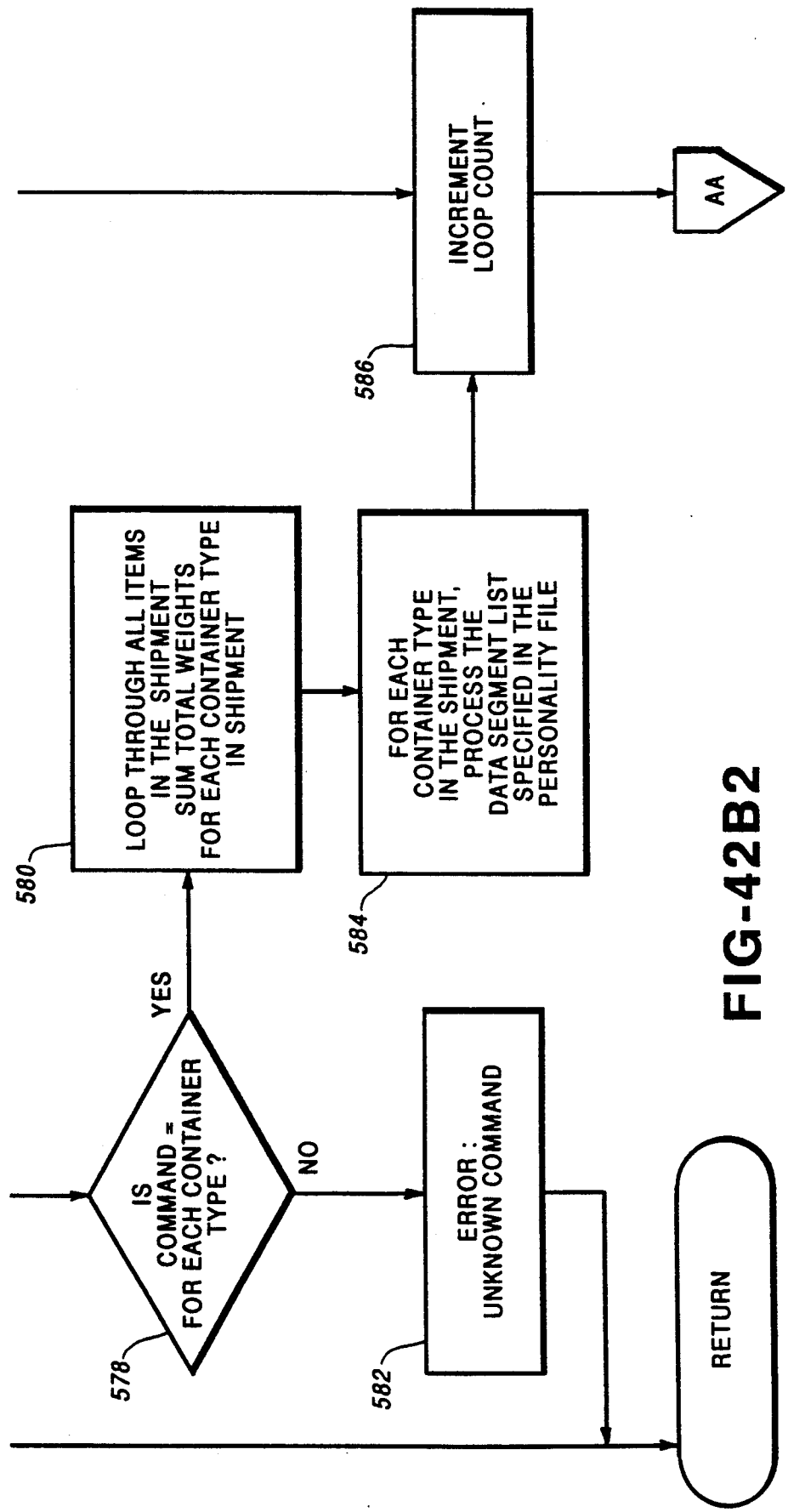
FIG-42B2

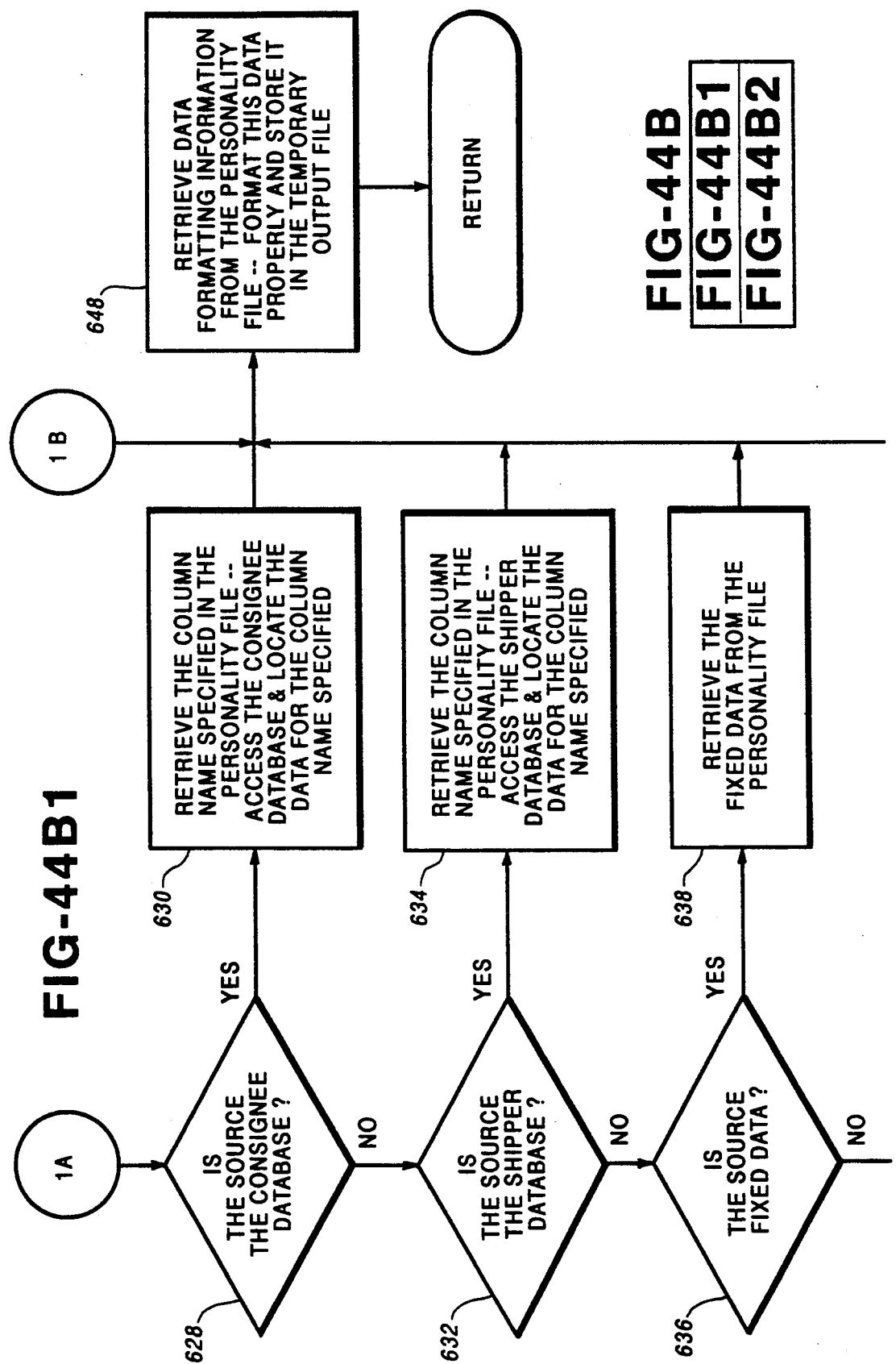

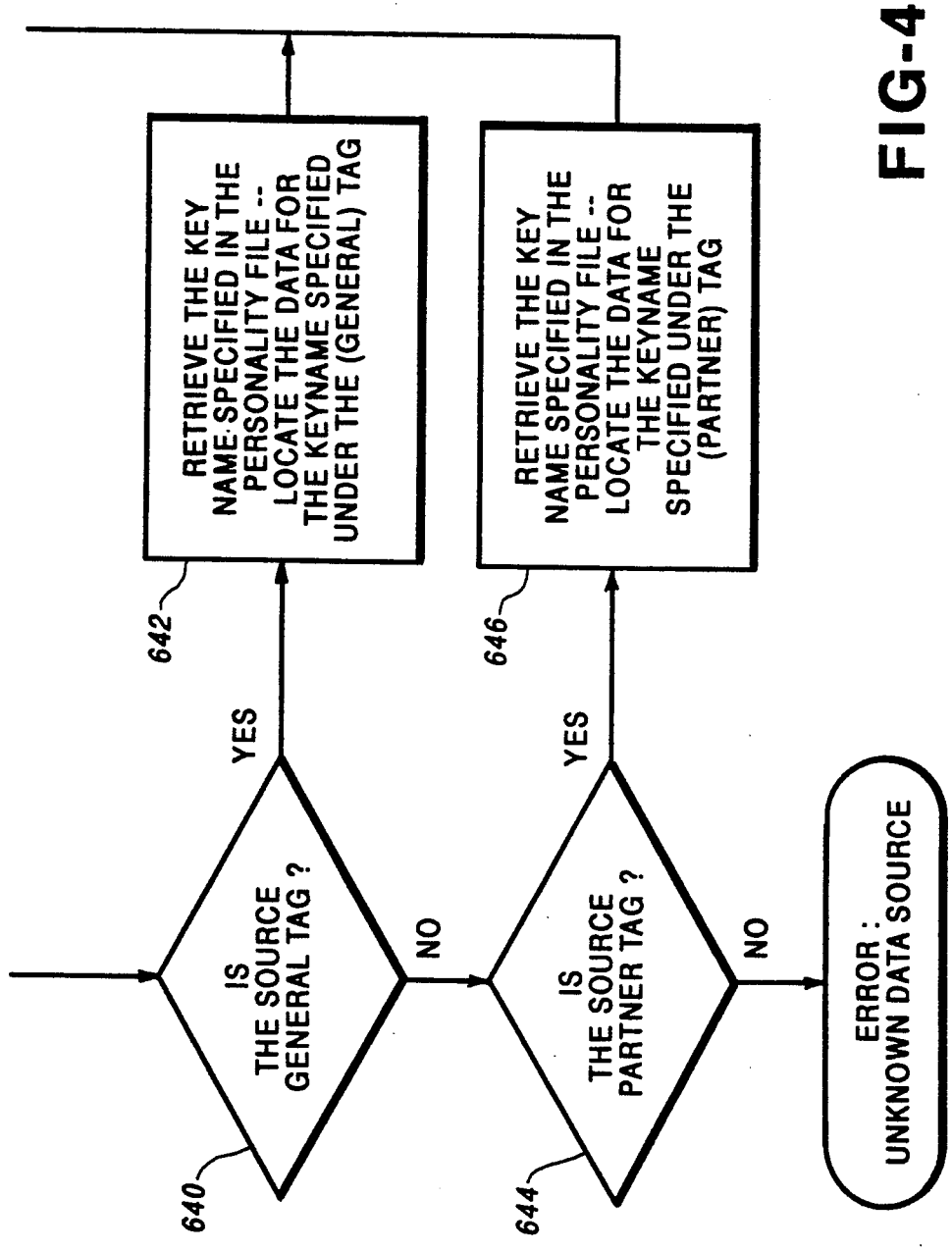
FIG-44B2

LABEL GENERATING AND DATA TRACKING SYSTEM FOR PROCESSING PURCHASE ORDERS

TECHNICAL FIELD

The present invention is directed to a label generating and data tracking system for processing purchase orders and more particularly to such a system for processing purchase orders issued by a number of consignees each requiring different processing operations, the system prompting a user for only that information required by a particular consignee to process a purchase order issued thereby. In processing a purchase order, the system verifies packing information against an electronically received purchase order and generates shipping labels and advance shipping notices in compliance with the diverse requirements of the various consignees.

BACKGROUND OF THE INVENTION

Consignees such as retailers are requiring that vendors, form whom they purchase products, ship the products in containers marked with a shipping label that includes specific information in a specific format. Many consignees are also requiring that the vendors send an advance shipping notice that includes specific information in a specific format. If the shipping label and/or advance shipping notice do not comply with the consignee's requirements, the consignee may impose penalties on the vendor. The information as well as the format thereof required for the shipping label and advance shipping notice varies from consignee to consignee, however. When a vendor is shipping products to more than one consignee, the processing of purchase orders in compliance with the diverse requirements of the various consignees becomes very difficult increasing the likelihood of errors in the shipping label and/or advance shipping notice.

SUMMARY OF THE INVENTION

In accordance with the present invention, the problems encountered in processing purchasing orders from a number of different consignees having diverse processing requirements are overcome. The label generating and data tracking system of the present invention collects the necessary information from a user in order to process purchase orders from various consignees requiring different processing operations; verifies packing information entered by a user against purchase order data in a purchase order database; and generates shipping labels and advance shipping notices in compliance with diverse requirements from the various consignees.

More particularly, the system of the present invention is implemented on a computer, such as a personal computer or a dedicated computer, having a processor, a memory, at least one input device operable by a user to enter data and commands to the computer and a display. The computer is coupled to a marking printer that prints shipping labels or tags that are affixable to a container. The system of the present invention includes a number of consignee specific display screen files that are accessible by the computer processor and that are associated with a number of different consignees each of whom require a different set of input data from a user to process a purchase order that is issued by the consignee. Each display screen file is associated with a particular consignee and includes data representing information to be depicted on the display to prompt a user to enter only that data required by the associated consignee to process a purchase order issued by the consignee. The display screen files also include data associating particular user entered commands with consignee specific purchase order processing operations.

The system of the present invention also includes a nonconsignee specific purchase order processing controller for controlling the processor to couple to the display prompt information for a specific consignee from an associated display screen file in response to user entered data including data representing the selection of the consignee. The controller further controls the processor in accordance with the display screen file to collect data entered by a user in association with a purchase order and to compare selected user entered data to associated purchase order data in the purchase order database in order to validate the user entered data. The controller controls the processor to couple selected user entered data and data from the purchase order database to the printer for printing a shipping label in compliance with the consignee's requirements.

In accordance with the present invention purchase order data may be downloaded from a mainframe or the like into a purchase order database having a predetermined format that is accessible by the processor operating in accordance with the controller of the present invention. Alternatively, the purchase order data may be received by an Electronic Data Interchange communication interface implemented on the computer. In the latter case, the communication interface receives a purchase order electronically from a remote consignee and translates the purchase order into a data file associated with the consignee. In order to process purchase order data files from a number of different consignees, the system of the present invention includes a number of consignee specific configuration files that are accessible by the processor wherein the configuration files include information indicating how purchase order data stored in a data file for a specific consignee is to be interpreted. The system also includes a non-consignee specific purchase order translator. The translator controls, in accordance with a consignee specific configuration file, the processor to store purchase order data from a data file in a predetermined manner in the purchase order database to allow the purchase order database to be accessed by the processor when operating in accordance with a nonconsignee specific purchase order processing controller.

In order to generate an advance shipping notice for any one of a number of consignees having different requirements therefore, the system of the present invention includes a number of consignee specific advance shipping notice configuration files accessible by the processor wherein these configuration files include information indicating how data entered by a user and data stored in the purchase order database are to be selected and stored in an advance shipping notice data file associated with a purchase order issued by a specific consignee. The system also includes a nonconsignee specific advance shipping notice translator for controlling, in accordance with a consignee specific advance shipping notice configuration file, the processor to store selected user entered data and data from the purchase order database in a particular manner in an advance shipping notice data file. The advance shipping notice data file may then be used by an electronic data interchange communication interface to electronically send an advance shipping notice to a consignee in a manner that complies with the consignee' requirements.

Because the system of the present invention automatically prompts the user for only that information required by a particular consignee to process a purchase order issued thereby, the user, who is typically a packing operator, need not know the information requirements of any of the consignees ordering from the vendor. The system is therefore very simple to use. Further, as the user packs items in a container to fill a purchase order, he enters information via a keyboard or scanner identifying each item packed and the quantity of the item packed. The system then compares this information to the purchase order data to insure that the correct number of items are packed to fill a particular purchase order. When a container is packed, in response to a user entered command, the system automatically prints a shipping label in compliance with the requirements of the consignee to whom the container is to be shipped, filling a purchase order. Further, the system automatically generates an advance shipping notice to a consignee in accordance with that consignees requirements. Therefore, the system of the present invention greatly simplifies for a packing operator the processing of purchase orders for different consignees.

Further, because nonconsignee specific software is utilized with consignee specific configuration and display screen files, the system of the present invention can be easily updated to accommodate a new consignee by merely adding a configuration file and display screen file for the new consignee to the system without requiring any modification to the software of the system.

These and other objects, advantages and novel features of the present invention as well as details of an illustrated embodiment thereof, will be more fully understood from the following description and the drawing.

BRIEF DESCRIPTION OF THE DRAWING

FIG. 8 is an illustration of a label only display screen;

FIGS. 9A-B form a flow chart illustrating a Main Manager routine for the system depicted in FIG. 1;

FIG. 11 is a flow chart illustrating a Purchase Order translator;

FIGS. 16A-D forms a flow chart illustrating a Process Event Routine;

FIG. 21 is a flow chart illustrating a Process Next Field Event routine;

FIG. 28 is a flow chart illustrating a Process Update Database Event routine;

FIG. 30 is a flow chart illustrating a Process Write Flat File Event routine;

FIG. 35 is a flow chart illustrating a Process Unpack Line Item Event routine;

FIG. 40 is a flow chart illustrating a Process Next Line Item Event routine;

FIGS. 42A-B form a flow chart illustrating a Process Shipping Notice routine;

FIGS. 44A-B form a flow chart illustrating a Process Data Segment Element routine.

DESCRIPTION OF THE PREFERRED EMBODIMENT

Figure 1:
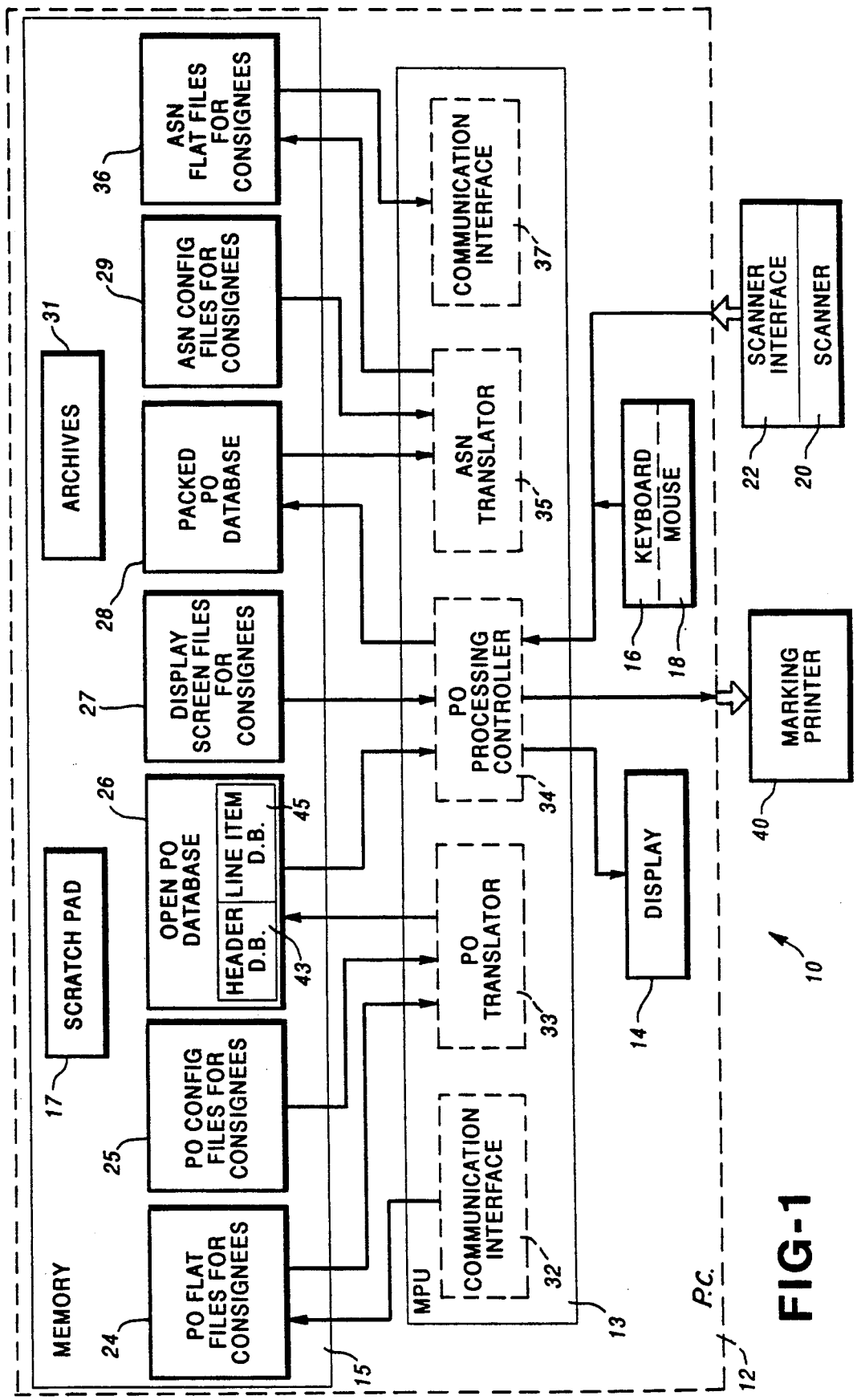
FIG. 1 is a block diagram of the system of the present invention illustrating the components thereof and the flow of data processing.

The container packing verification, labeling and data collection system 10 of the present invention as shown in FIG. 1 is used by a vendor such as a manufacturer to process a purchase order received from a consignee in a manner required by that particular consignee. As used herein, the term consignee refers to any entity issuing a purchase order. A typical consignee might be a retailer or a nonretailer. An example of a nonretail consignee is a product manufacturer that issues a purchase order to a parts manufacturer. Each consignee ordering products or items from the vendor may require particular information in a particular format on a shipping label or labels marking the container(s) in which the items specified in the purchase order are packed. A consignee may also require that an advance shipping notice be sent, for example electronically, wherein the notice is also required to include particular information in a particular format. The information and format required for the shipping labels and advance shipping notices typically vary among consignees ordering products form the same vendor. The system of the present invention automatically generates a shipping label and an advance shipping notice for each consignee in compliance with that consignee's requirements with only minimal input from the system user who is typically the vendor's packing operator. Further, the system 10 of the present invention ensures that the items specified on the purchase order are sent in the correct quantities to the consignee in response to the purchase order. As will be apparent, the system 10 is extremely easy to use to prevent errors in purchase order processing which can be very costly to the vendor.

The system 10 is implemented on a computer 12. Although the system 10 is shown in FIG. 1 as being implemented on a personal computer, P.C. 12, the system can also be implemented on other types of computers including a dedicated computer. The computer 12 includes a display 14 for communicating information to the user. The computer 12 also includes a keyboard 16 and/or a mouse 18 to allow a user to enter purchase order processing information such as packing data and control commands to the system. A scanner 20 coupled to the computer 12 via a scanner interface 22 allows a user to scan barcode information off a purchase order or item to be packed, etc. so as to simplify the data entry process. The computer 12 also includes a memory 15 with a scratch pad portion 17 for manipulating data and other areas for storing a number of data files and databases 24-31 used during the operation of the system The processor 13 of the computer 12 operates in accordance with a number of software routines 32-37 that control the operations of the system 10. The software routines are actually stored in a memory of the computer 12. The depiction of the routines 32-37 and data files 24-31 in FIG. 1 illustrates the particular data files used by the processor 13 when operating in accordance with a particular software routine 32-37.

A communication interface 32 is an Electronic Data Interchange, EDI, software package that translates a purchase order electronically received from a consignee into a flat file 24 associated with the particular consignee. Suitable EDI packages are available from Fortell or Supply Tech. It is noted that the system 10 can also receive purchase order data from a main frame computer or the like that is coupled to the computer 12 via an RS232 interface or the like. A purchase order translator 33 reads a purchase order flat file as discussed in detail below and parses the purchase order data therein into an open purchase order database 26 in a particular manner so that the data is accessible by the computer's processor operating in accordance with a nonconsignee specific controller 34. The purchase order translator 33 also imports into the database 26 other data needed by the controller 34 to process a purchase order.

More particularly, the purchase order translator 33 is nonconsignee specific or generic. It translates a purchase order flat file 24 associated with a particular consignee utilizing a purchase order configuration file 25 also associated with that particular consignee. The purchase order configuration file for a particular consignee indicates how purchase order data in a flat file associated with the consignee is to be interpreted.

The purchase order configuration file 25 utilizes tags and key names. Under a first tag, information is provided that identifies the total number of segments configured for the consignee in the flat file 24, the length of the segment ID in the flat file 24 and the length of the sequence number in the flat file 24. Under the first tag, the configuration file also includes the column name associated with the purchase order number for a purchase order header database table 43 and a line item database table 45 that are formed by the translator 33 in the database 26. The next information in the configuration file is the column name of the consignee for both the purchase order header database table 43 and the line item database table 45. The purchase order number and consignee's name are used to relate the purchase order header information for a given purchase order in the table 43 with the line item records associated with that purchase order in the table 45. Under the first tag in the configuration file, the type of EDI package 32 will also be specified if more than one EDI package is utilized and further, the purchase order version is also specified if there is more than one version. Under the second tag of the purchase order configuration file, information is stored indicating the number of types of purchase orders for the consignee and identifying those purchase order types. For example, a purchase order may be of a type that is issued by a distribution center associated with a consignee or it may be of a different type that is issued by a store of the consignee. To add information to a consignee address database, not shown but stored in the memory 15, a consignee tag will be present. The consignee address database consists of addresses for stores associated with the consignee that are indexed using an identification code. If the identification code for an address is sent in a purchase order that is not in the consignee database, the purchase order translator 33 uses the information in the consignee tag of the configuration file 25 to insert the address information into the consignee address database. Under the consignee tag, the configuration file 25 stores information including the column name in the consignee address database of the store number. Following the column name are instructions on how to retrieve the store name. Further information included under the consignee tag is the name of the column in the consignee address database for the name of the store; the number of segments that need to be processed in order to insert a new store address record into the consignee address database and a list of segments that contain address data to be inserted into the consignee address database. Segment tags and their associated information follow the consignee tag in the configuration file. Under the segment tag, is found a segment ID and data identifying the number of elements that make up a segment and the number of configurations that are available for a segment. Under this tag, information is also stored indicating the type of purchase order that the particular segment is configured for as discussed above. Each element contains information in a number of fields, the first field is associated with the trading partner length validation and indicates whether data for this field is fixed, variable or to be ignored and the length of the data for the field. The second field is a database search flag and indicates what database needs to be searched if any, for example, a product translation database or the consignee address database may need to be searched as indicated by this flag. The third field is a key search field and includes the name of the column to be used in a search. The fourth field indicates what database to store the element's data in such as the purchase order header database 43, the purchase order line item database 45, both the purchase order header and line item databases 43,45 or the consignee address database. The fifth field identifies the name of column(s) in the database to store data. The sixth field contains information used for validation. For example, the sixth field may include a list of valid codes or it may indicate that an item in the segment should contain data but that the data can be variable. The information set out in the above fields may for example cause the translator 33 to search a product translation table associated with the consignee for an item number assigned by the consignee to find a corresponding item number assigned by the vendor.

As discussed above, the purchase order translator 33 parses data from a purchase order flat file 24 into the purchase order header database 43 and the purchase order line item database 45 formed within the open purchase order database 26. The column headings for the purchase order header database are as follows: purchase order number; trading partner name; order type such as reorder, stand alone order, etc.; purchase order date; required delivery date; shipping destination code; vendor ID; ship for destination code; shipping destination qualifier; and shipping cost. The column headings for the line item database in the open purchase order database 26 are as follows: purchase order number; name of trading partner; purchase order line item identifier; product identification; date shipped; estimated arrival date; UCC 128 tracking number; carrier such as UPS, etc.; quantity ordered and units; quantity packed and units; packing operator's identification, i.e. name or identification number; container type such as skid, box, etc.; department issuing the purchase order for the line item; item status such as back order, etc.; a SIC flag indicating whether this is a single item carton; total weight of the container; bill of lading number; a hub collect flag; a shipping charge indication; shipping charge amount; a collection delivery indication; a call tag for returned items; a declared value for insurance; C.O.D. amount; rate unit of measurement; and carrier tracer number.

In operation, the purchase order translator 33 stores the data from a purchase order flat file 24 under the appropriate column headings in the purchase order header database 43 and purchase order line item database 45 as indicated by the purchase order configuration file 25 for the consignee issuing the purchase order. Thereafter, a purchase order processing controller 34 prompts the user via the display 14 to enter only that data required by a particular consignee to update the purchase order header and line item databases during a packing operation. The controller 34 is nonconsignee specific but operates in accordance with a display screen file 27 associated with a particular consignee. Each consignee display screen file 27 includes a display screen prompt template that depicts display data fields and associated data entry boxes to prompt a user to enter data as discussed below with reference to FIGS. 5–8. The display screen file also includes the identity of the print format to be used to print a shipping compliance label for the consignee where the print format lists the data fields that are to be printed. The display screen file further includes information indicating how various user inputs are to be interpreted and processed for a given consignee as discussed in detail below.

Figure 2:
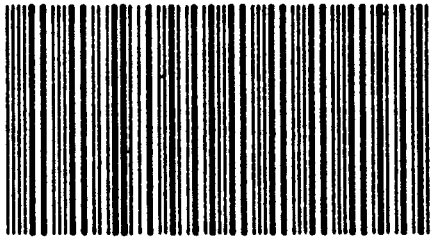
FIG. 2 is an illustration of a compliance shipping label printed by the system shown in FIG. 1.
Figure 3:
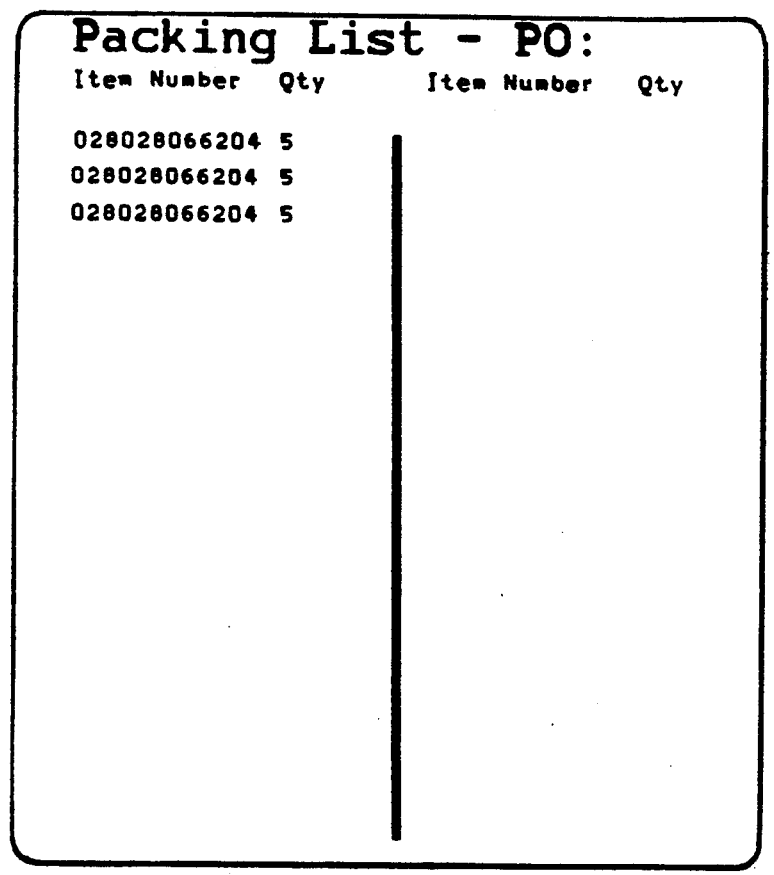
FIG. 3 is an illustration of a packing list label printed by the system depicted in FIG. 1.

The processor 13 operates in accordance with the controller 34 and a selected consignee's display screen file 27 to select from the memory 15 data for transmission to a marking printer 40 in order to print a shipping label and/or packing list label in compliance with the requirements of the consignee issuing the purchase order. The data selected for printing may include data entered by a user in response to the prompt template, data from the purchase order database and data representing the consignee's address and vendor's address, etc. An example of a compliance shipping label is depicted in FIG. 2. This compliance shipping label includes the return address of the vendor shipping the container, the address of the consignee to whom the container is to be shipped; the shipping carrier; the purchase order number; department ordering the items contained in the container; the type of purchase order; and a barcoded tracking number. An example of a packing list label is depicted in FIG. 3. It is noted that the marking printer 40 is a printer that prints information on a web of record members such as tags, labels or the like that are affixable to a container such as a box or a skid to mark the container.

Figure 4:
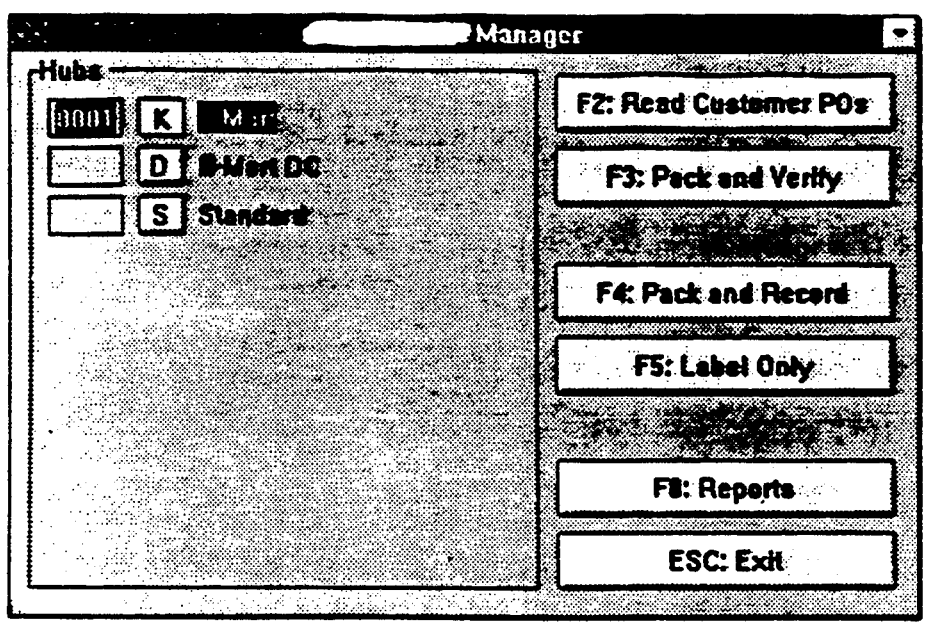
FIG. 4 is an illustration of a main menu display screen depicted on the display of the system shown in FIG. 1.

Upon entering the system 10 of the present invention, the processor 13 in accordance with the controller 34 controls the display 14 to depict a main menu display screen shown in FIG. 4. The main menu display screen includes a list of the hubs or various consignees for which a purchase order may be processed utilizing the system 10. Three consignees are shown in FIG. 1 including MART, MART DC and a consignee listed as "Standard", which refers to a generic consignee. The main display screen also includes a list of operating modes for the system 10, one of which will be implemented upon selection by a user utilizing the keyboard 16 or mouse 18. More particularly, the user may select a Read Customer POs mode to cause the processor 13 operating in accordance with the controller 34 to call the purchase order translator 33 to translate a flat file 24 associated with a selected consignee. A Pack and Verify mode when selected by the user causes the processor 13 operating in accordance with the controller 34 to control the display 14 to depict a Pack and Verify display screen from the display screen files 27 associated with the consignee selected from the main menu display screen. The Pack and Verify display screen depicted on the display 14 for a selected consignee prompts a user to enter only that information required by the selected consignee to process a purchase order issued thereby. During this mode a container packing verification operation is performed and one or more shipping labels are generated in compliance with the consignee's requirements. A Pack and Record mode of operation when selected by a user will cause a Pack and Record display screen selected from the files 27 to be depicted on the display 14 to prompt a user to enter data regarding the packing operation wherein the data is stored to provide an audit trail of what has been packed for a particular purchase order. In this mode, the packing information is not verified against purchase order data. However, the system 10 will generate a shipping compliance label in accordance with this mode of operation. When a label only mode is selected, a label only display screen selected from the file 27 is depicted on the display 14 to prompt a user to enter information so that only a compliance shipping label is generated. A Report mode of operation when selected by a user allows a report to be generated via a text, i.e. line printer (not shown) that is coupled to the computer 12.

Figure 5:
FIG. 5 is an illustration of a pack and verify display screen associated with one consignee.

An example of a Pack and Verify display screen or prompt template for a selected consignee is depicted in FIG. 5. This single display screen prompts a user to enter all the information that is required by the consignee to verify the packing of a purchase order, to print a shipping compliance label for that consignee and to generate an advance shipping notice that is electronically transferred to the consignee as discussed in detail below. In operation, the user who is typically a packing operator will utilize the scanner 20 to scan in a purchase order number from a paper record of the purchase order. Alternatively, the system may automatically display the purchase order number associated with a purchase order the data for which has been received from a selected consignee. The automatic display of a purchase order is performed if a Next Purchase Order event is listed in the display screen file 27 associated with the selected consignee as discussed in detail below. After the purchase order number is displayed the user may scan the barcode associated with an item to be packed for the purchase order to enter an item identification number. Alternatively, the system may automatically display an item to be packed for the purchase order if a Next Line Item event is listed in the consignee's display screen file 27. When the item identification is entered or brought up on the display 14, if this field is designated as a key data display field, the processor operating in accordance with the controller 34 will automatically search the database 45 and retrieve therefrom the description of the item and the quantity of the item ordered, this information being inserted into the respective "DESCRIPTION" field and the "Qty Ordered" field of the display screen. In general, when information is entered into a key field on the display screen, the system 10 automatically searches the database 26 for information associated with that key field as set out in the display screen file 27 so that the system can automatically display the information to the user. This greatly reduces the amount of input required from a user. A Quantity To Pack field depicted on the display screen in FIG. 5 is controlled by the system 10 and automatically incremented or decremented in accordance with the packing operation. More particularly, prior to packing the first item, the number depicted in the Quantity To Pack display field will equal the quantity ordered. As an operator packs an item, by scanning a barcode associated with the item utilizing the scanner 20 or by entering a number via the keyboard 16 into a quantity packed field, the processor in accordance with the controller 34 automatically updates the Quantity To Pack field. A Weight Display field may prompt the user to enter the weight of items packed via the keyboard 16 or via a scale, not shown, coupled to the computer 12. The user can also select the units of weight utilizing a units field. An arrow depicted in a box 42 adjacent to the units display field indicates that the units display field is a combination or list field. When the user tabs to a combination display field utilizing the keyboard 16, the controller 34 in accordance with the display screen file 27 for the selected consignee automatically controls the display 14 to depict a window which overlies a portion of the display screen as shown in FIG. 5 and which lists for example the various units that the user may select. In the display screen depicted in FIG. 5, the display field identified by Cont Code and the Carrier display field are also combination or list fields. A tracking number display screen field is automatically updated by the system.

Figure 6:
FIG. 6 is an illustration of a pack and verify display screen associated with another consignee FIG. 7 illustration of a pack and record display screen.

The display screen as depicted in FIG. 5 also depicts the operations of various function keys. The operation associated with each function key in this example, the Enter, F10, F6, F12, F2 and F9 keys, are assigned by the consignee such that the operation associated with each key can vary from consignee to consignee. The various functions or events performed in response to the actuation of a function key will be described in detail below. A Pack and Verify screen for another consignee is depicted in FIG. 6 to illustrate the different input requirements of different consignees and to illustrate that different consignees might desire different operations, or a greater or lesser number of operations to be assigned to various function keys.

In FIG. 7, a Pack and Record display screen is illustrated. As discussed above, this display screen prompts the user to enter information to provide an audit trail of packed items in association with a purchase order and to generate a compliance shipping label. In this mode an advance shipping notice is not generated. FIG. 8 illustrates a label only display screen depicted on the display 14 when the Label Only mode is selected by a user. This display screen prompts the user to enter only that information necessary for the system to print a compliance shipping label. The Pack and Record and Label Only modes are typically used by a packing operator to process a purchase order the data for which has not been received from the consignee via either the communication interface 32 or via a download from a main frame computer.

The controller 34 shown in FIG. is nonconsignee specific as described in detail below. The nonconsignee specific controller 34 utilizes consignee specific display screen files 27 a plurality of which are stored in the system such that there is a display screen file associated with each consignee listed on the main menu display screen depicted in FIG. 4. As discussed above, a consignee's display screen file 27 includes data defining a prompt template, i.e. the information to be depicted on the display 14 in order to prompt a user to enter data so that a purchase order for that particular consignee can be processed in the selected mode of operation. The display screen file 27 associated with a particular consignee also includes tables defining each key data display field in the prompt template and the display data fields associated with each key data display field. The display screen data files associated with a particular consignee also include tables that define the operations or events to be performed whenever a user enters a particular command via the selection of a defined function key. The events associated with a particular function key may or may not be hidden from a user. For example, a function key may be assigned to a sequence of events some of which control data manipulation needed by the system but not necessary for the packing operator to know. The events performed by the system that the packing operator need not know about are hidden in that they are not shown in association with the function key on the prompt template depicted on the display 14, the function key being very simply defined on the display. A printing format according to which shipping labels are to be printed for the consignee is also identified in the display screen file 27 associated with the consignee where a number of printing formats each defining the data to be printed and the layout thereof, are stored in the memory 15. Other information utilized by the processor operating in accordance with the controller 34 includes the consignee address database referred to above and a vendor's information file that includes such information as the address of the vendor, a vendor ID, the types of marking printers 40 to which the computer 12 is coupled, a list of the consignees for which display screen files have been installed, etc., these files being stored in the memory 15 of the computer so as to be accessible by the processor 13.

The processor 13 operating in accordance with the controller 34, when completing a purchase order will move the purchase order data from the open database 26 to a closed purchase order database 28. The processor of the computer 12 operates in accordance with a nonconsignee specific advance shipping notice translator 35 to translate the data for a closed purchase order in the database 28 into a flat file 30 that can be utilized by an EDI communication interface such as discussed above that controls the transmission of an advance shipping notice electronically to a particular consignee. In order to interpret consignee specific purchase order data in the database 28, the generic or nonconsignee specific translator 35 utilizes one of a number of consignee specific configuration files 29 that indicates how the data entered by a user and purchase order data are to be selected and stored in the advance shipping notice flat file for a particular consignee. An archive file 31 is utilized by the translator 35 to store closed purchase order data from the database 28 in a manner to generate reports.

Figure 9A:
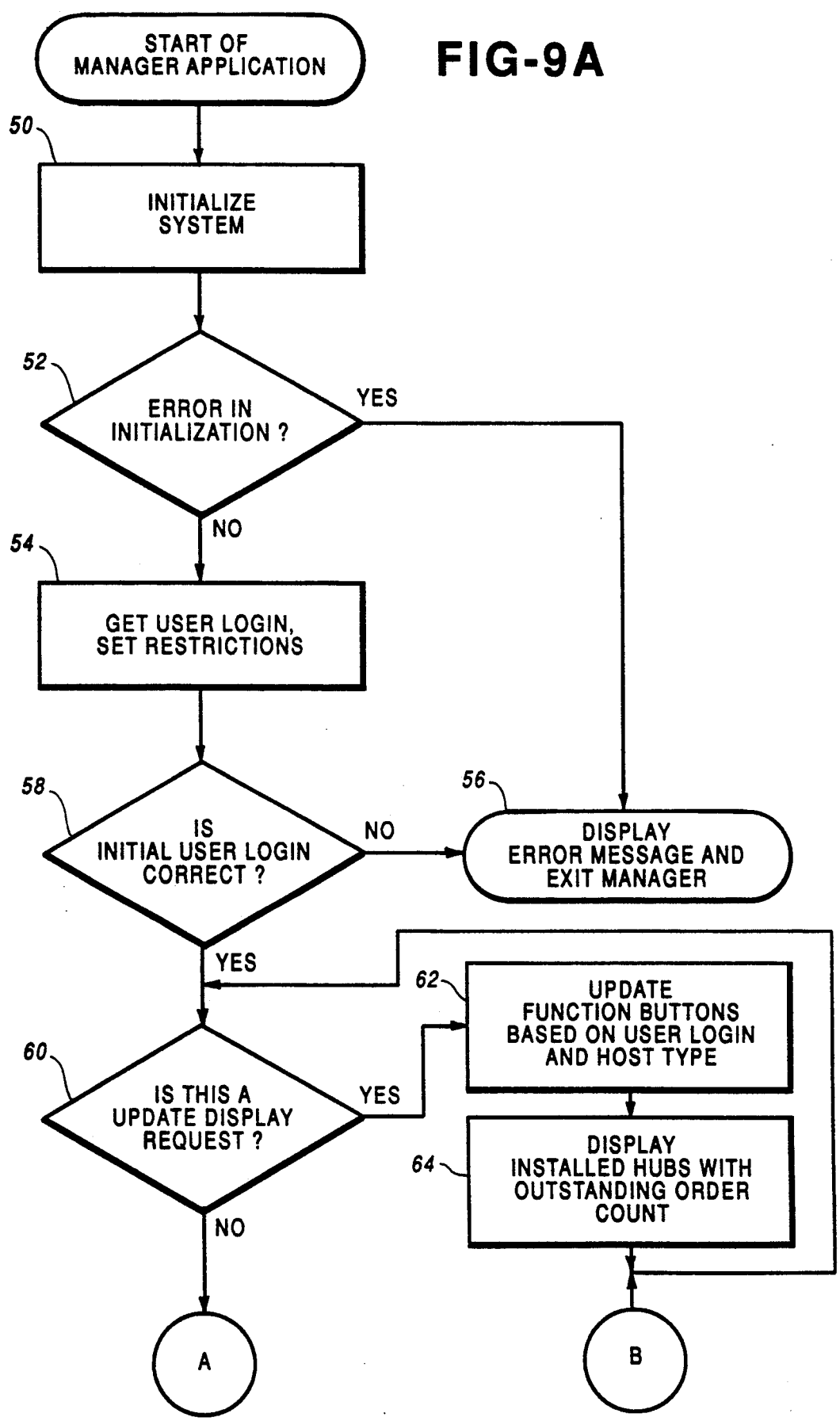
Figure 10A:
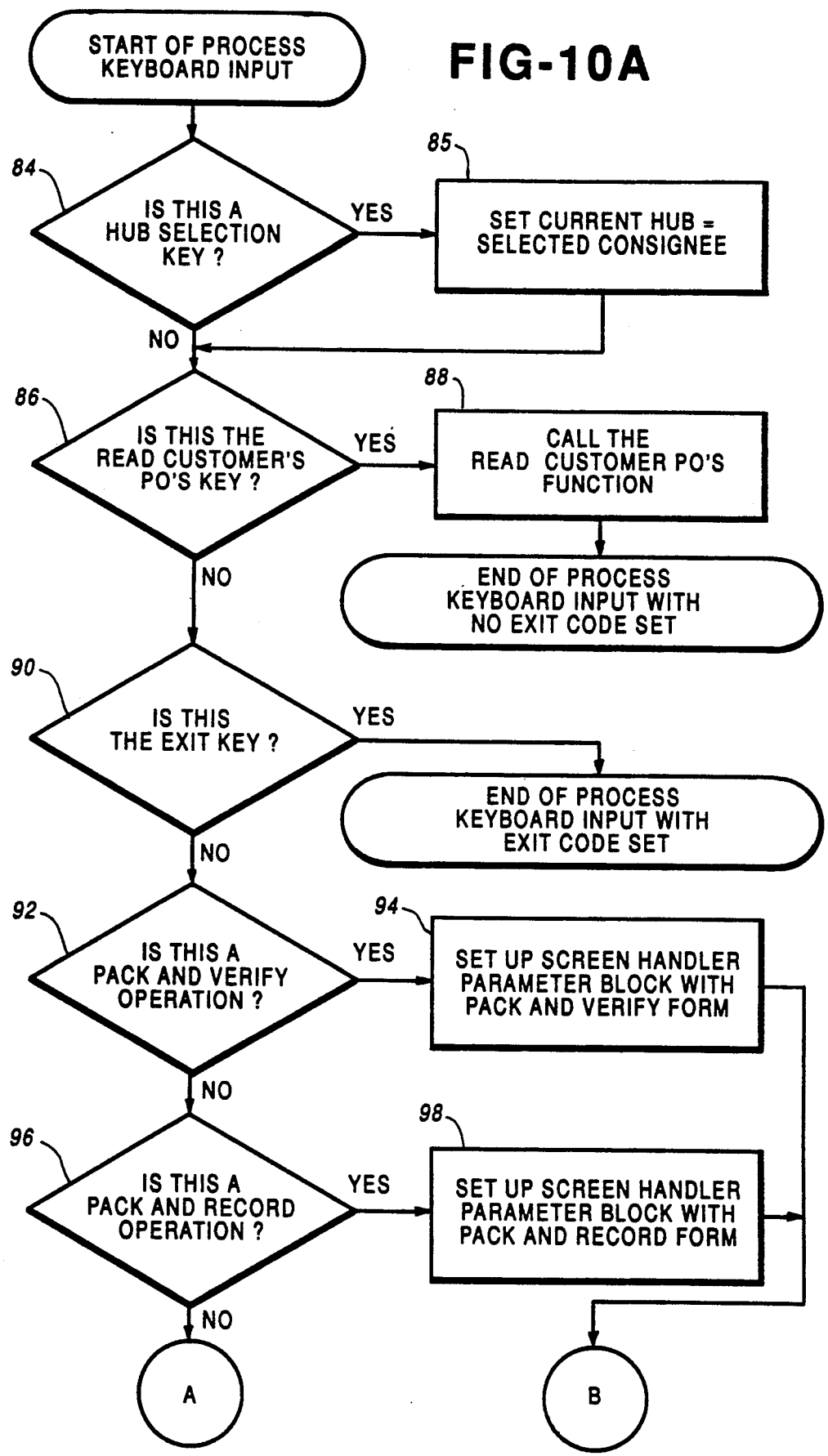
FIGS. 10A-B illustrate a Process Keyboard Input routine called by the routine depicted in FIGS. 9A-B.
Figure 10B:
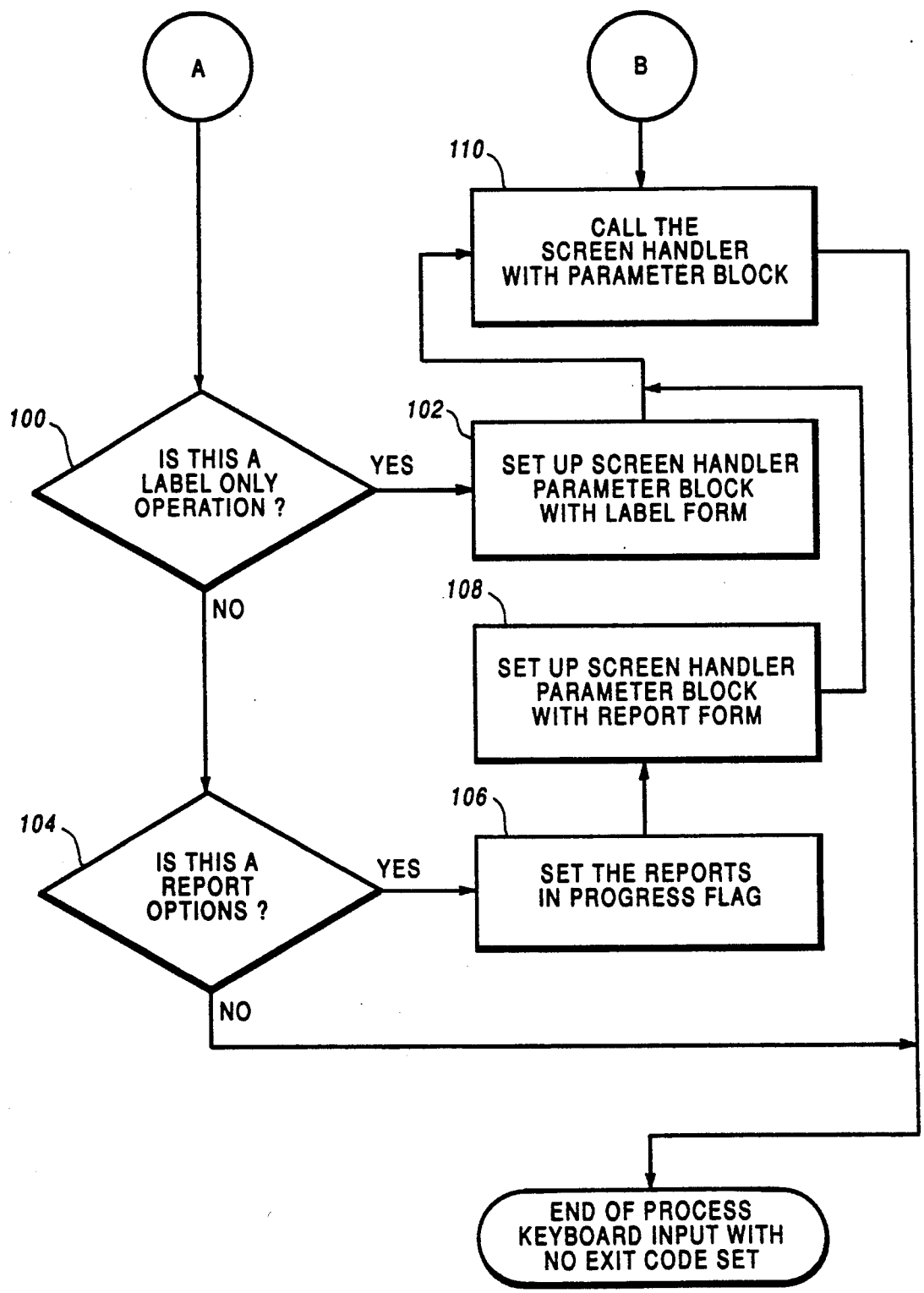

A flow chart illustrating the manager routines of the controller 34 are shown in FIGS. 9A $\propto$ B and FIGS. 10A-B. As shown in FIGS. 9A-B, the processor 13 at a block 50 initializes various system-wide variables; reading in to the memory 15 the purchase order configuration files 25 associated with each of the consignees for which the system 10 has been set up. During the initialization at block 50, the software necessary for the operation of the system is loaded. If the processor detects at block 52 an error in the initialization process, it proceeds to block 56 to display an error message on the display 14. Otherwise, the processor proceeds to block 54 to obtain the users login identification and to set any restrictions associated with the particular user identification. If the system determines at block 58 that the initial user login is correct, it proceeds to block 60 to determine whether the information depicted on the display 14 should be updated. If so, the processor proceeds to block 62 to update the functions depicted on the display 14 based on the functions that are allowable for the particular user. Thereafter, at block 64, the processor controls the display 14 to depict the main menu as illustrated in FIG. 4. The processor 13 determines at a block 66 shown in FIG. 9B whether a keyboard character has been entered by the user and if so, the processor proceeds to block 68 to process the keyboard input as discussed below with reference to FIGS. 10A-B. After processing the keyboard input, the processor proceeds to block 70 to determine whether the exit key was processed and if so, proceeds to block 72 to save the order count values for each consignee listed on the main menu. It is noted that the order count value depicted in blocks 64 and 72 refers to the number of outstanding purchase orders to be processed for a particular consignee. At a block 74, the processor determines whether the screen handler software routine has issued a Done message and if so, the processor proceeds to block 76 to determine whether report processing was in progress. If so, the processor at block 78 calls a report processing module and returns to block 60. If the processor determines at a block 80 that a new purchase order has been received, the processor at a block 82 locates the consignee from whom the purchase order was received and increments by one the purchase order count associated with that particular consignee.

The processor of the computer 12 operates in accordance with the flow chart depicted in FIGS. 10A-B to process a keyboard input when the main menu is depicted on the display 14 as follows. At a block 84, the processor 13 determines whether a consignee has been selected from the main menu and if so, the processor sets a value representing the current consignee equal to the consignee selected by the user at a block 85. It is noted that the terms hub and consignee are used interchangeably herein. At a block 86, the processor 13 determines whether the Read Customer POs mode has been selected from the main menu by a user and if so, the processor 13 proceeds to block 88 to call the purchase order translator 33 to translate the purchase order flat file 24 associated with each installed consignee. At block 90 the processor determines whether the user has selected to exit the system and if not, the processor proceeds to block 92. At block 92, the processor determines whether the Pack and Verify mode of operation has been selected by the user from the main menu and if so, the processor at a block 94 sets a parameter for the display screen handler depicted in FIG. 14 et seq. to indicate that the Pack and Verify display screen information should be depicted on the display 14 for the selected consignee. If the processor determines at a block 96 that the user has selected the Pack and Record mode of operation, the processor at block 98 sets the screen handler routine with the parameter identifying the Pack and Record display screen. Similarly, if the processor determines at a block 100 that the user has selected the Label Only mode of operation, the processor at a block 102 sets the parameter for the screen handler routine indicating the Label Only display screen file for the selected consignee. If the processor determines at a block 104 that the user has selected the Reports mode of operation, the processor proceeds to block 106. At block 106 the processor sets a reports in progress flag and proceeds to block 108 to set the parameter for the screen handle routine with a reports display screen. From blocks 94, 98, 102 and 108 the processor proceeds to block 110 to call the screen handler routine depicted in FIG. 14 with the appropriate parameter block being set.

The purchase order translator routine 33 called by the processor at block 88 is depicted in FIG. 11. As shown therein, the processor 13 at a block 112 first determines whether a purchase order flat file 24 exists for the user selected hub, i.e. whether data for at least one purchase order has been received from the selected consignee via the communication interface 32. If so, the processor 13 proceeds to block 114 to determine whether a configuration file 25 exists for the selected consignee. If a configuration file 25 does not exist for the selected consignee, the purchase order translator 33 cannot translate a purchase order flat file for the consignee and the processor proceeds to block 116 to perform a clean up operation before ending the operation of the translator 33. If the data for at least one purchase order exists in a flat file 24 and the configuration file for the selected consignee exists, the processor proceeds to block 118 to read and validate the configuration file 25 associated with the selected consignee. Thereafter, at a block 120, the processor determines whether the end of the purchase order flat file for the user selected consignee has been reached. If not, at block 122 the processor reads in the data for a purchase order from the user selected consignees flat file and at block 124 processes the purchase order data in accordance with the flow chart depicted in FIG. 12. From block 124 the processor returns to block 120 to determine whether there is data for another purchase order in the consignees flat file and if so, the processor continues the translation of the flat file at block 124.

Figure 12:
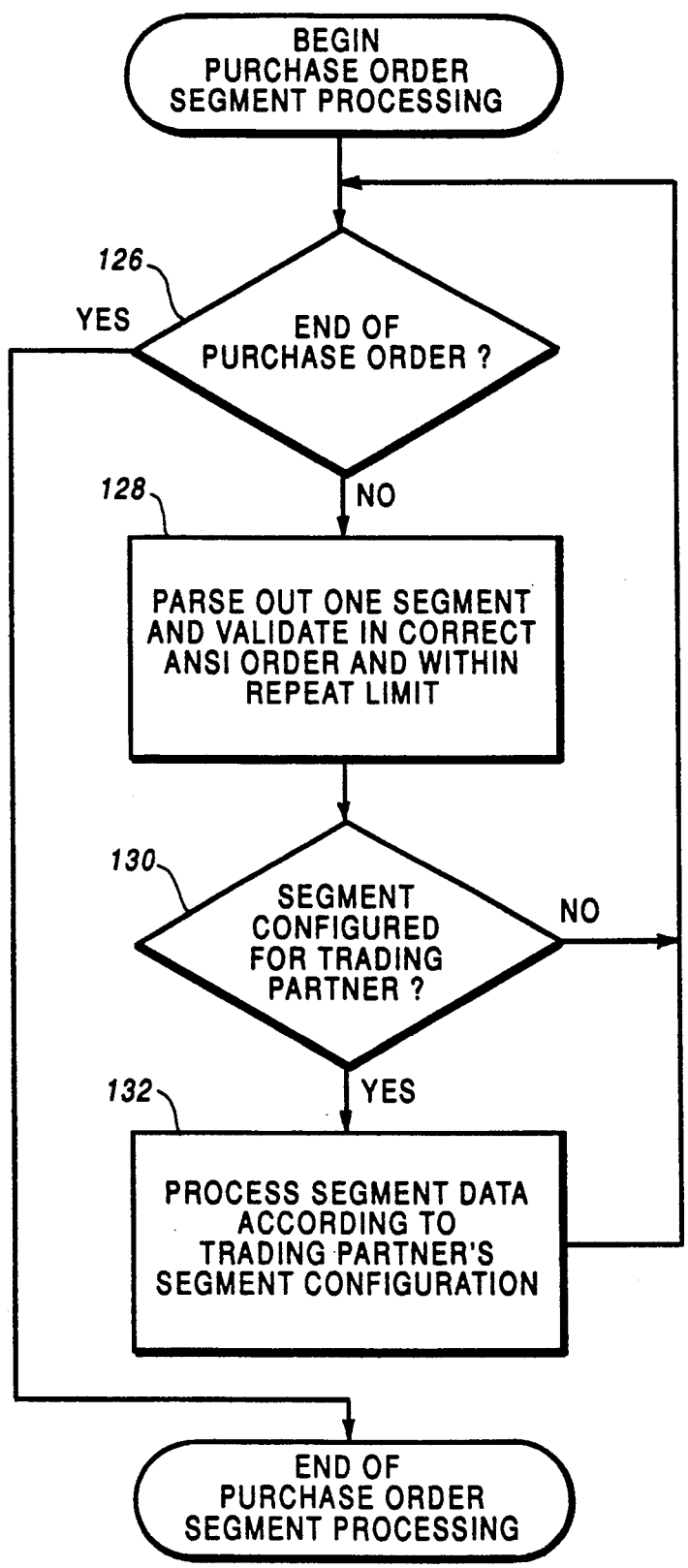
FIG. 12 is a flow chart illustrating a Purchase Order Segment Processing routine.

As shown in FIG. 12, at a block 126 the processor determines whether the end of the data for the purchase order has been reached yet and if not, the processor proceeds to block 128. At block 128, the processor parses out one segment of data for the purchase order and validates the segment. Thereafter, at a block 130, the processor determines whether the parsed segment is configured for the selected consignee and if so, the processor at block 132 processes the segment data according to the selected consignees configuration file 25 as described below with reference to FIG. 13.

Figure 13:
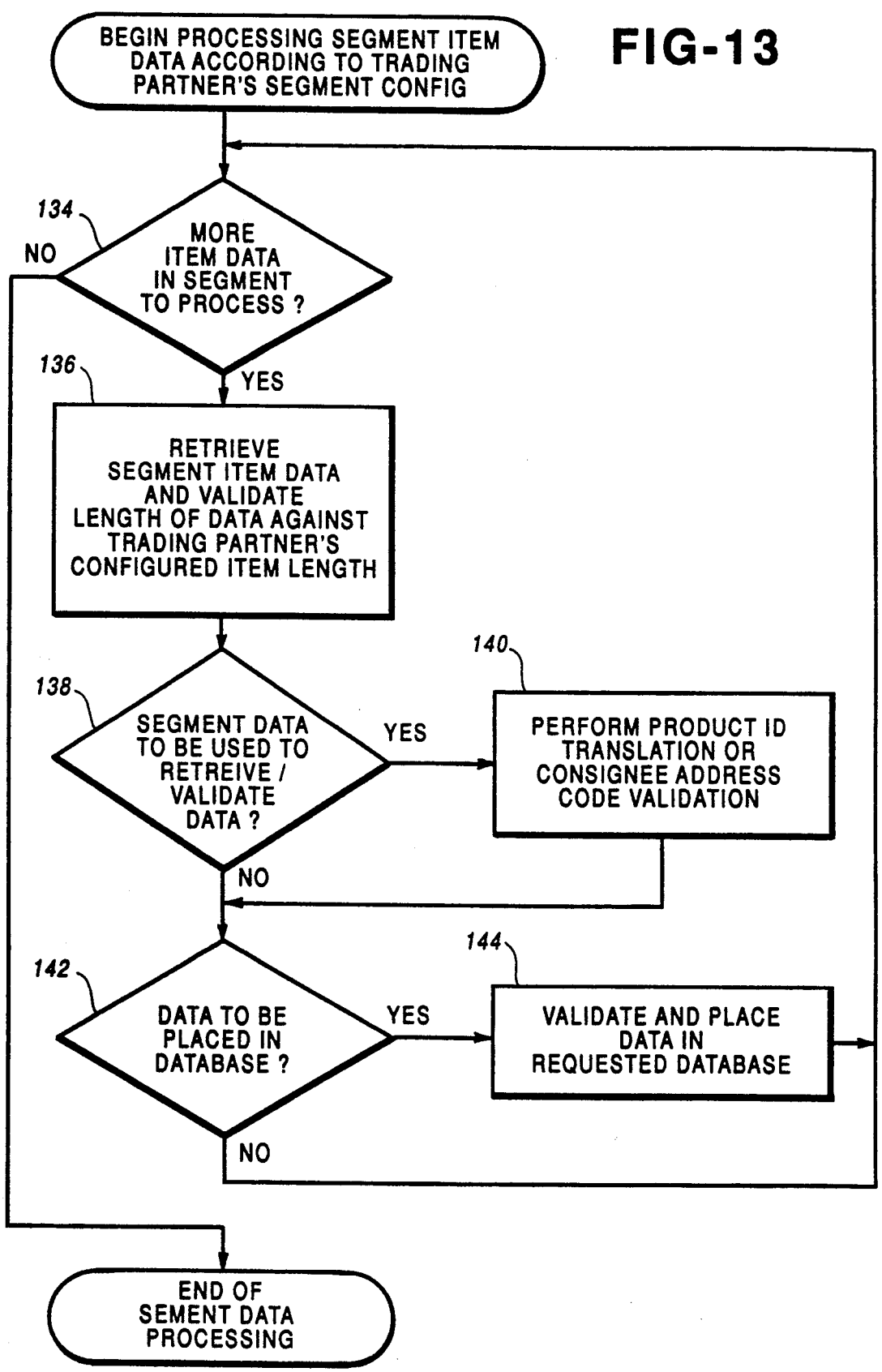
FIG. 13 is a flow chart illustrating a Segment Item Data Processing routine.

Upon entering the routine depicted in FIG. 13, the processor at a block 134 first determines whether there is more item data in the segment to process. If so, the processor at block 136 retrieves the segment item data and validates the length of the data against the length information stored in the consignee's configuration file 25. At block 138 the processor determines whether the segment data is to be used to retrieve other data or to validate data and if so, the processor proceeds to block 140. At block 140 the processor performs the product identification translation or a consignee address code validation as indicated by the segment data. At block 142 the processor determines whether the segment data is to be placed in the database 26 and if so, the processor at block 144 validates and places the data in the requested database, i.e. the purchase order header database 43, the purchase order line item database 45 or the consignee address database.

Figure 14:
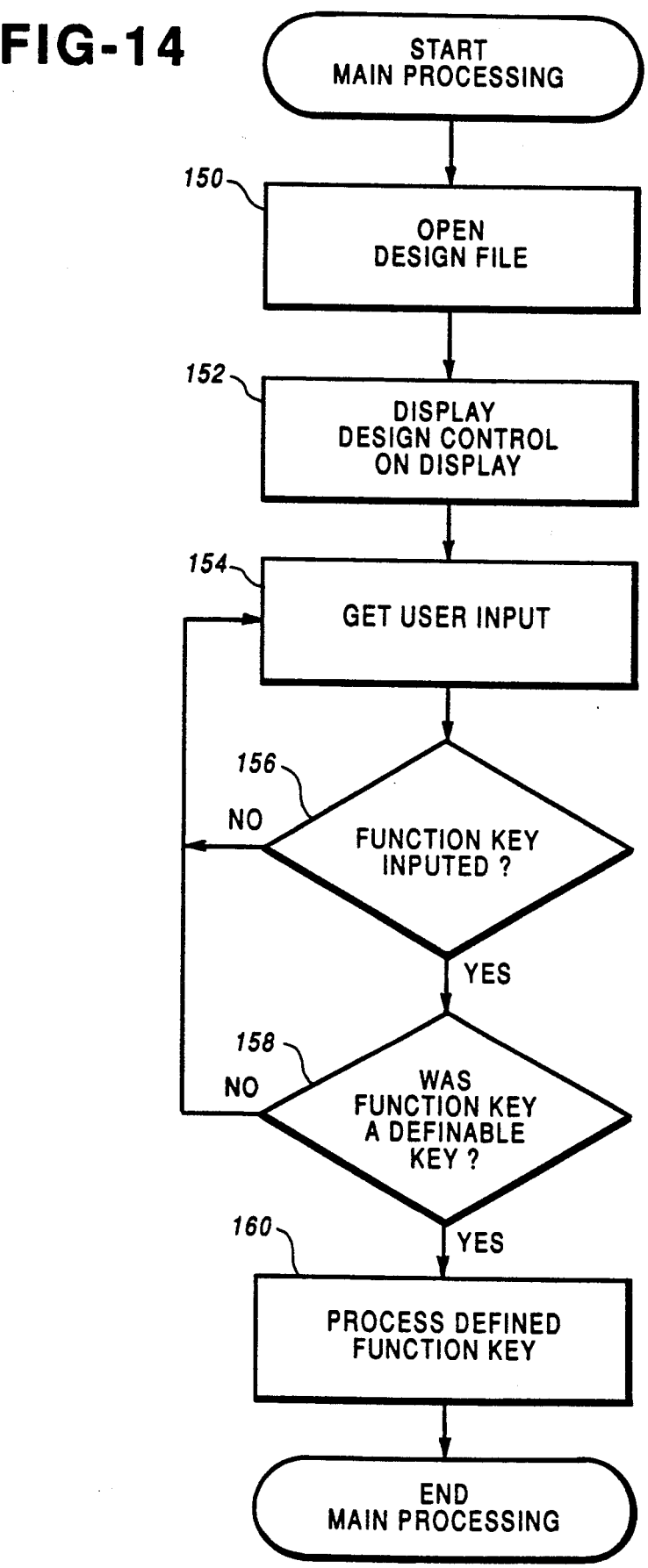
FIG. 14 is a flow chart illustrating a Pack, Verify and Print Controller routine.
Figure 15:
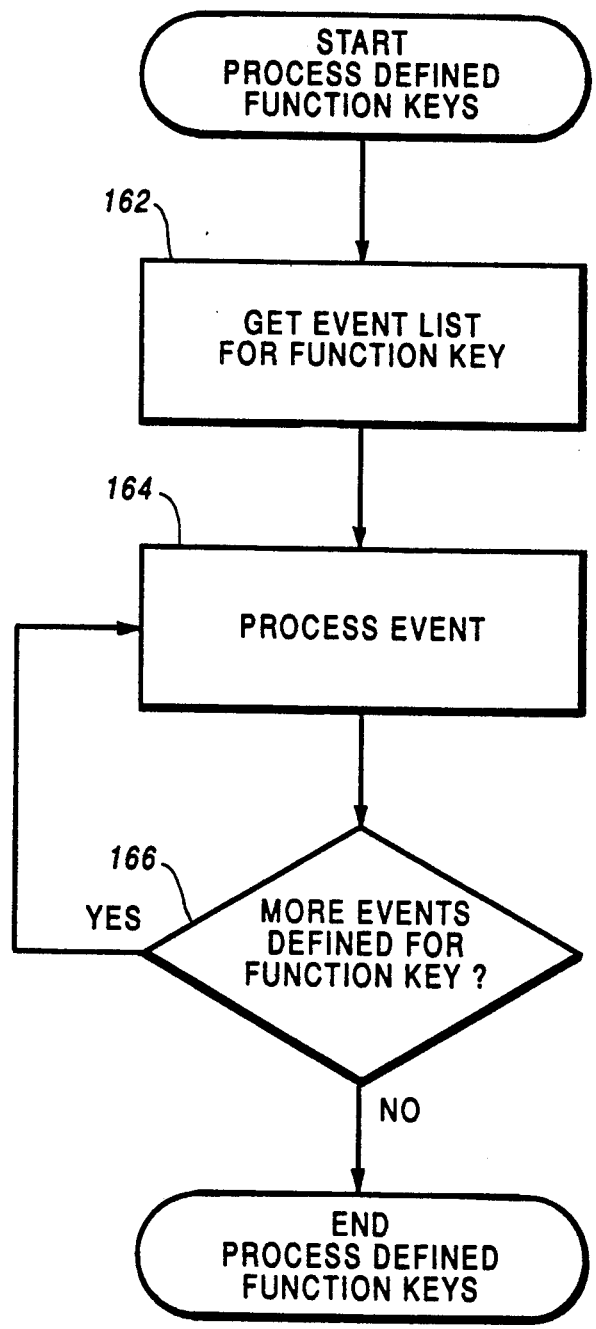
FIG. 15 is a flow chart illustrating a Process Defined Function Keys routine.
Figure 16A:
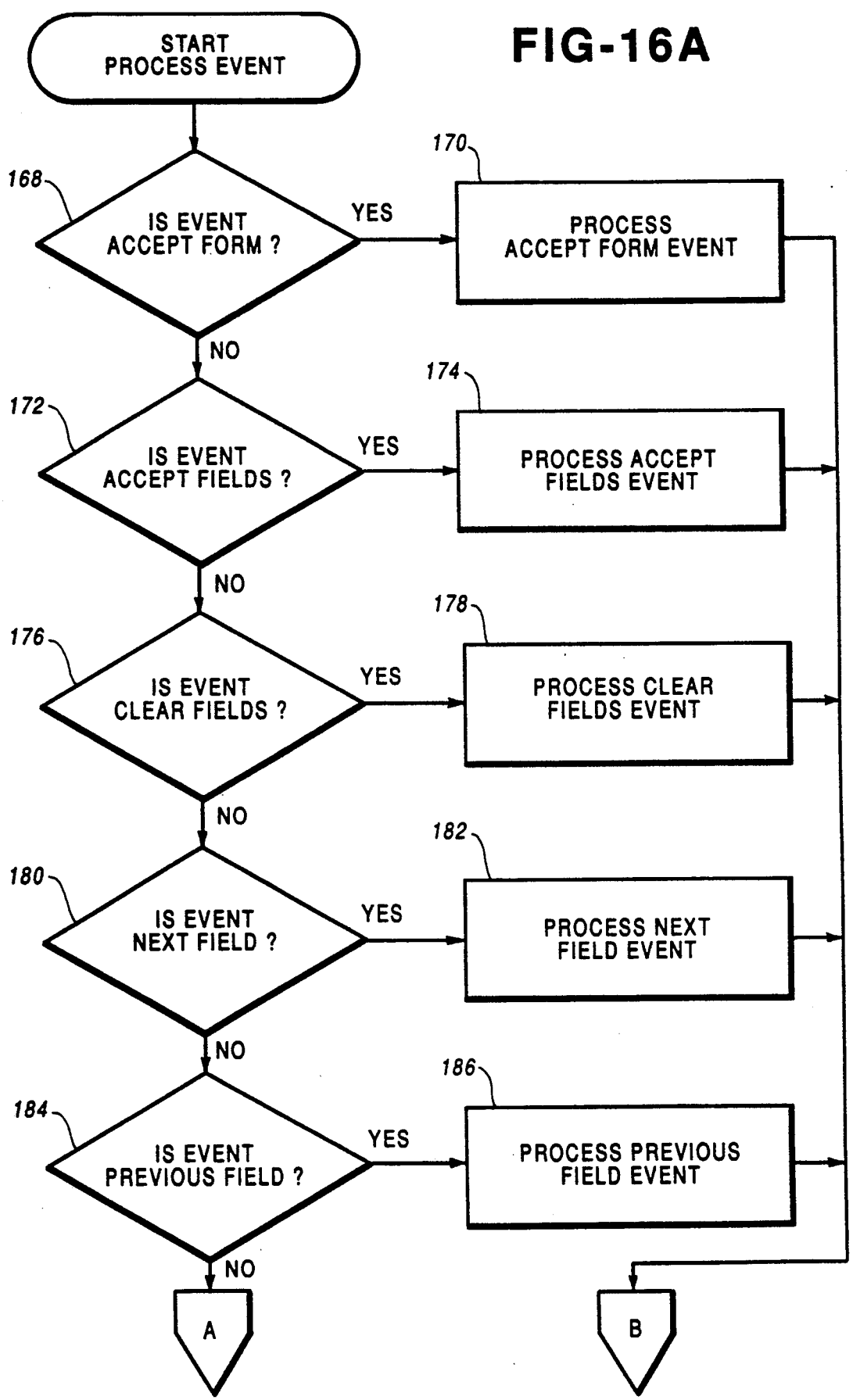
Figure 16C:
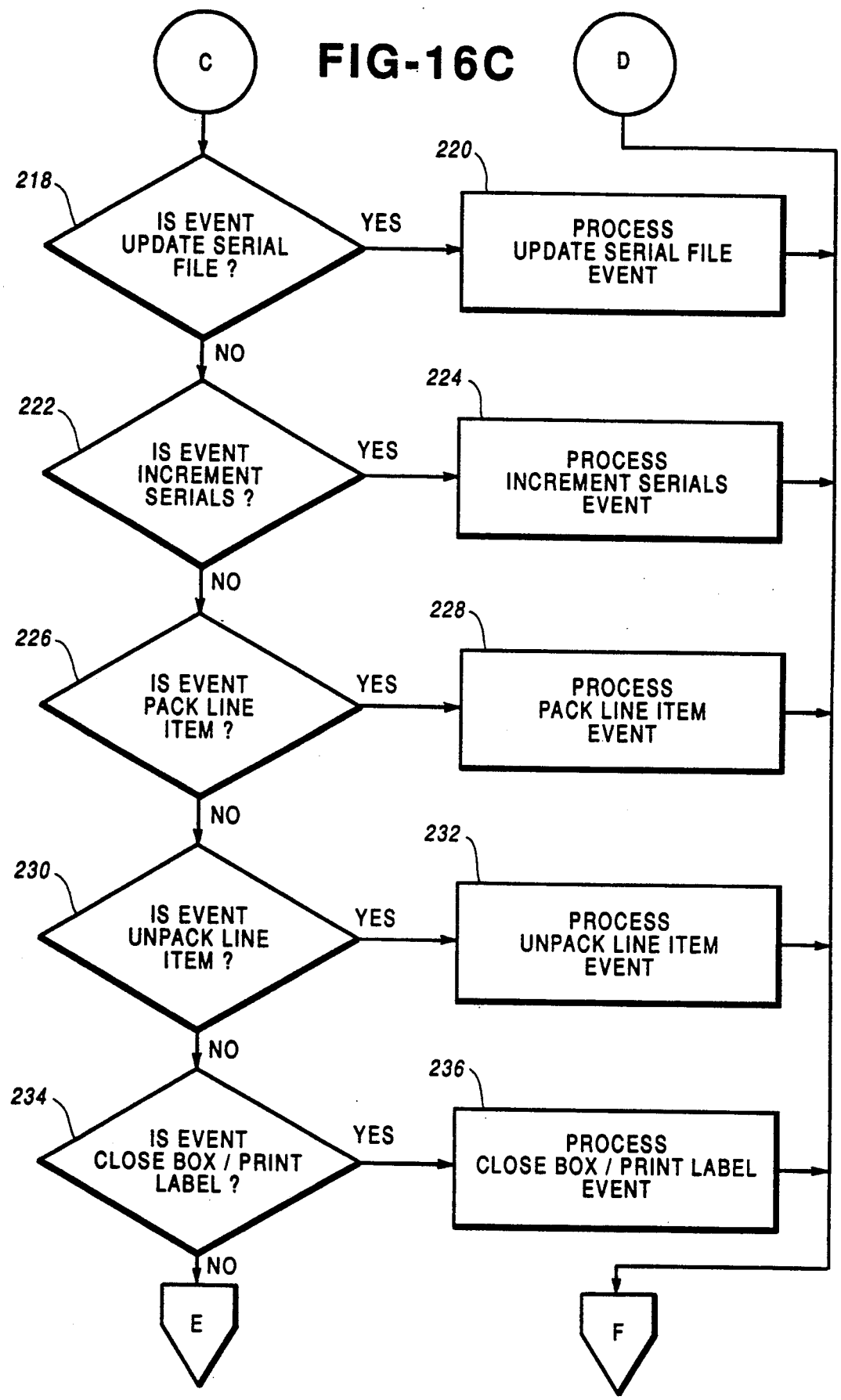
Figure 16D:
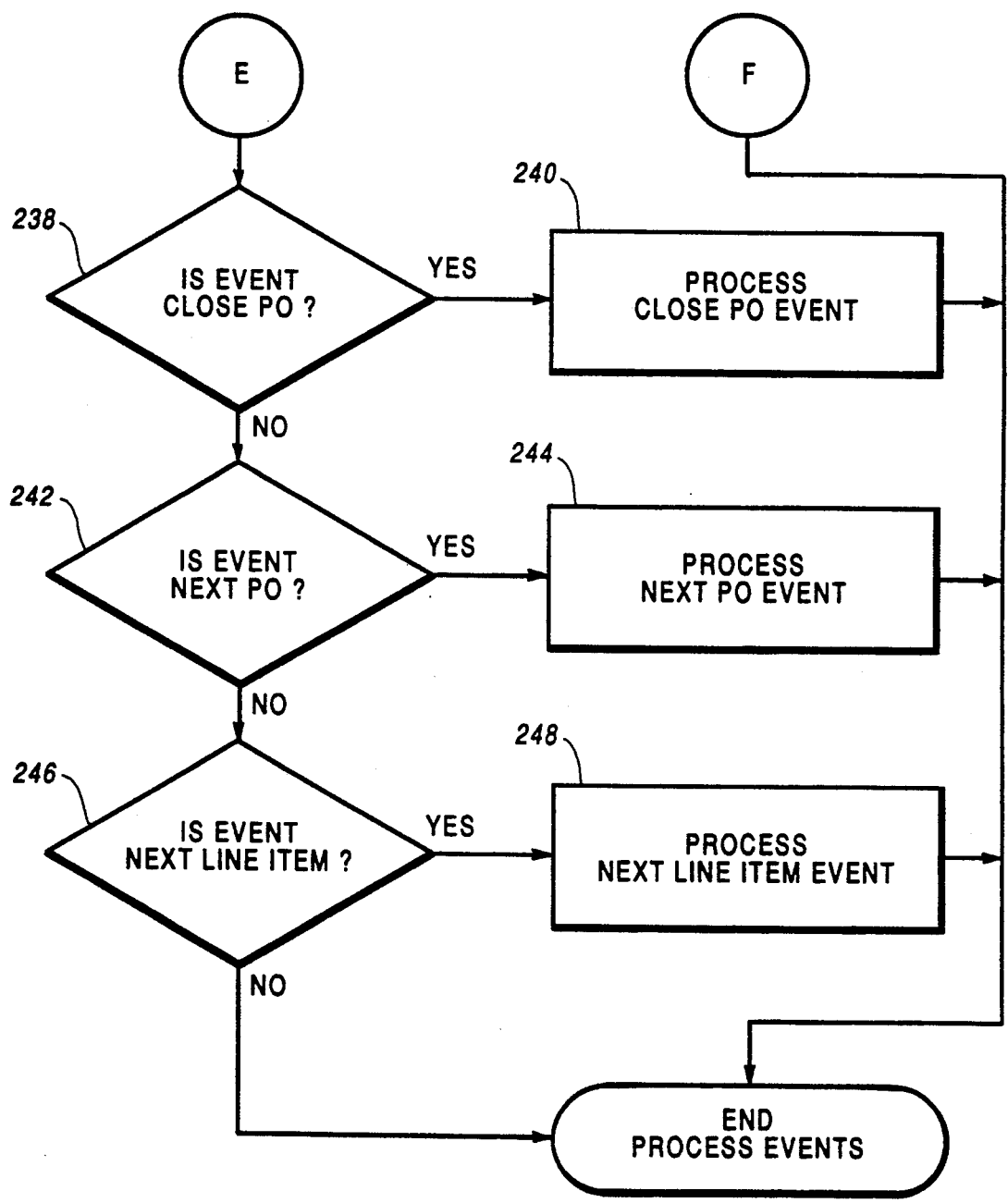

The screen handler portion of the controller routine 34 called at block 110 is depicted in FIGS. 14-40. As shown in FIG. 14 the processor of the computer 12 when operating in accordance with the screen handler first opens, at a block 150, the display screen file 27 associated with the consignee selected by the user from the main menu. At a block 152 the processor controls to display of the prompt template for the selected mode of operation on the display 14. Thereafter, at a block 156 the processor determines whether a function key was input and if so, at block 158, the processor determines whether the function key is defined in the display screen file 27 associated with the selected consignee. If it is, the processor at block 160 implements a Process Defined Function Key routine depicted in FIG. 15.

Upon entering the Process Defined Function Keys routine, the processor at block 162 retrieves from the display screen file 27 the consignee defined event list for the function key actuated by the user. It is noted that the function keys that can be used to trigger an event list are the keys F1-F12, the Enter key the Escape key, the Tab key and a combination of the shift and tab keys of the keyboard 16. At block 164 the processor processes the first event identified in the event list in accordance with the flow chart depicted in FIGS. 16A-D and thereafter proceeds to block 166 to determine whether more than one event has been defined for the function key. If so, the processor returns to block 164 to process each of the events associated with the function key in the display screen file 27 in the order in which the events are listed. As discussed above, multiple events, i.e. purchase order processing operations may be implemented by the processor in accordance with the controller 34 as defined by the information stored in the display screen file 27 associated with a selected consignee.

In order to process a function key event, the processor, as shown in FIGS. 16A-D determines which event is to be processed and calls a subroutine associated with that particular event. At a block 168, the processor determines whether the event to be processed is the Accept Form event and if so, proceeds to block 170 to process the Accept Form event. The operation of this event is dependent upon the mode that the screen handler routine is in at the time of execution. If the screen handler routine is running in a Stand Alone mode, the program will be closed when the event executes. If, however, the handler is in a mode wherein it was called from another program such as the Manager routine, a message is sent to that routine to notify the manager of the change. If the processor determines at a block 172 that the event to be processed is the Accept Fields event, that event is processed at block 174. The Accept Fields event performs a validation function that as defined in the consignee's display screen file 27 on each of the display data fields. If an error occurs, the validation process is terminated and the focus of the display is set on the display data field that did not pass validation, an indication of the problem being depicted on the display 14. If the processor determines at a block 176 that the event to be processed is the Clear Fields event, this event is processed at block 178. The Clear Fields event clears all data fields that have not been defined as global fields in the consignee's display screen file 27. If the processor determines at block 180 that the event to be processed is the Next Field event, the processor proceeds to block 182 to process the event. The Next Field event is used to place input focus on the display data field that was defined immediately after the field identified as the current field. If the current field is the last display data field in the prompt template, focus is set on the first display data field of the template. If the processor determines at a block 184 that the event to be processed is the Previous Field event, the processor proceeds to block 186 to process this event. The Previous Field is used to place the display's focus on the display data field that was defined immediately preceding the current display data field. If the current display data field is the first field of the prompt template, focus is set on the last field of the screen. If the processor determines at block 188 that the event to be processed is the Write Database, the processor proceeds to block 200 to process this event. The Write Database event will cause all database operations that are defined in the consignee's display screen file 27 in association with this event to be performed. If the processor determines at a block 202 that the event Update Database is to be processed, the processor proceeds to block 204 to process this event. The Update Database event is used to perform all database operations that are defined in the display screen file 27 in association with the Update Database event. If the processor determines that the event to be processed is the Print event, the processor proceeds to block 208 to process this event as discussed below. If the processor determines at block 210 that the event to be processed is the Write Flat File, the processor proceeds to block 212 to process this event as discussed below. If the processor determines at block 214 that the block to be processed is the Increment/Decrement event, the processor proceeds to block 216 to process this event. The Increment/Decrement event causes all fields that have been defined with this attribute to be incremented or decremented by a defined amount. It is noted that this operation will not occur if the focus on the display 14 is on a display data field where an attribute for the event is not set. This allows the Increment/Decrement event to be restricted to particular display data fields. If the processor determines at block 218 that the event to be processed is the Update Serial File event the processor proceeds to block 220. This event causes the current value of any field whose source is a serial file to be written to a serial file. If the processor determines at block 222 that the event to be processed is the Increment Serials event, the processor proceeds to block 224. The Increment Serials event will cause an increment function to be performed on any data field whose source is the serial file. If the processor determines at block 226 that a Pack Line Item event is to be processed, the processor proceeds to block 228. When this event is processed, the open line item in a line item database being processed for a purchase order is marked with a current purchase order tracking number and a comparison of the quantity packed versus quantity ordered is performed. If the quantity packed is greater than or equal to the quantity ordered the line item is marked in the database 26 as packed. The focus on the display is then moved to the Purchase Order Line Item Key field so that the next item to be packed can be processed. If the quantity packed is less than the quantity order, an additional line item record is created and the line item information is copied into it as discussed in detail below. The new line item record is marked as packed and is placed into the line item list for the current purchase order. The quantity packed is then subtracted from the quantity ordered and the quantity to pack is updated on the display 14 to reflect the remaining amount to be packed. If the processor determines at block 230 that the event to be processed is the unpack line item the processor proceeds to block 232. This event enables a user to unpack a line item from the current container being processed. If a line item is mistakenly packed into a container, this event displays a dialog to cause the user to enter the line item that is to be unpacked. The specified line item is then removed from the box or container and the quantity to pack field is updated. If the processor determines at block 234 that the event to be processed is the Close Box/Print Label event, the processor proceeds to block 236. This event is processed differently depending upon the type of line item being processed. If the line item is a single item per carton type of item, for each such item that is to be packed a new line item with a unique purchase order tracking number is created and a compliance label is generated. The line items are then updated with a complete UCC 128 barcode tracking number. After the last label has been printed, the user is prompted to scan the last label and to verify that the barcoded data is correct. If the line item was not a single item per carton type, all line items packed in the current box are marked with a complete UCC 128 barcode tracking number. A single compliance shipping label is then generated with the information for the associated purchase order. All line items indicated as being packed in the box are then marked as such. If the processor determines that the event to be processed is the Close Purchase Order event, the processor proceeds to block 240. This event is selected by a user when the user has completed packing the items specified in the current purchase order. When this event is executed, each line item in the purchase order is validated to ensure that the order has been completely packed. If a line item is found where the accumulated total quantity packed is less than the quantity ordered, a message is displayed that prompts the user to abort the Close Purchase Order operation or to mark the line item as back ordered. If the validation is completed without being aborted by the user, the purchase order header record is copied to the packed purchase order database 28 and deleted from the open purchase order header database 26. Similarly, the line item data is copied from the memory to the packed purchase order database 28 and deleted from the open purchase order database 26. If the processor determines at a block 242 that the event to be processed is the Next Purchase Order event, the processor proceeds to block 244. This event will cause the data in the header database 43 for the next purchase order along with the data in the purchase order line item database 45 for that next purchase order to be loaded into the scratch pad memory 17 of the computer 12 for processing. The purchase order number associated with this purchase order is then placed in the purchase order display data field depicted on the screen of the display 14 so that the next purchase order associated with a particular consignee can be processed. If the processor determines at a block 246 that the event to be processed is the next line item event, the processor proceeds to block 248. This event will cause the next line item for the current purchase order number to be found and places this line item number in the line item display data field. All information associated with the line item field is then placed into the associated display data fields, the line item field typically being defined as a key display data field in the consignee's display screen file 27.

Figure 17:
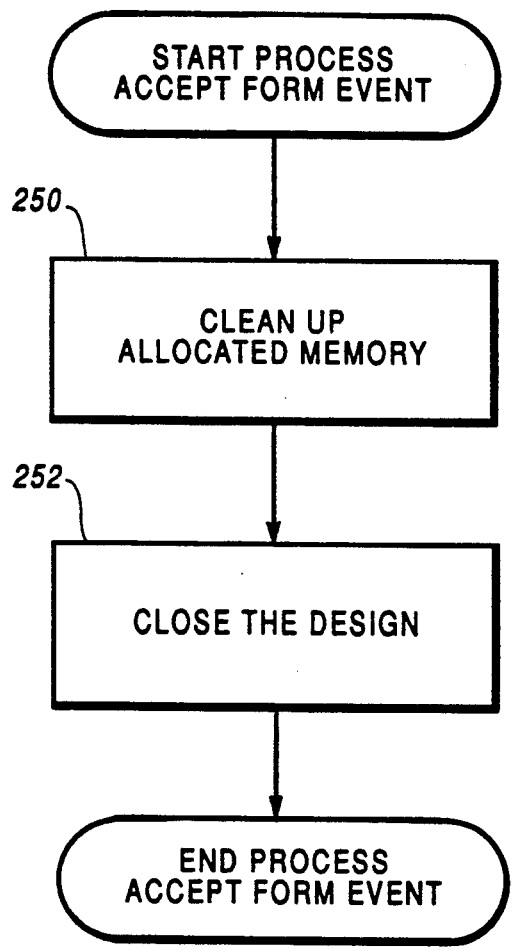
FIG. 17 is a flow chart illustrating a Process Accept Form Event routine.

The Accept Form event is processed in accordance with the flow chart depicted in FIG. 17. As shown therein the processor at block 250 cleans up the allocated memory and at block 252 closes the display screen file.

Figure 18:
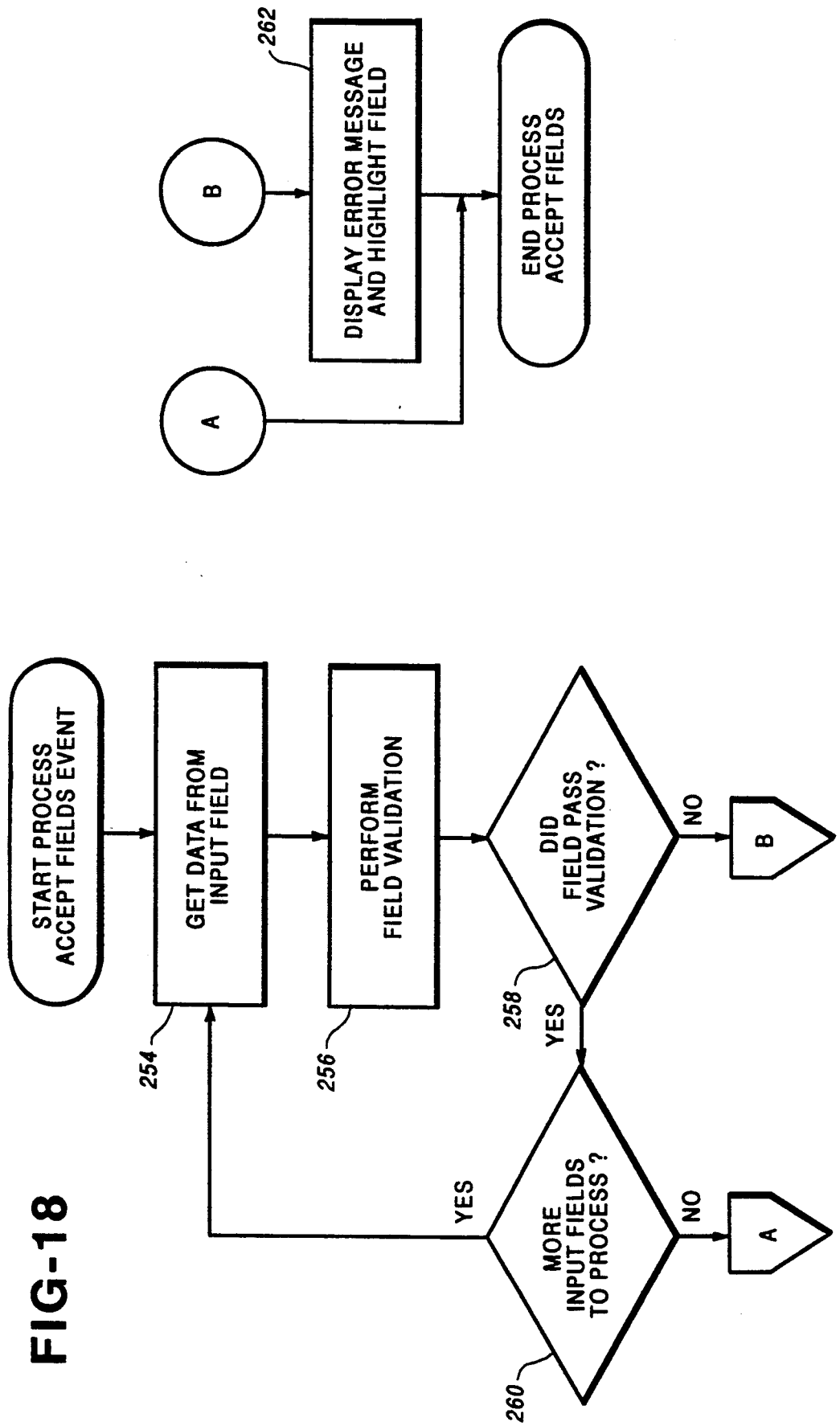
FIG. 18 is a flow chart illustrating a Process Accept Fields Event routine.
Figure 19:
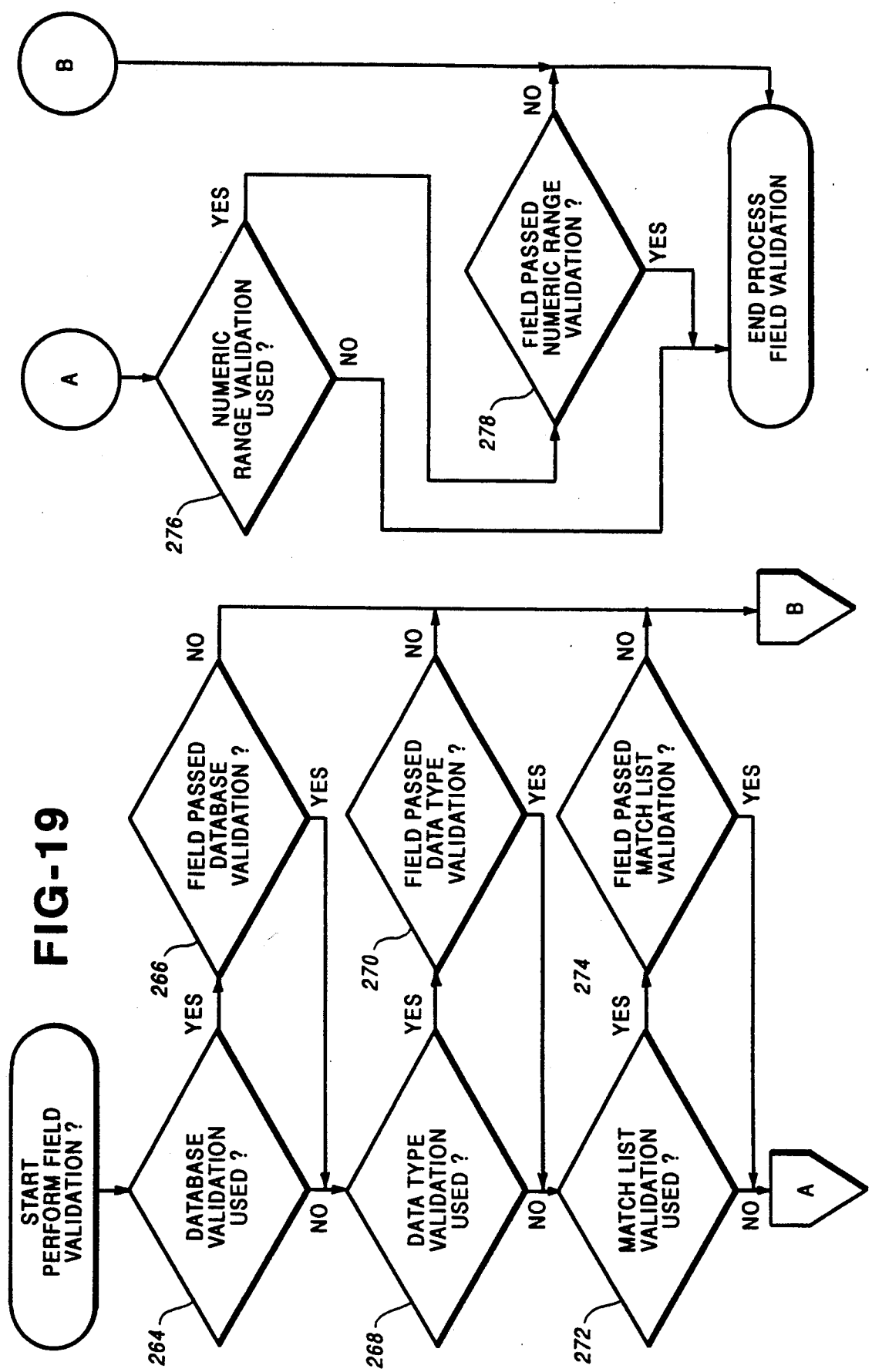
FIG. 19 is a flow chart illustrating a Perform Field Validation routine.

The processor 13 processes the Accept Fields event in accordance with the flow chart depicted in FIG. 18. At a block 254, the processor 13 first retrieves the data entered for a display data field of the prompt template depicted on the display 14 and at block 256, the processor performs a field validation as depicted in FIG. 19. Thereafter, the processor determines at block 258 whether the fields passed validation and if so, the processor 13 proceeds to block 260 to store the entered data in association with the display data field for which it was entered and then determines whether more input fields are to be processed. If the field did not pass validation, the processor at block 266 causes an error message to be depicted on the display 14 and the field that did not pass validation is highlighted.

The processor validates a field in accordance with the flow chart depicted in FIG. 19. The processor 13 at block 264 first determines whether database validation is to be used. If so, the database validation is performed and the processor 13 determines whether the field passed the validation at block 266. If so, the processor proceeds to block 268. At block 268 the processor determines whether a data type validation is to be performed and if so, the processor performs this type of validation and proceeds to block 270 to determine whether the field passed this type of validation. If so, the processor proceeds to block 272 to determine whether a match list validation is to be used. If so, the processor proceeds from block 272 to block 274 to perform the match list validation and to determine whether the field passed. If so, the processor proceeds to block 276 to determine whether numeric range validation is to be used. If so, the processor performs this type of validation and at block 278 determines whether the field passed. When a database validation is employed, the display screen file 27 identifies the database field to which the input field is to be compared and also specifies the type of comparison to be performed, i.e. an equal to; greater than; or greater than or equal to comparison. For a data type validation, the display screen file 27 designates field restrictions for the data such as whether the data entered for this field must be numeric only, alpha only, alphanumeric, etc. Further, the field may be divided into characters such that the first group of characters may be restricted one way whereas the next group of characters may be restricted a different way, a template for the characters and their restrictions being stored in the display screen data file 27. For a data type validation; valid characters may be specified for a field. For a match list validation, the processor determines whether the data entered for the field matches data stored in an associated match list in the display screen file 27. If a numeric range validation is used, the entered data must be a number within a range specified in the display screen file 27.

Figure 20:
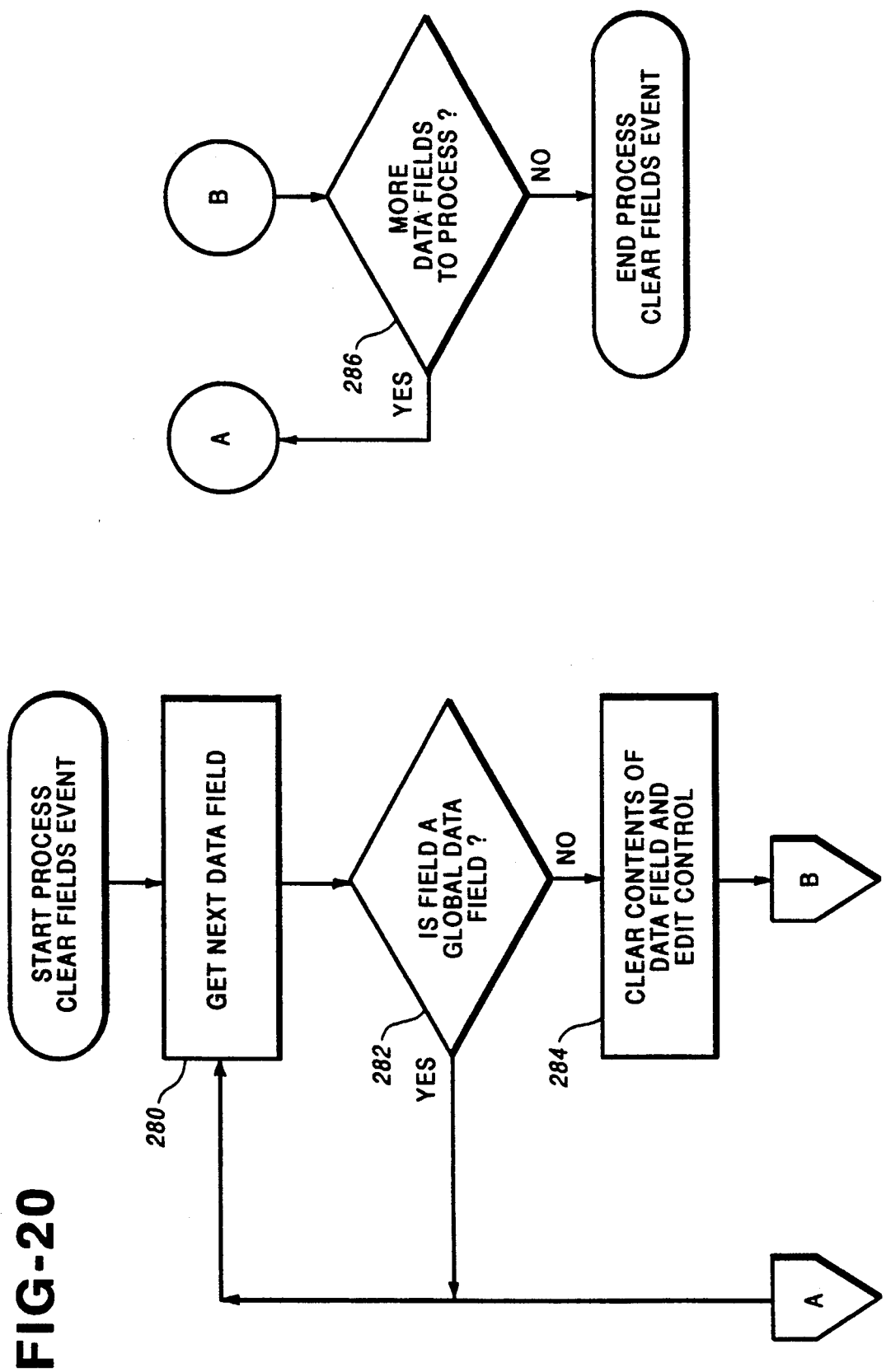
FIG. 20 is a flow chart illustrating a Process Clear Fields Event routine.

The processing of the Clear Fields event is illustrated in FIG. 20. The processor 13 at a block 280 first gets a data field and at block 282 the processor determines whether the field is a global data field or not. If the field is a global data field, the processor returns to block 280 to get the next data field since data fields that are defined as global in the display screen file 27 are not cleared by the Clear Fields event. If the field obtained at block 28 is not a global data field, the processor proceeds from block 282 to block 284. At block 284, the processor clears the contents of the data field. The processor then proceeds to block 286 to determine whether there are more data fields to process and if so, the processor returns to block 280.

The Next Field event is processed in accordance with the flow chart illustrated in FIG. 21. The processor at a block 288 gets the display data field that is identified as the current field. Thereafter, at block 290 the processor implements a field check routine as described in detail below with respect to FIGS. 22-25. At a block 292 the processor determines whether the current field is the last field of the prompt template depicted on the screen of the display 14 and if not, proceeds to block 294 to place the focus on the next display field of the prompt template. However, if the current field is the last field on the screen of the display 14, the processor proceeds to block 296. At block 296 the processor places the focus of the display 14 on the first displayed data of the prompt template.

Figure 22:
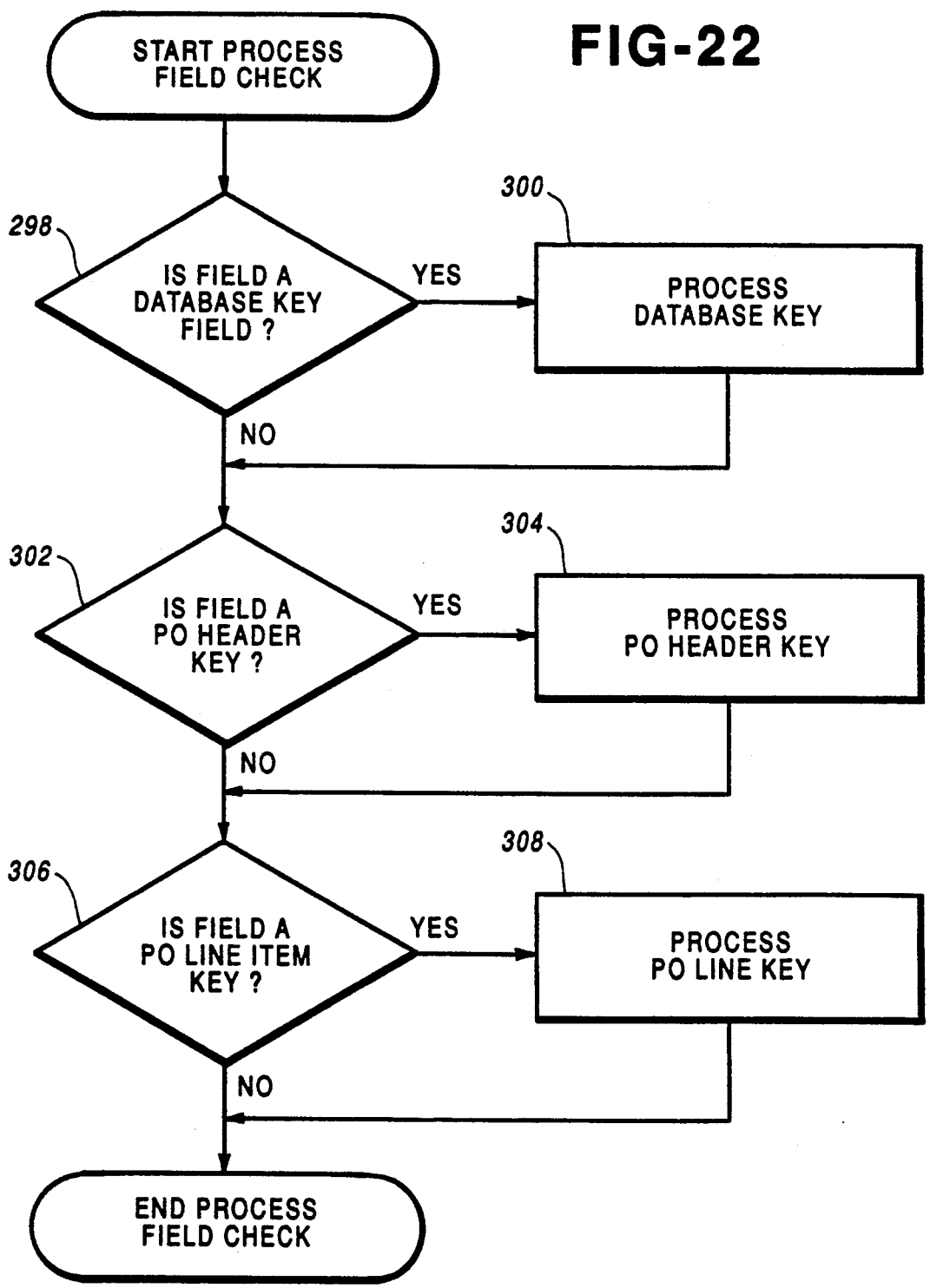
FIG. 22 is a flow chart illustrating a Process Field Check routine.
Figure 23:
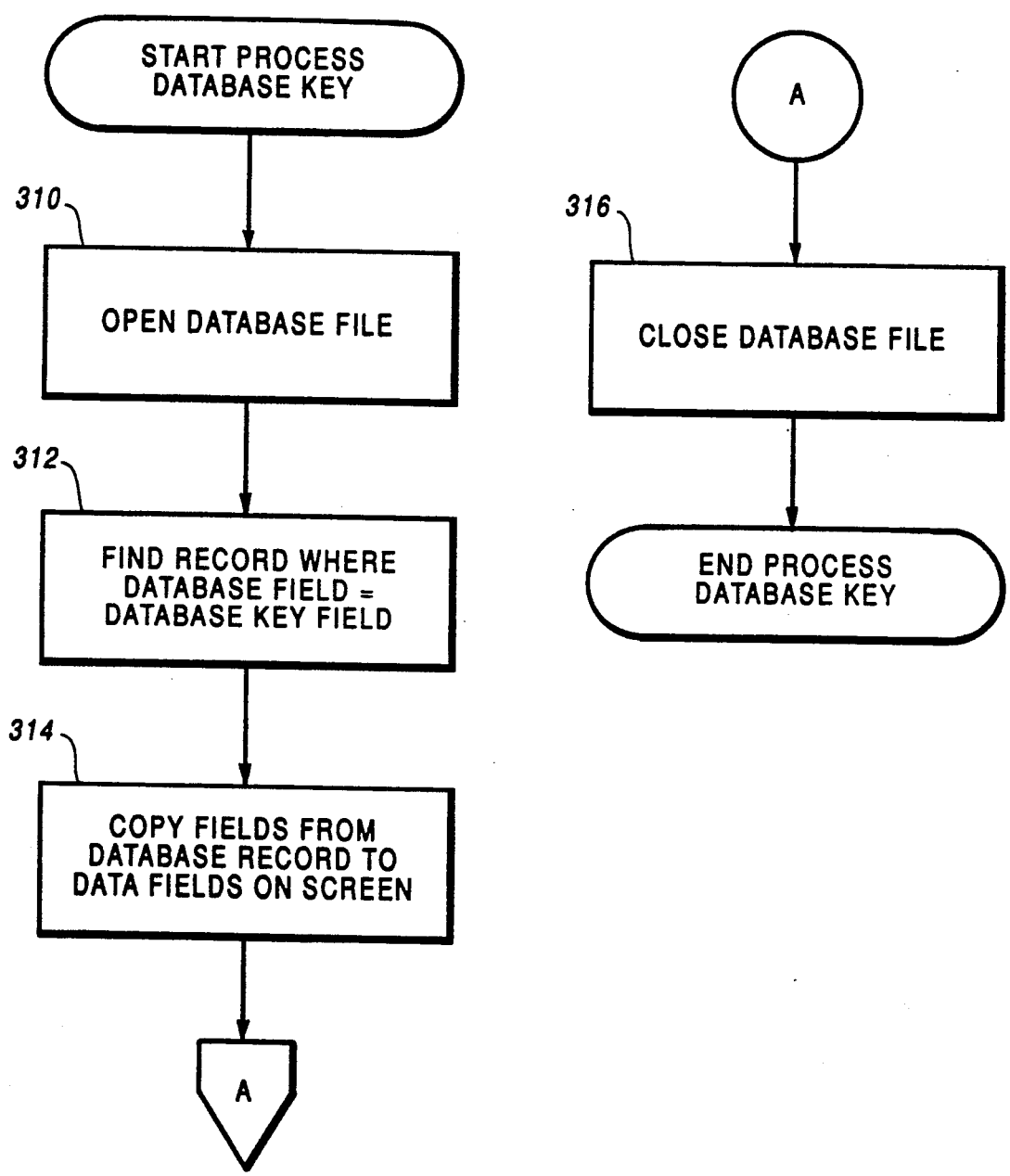
FIG. 23 is a flow chart illustrating a Process Database Key routine.

In accordance with the field check routine depicted in FIG. 22 the processor of the computer 12 determines at a block 298 whether the current field is a database key field and if so, proceeds to block 300 to process the database key field in accordance with the routine depicted in FIG. 23. If the processor determines at block 302 that the current field is a Purchase Order Header Key field, the processor proceeds to block 304 to process the field in accordance with the routine depicted in FIG. 24. If the processor determines at a block 306 that the current field is a Purchase Order Line Item Key field, the processor proceeds to block 308 to process the field in accordance with the flow chart depicted in FIG. 25. As shown in FIG. 23, to process a database key field, the processor at a block 310 first opens the database file. Thereafter, at block 312 the processor finds the record in the database where the field is equal to the current database key field. Thereafter, at a block 314 the processor copies the records found in the database at block 312 to the display data fields depicted on the screen of the display 14. At block 316, the processor closes the database that was opened at block 310.

Figure 24:
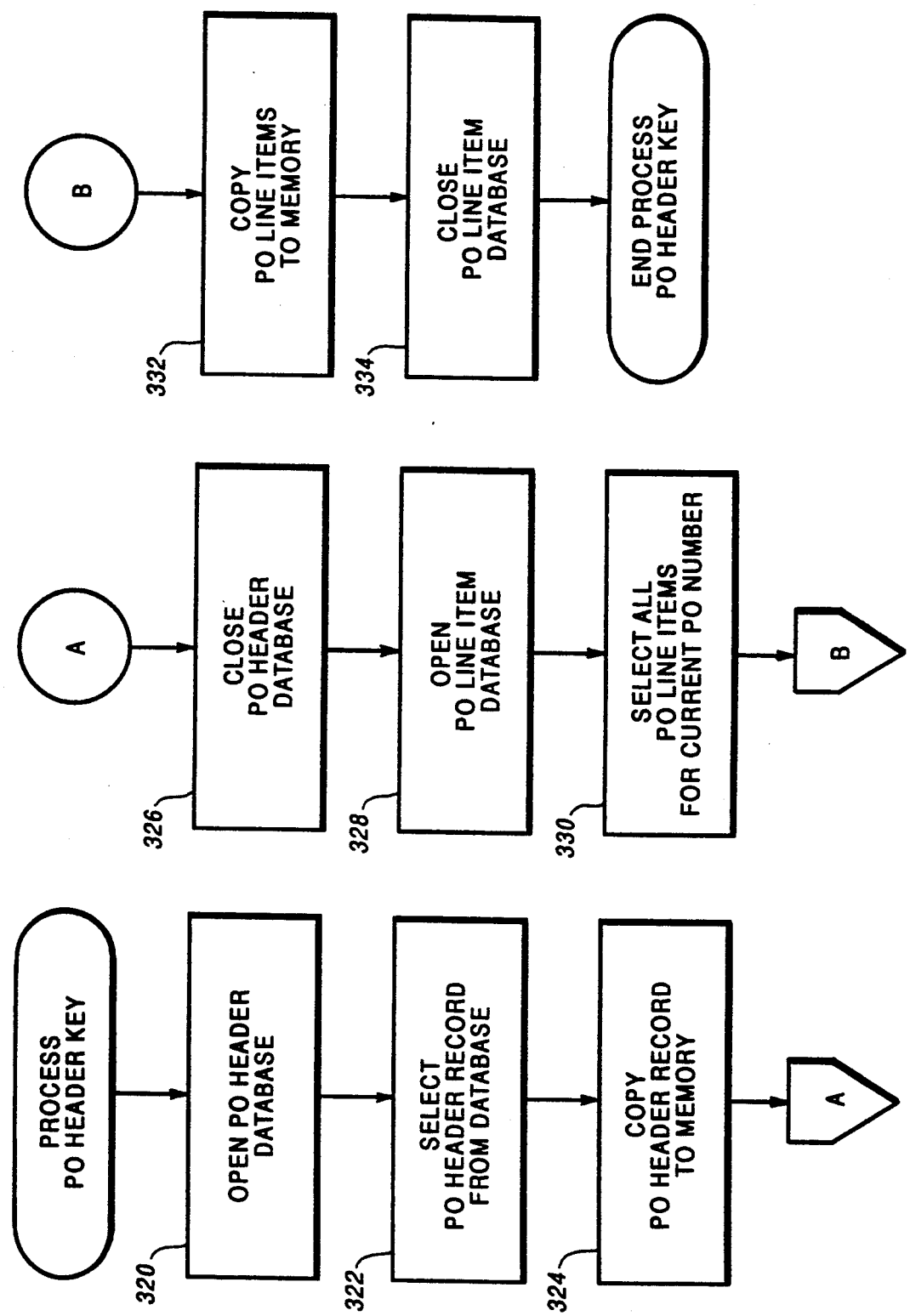
FIG. 24 is a flow chart illustrating a Process Purchase Order Header Key routine.

The processor operates in accordance with the flow chart depicted in FIG. 24 to process a Purchase Order Header Key field by opening at a block 320 the purchase order header database 43 and at block 322 selecting the purchase order header record being processed from the database. Thereafter, at a block 324 the processor 13 copies the purchase order header records selected at block 322 to the scratch pad portion 17 of the memory 15. At block 326 the processor 13 closes the purchase order header database 43 and at a block 328 opens the purchase order line item database 45. At block 330 the processor 13 selects all of the purchase order line items for the current purchase order number being processed and at block 332 copies those line items to the scratch pad memory 17. Thereafter, the processor at block 344 closes the purchase order line item database 45.

Figure 25:
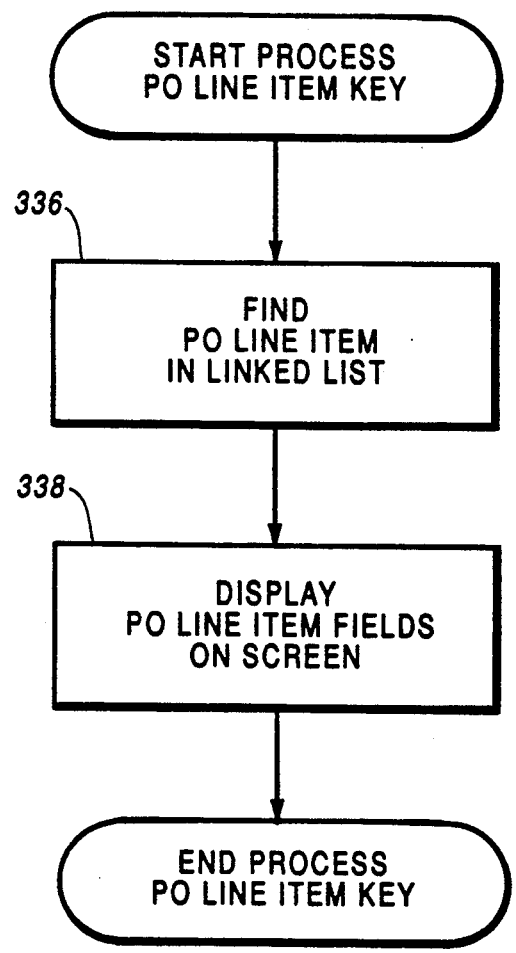
FIG. 25 is a flow chart illustrating a Process Purchase Order Line Item Key routine.

A Purchase Order Line Item Key display data field is processed in accordance with the flow chart depicted in FIG. 25. At a block 336 the processor 13 finds the purchase order line item in a list in the particular display screen file 27 that links the particular line item with other display data fields. Thereafter, at block 338 the processor 13 displays on the screen of the display 14 the information found for the line item key display data field as well as the information found for the linked display data fields.

Figure 26:
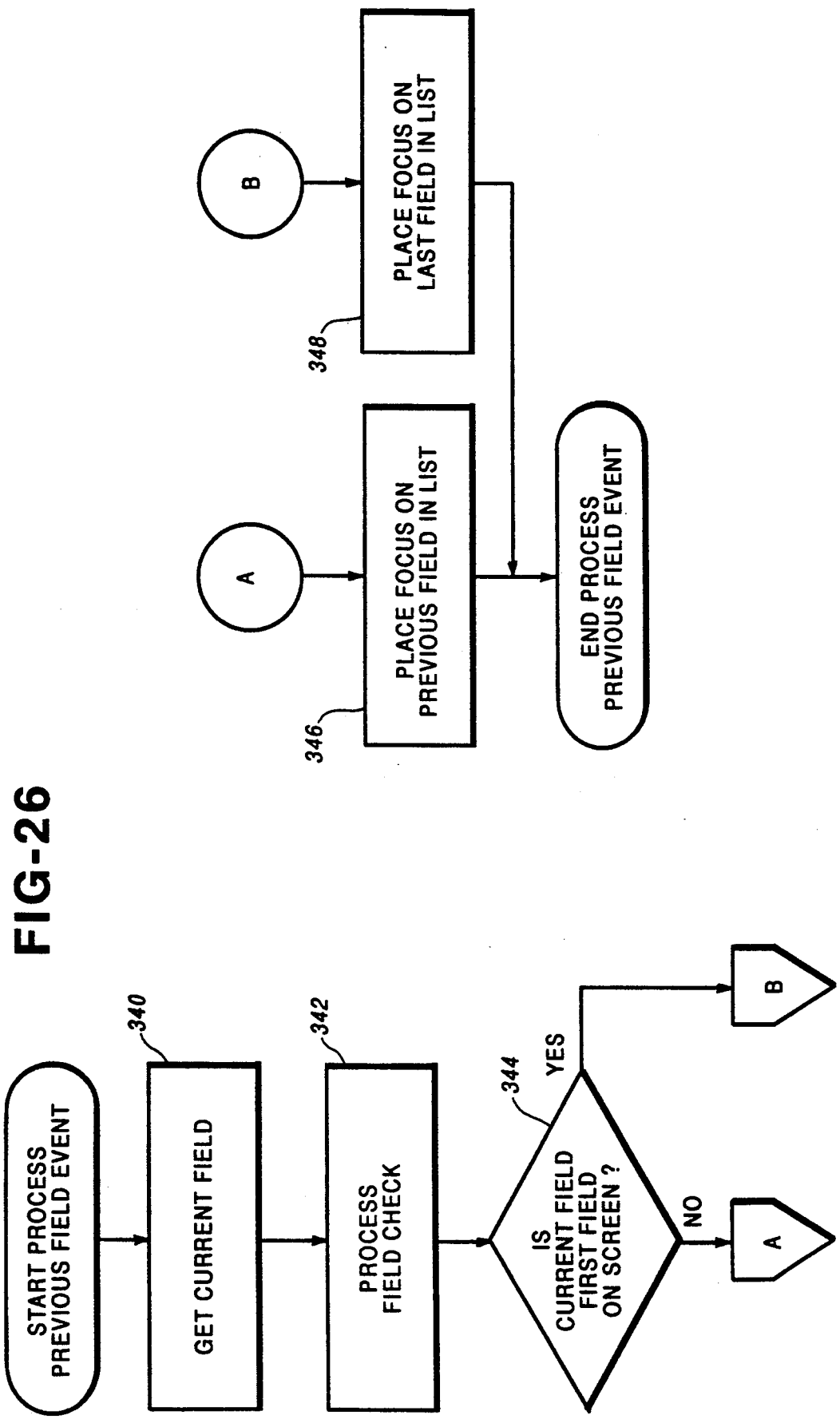
FIG. 26 is a flow chart illustrating a Process Previous Field Event routine.

The Previous Field event is processed in accordance with the flow chart depicted in FIG. 26. The processor 13 at a block 340 gets the display data field that is designated as the current field and proceeds to block 342 to implement the Process Field Check routine described above. Thereafter, at block 344 the processor 13 determines whether the current field is the first display data field depicted on the screen of the display 14 and if not, the processor proceeds to block 346 to place focus on the previous field of the prompt template. If, however, the current field is the first field of the prompt template depicted on the screen of the display 14, the processor 13 proceeds to block 348 to place the focus of the display on the last field of the prompt template.

Figure 27:
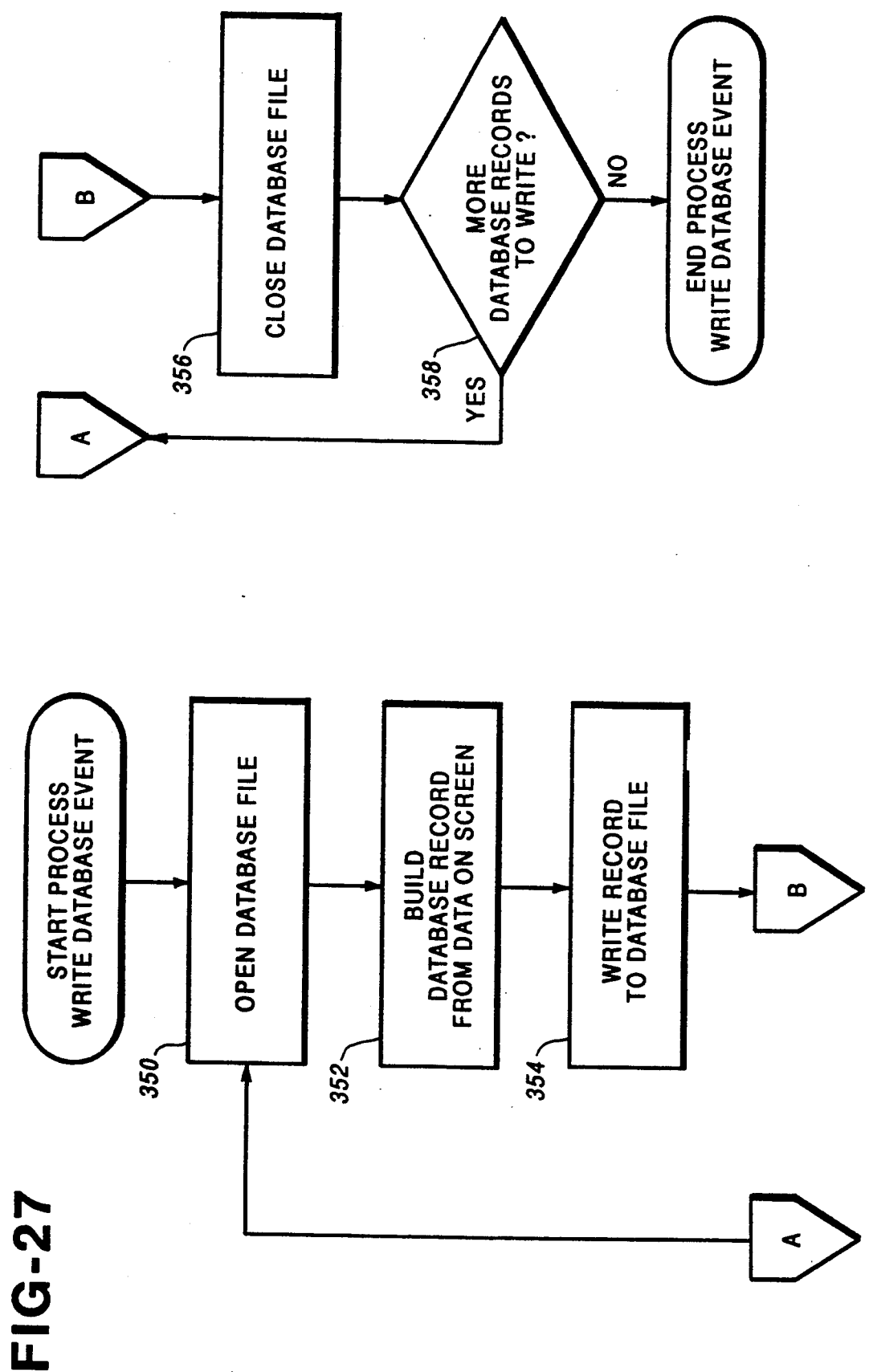
FIG. 27 is a flow chart illustrating a Process Write Database Event routine.

The Write Database event is processed in accordance with the flow chart depicted in FIG. 27. At a block 350 the processor opens a database file. Thereafter, at block 352 the processor 13 builds a database record from the data depicted on the display 14 in accordance with the display screen file 27. At block 354 the processor 13 writes the record to the database file opened at block 350. Thereafter, at block 356 the processor 13 closes the opened database file and at block 358 determines whether there are more database records to write. If so, the processor 13 returns to block 350.

An Update Database event is processed in accordance with the flow chart depicted in FIG. 28 by the processor 13 first opening at a block 360 a database file. Thereafter, at a block 362 the processor 13 builds a database record from the data depicted on the display 14 in accordance with the display screen file 27. At block 364 the processor 13 locates the database record to update. Thereafter, at block 366, the processor 13 updates the record located at block 364 with the data obtained from the display 14 at block 362. At block 368 the processor closes the database file that was opened at block 360 and at block 370 the processor determines whether there are more database records to update. If so, the processor returns to block 360.

Figure 29:
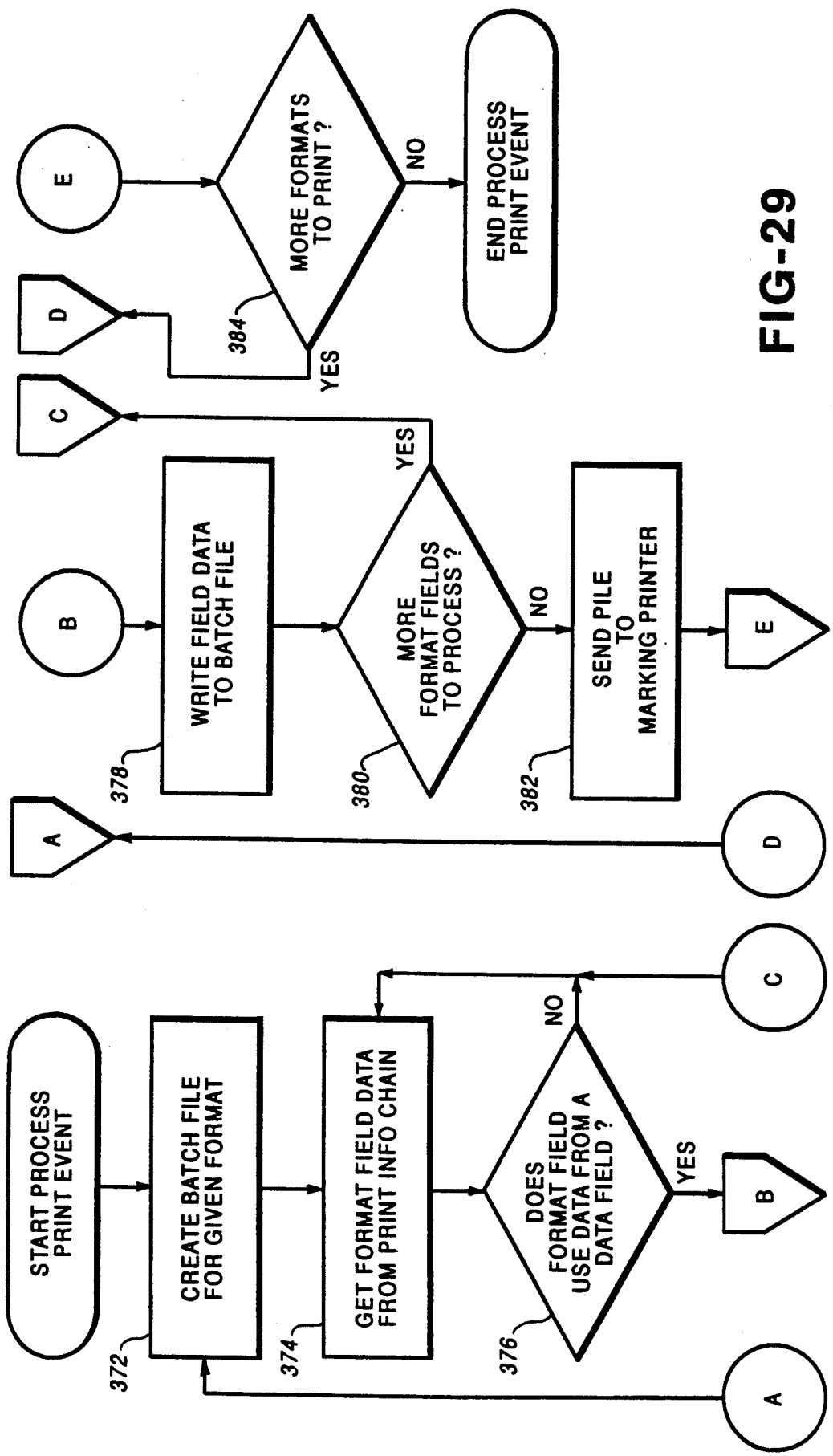
FIG. 29 is a flow chart illustrating a Process Print Event routine.

The Print event is processed in accordance with the flow chart depicted in FIG. 29. At a block 372 the processor 13 creates a batch file for the print format that is specified for the consignee in the consignee's display screen file 27. Thereafter, at block 374 the processor 13 retrieves a list of the data fields that are required by the specified print format. At block 376 the processor 13 reviews a field in the format list to determine whether the field uses data from a data field such as user entered data in a display data field; a data field in the purchase order database 26; or a data field in the consignee address database or the database storing the vendor's address, etc. If so, the processor 13 proceeds to block 378 to write the necessary data into the batch file created for the format. At block 380 the processor 13 determines whether all the fields in the format list have been processed and if there are more fields, the processor 13 returns to block 374 to get the next field specified in the format list. When all of the format fields have been processed so that the batch file includes all of the data required by a consignee for printing, the processor 13 at a block 382 sends the print data batch file to the marking printer 40 which automatically prints a compliance label as required by the consignee. At block 384 the processor determines whether there are more formats to print, and if so, the processor 13 proceeds back to block 372 to create a batch file for the next data to be printed.

The Flat File event is processed in accordance with the flow chart depicted in FIG. 30. The processor at a block 386 creates or opens the file specified for the Flat File event in the consignee's display screen file 27. Thereafter, at a block 388 the processor 13 writes selected data to the flat file opened at block 386. At block 390 the processor 13 writes a selected field separator to the flat file and proceeds to block 392 to determine whether there are more data fields to process. If so, the processor returns to block 388. If there are no more data fields to process, the processor 13 proceeds to block 394 to write a selected record separator to the flat file and proceeds to block 396 to determine whether there are more flat files to process. If so, the processor returns to block 386.

Figure 31:
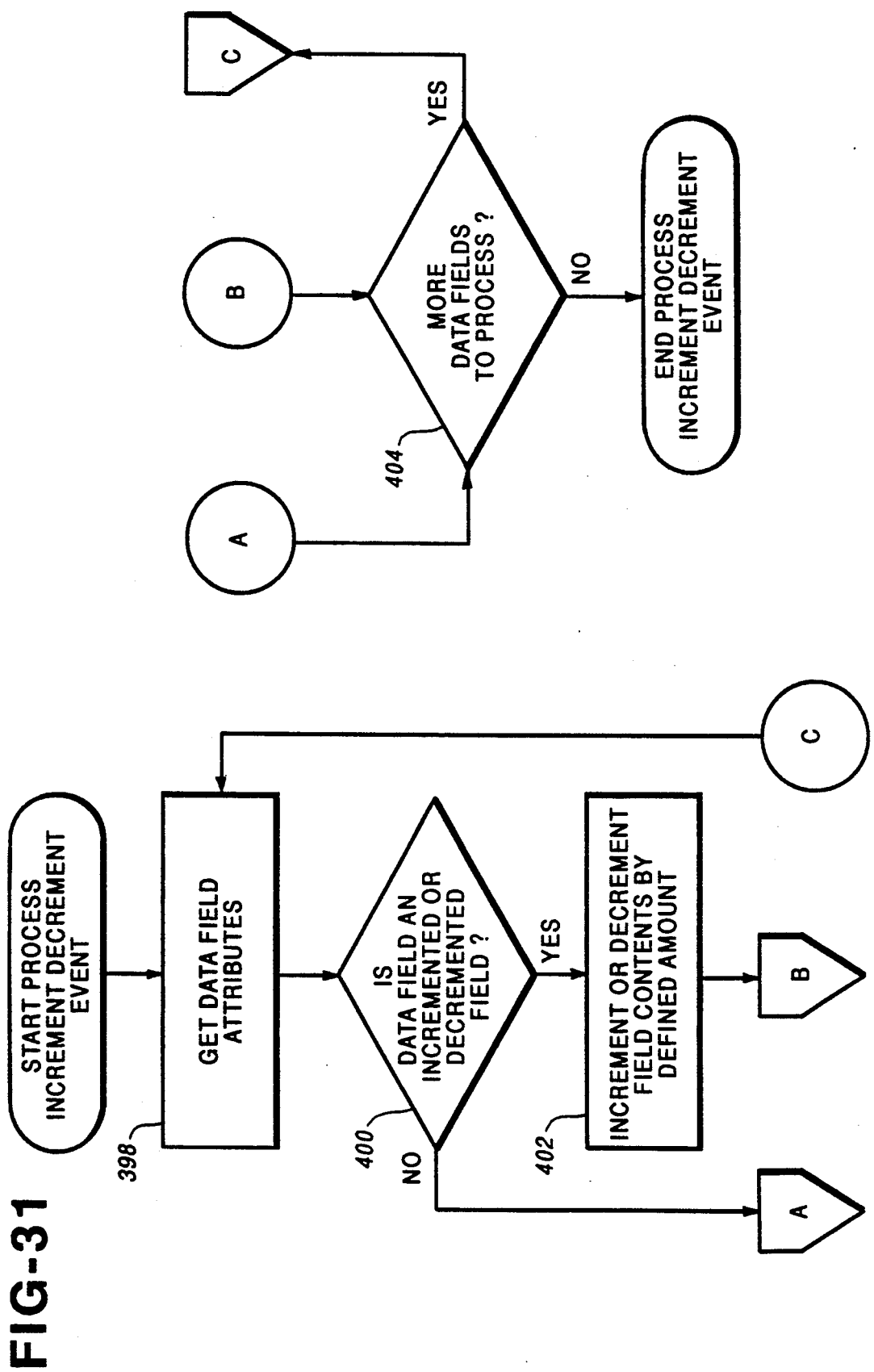
FIG. 31 is a flow chart illustrating a Process Increment/Decrement Event routine.

An Increment/Decrement event is processed in accordance with the flow chart depicted in FIG. 31. At a block 398, the processor 13 retrieves the data field attributes specified for the Increment/Decrement event in the consignee's display screen file 27. At a block 400, the processor determines whether the display data field being processed is a field that can be incremented or decremented. If it is, the processor 13 at a block 402 increments or decrements the content of the display data field by the amount defined by an attribute obtained at block 398. Thereafter, the processor 13 determines whether there are more display data fields to process.

Figure 32:
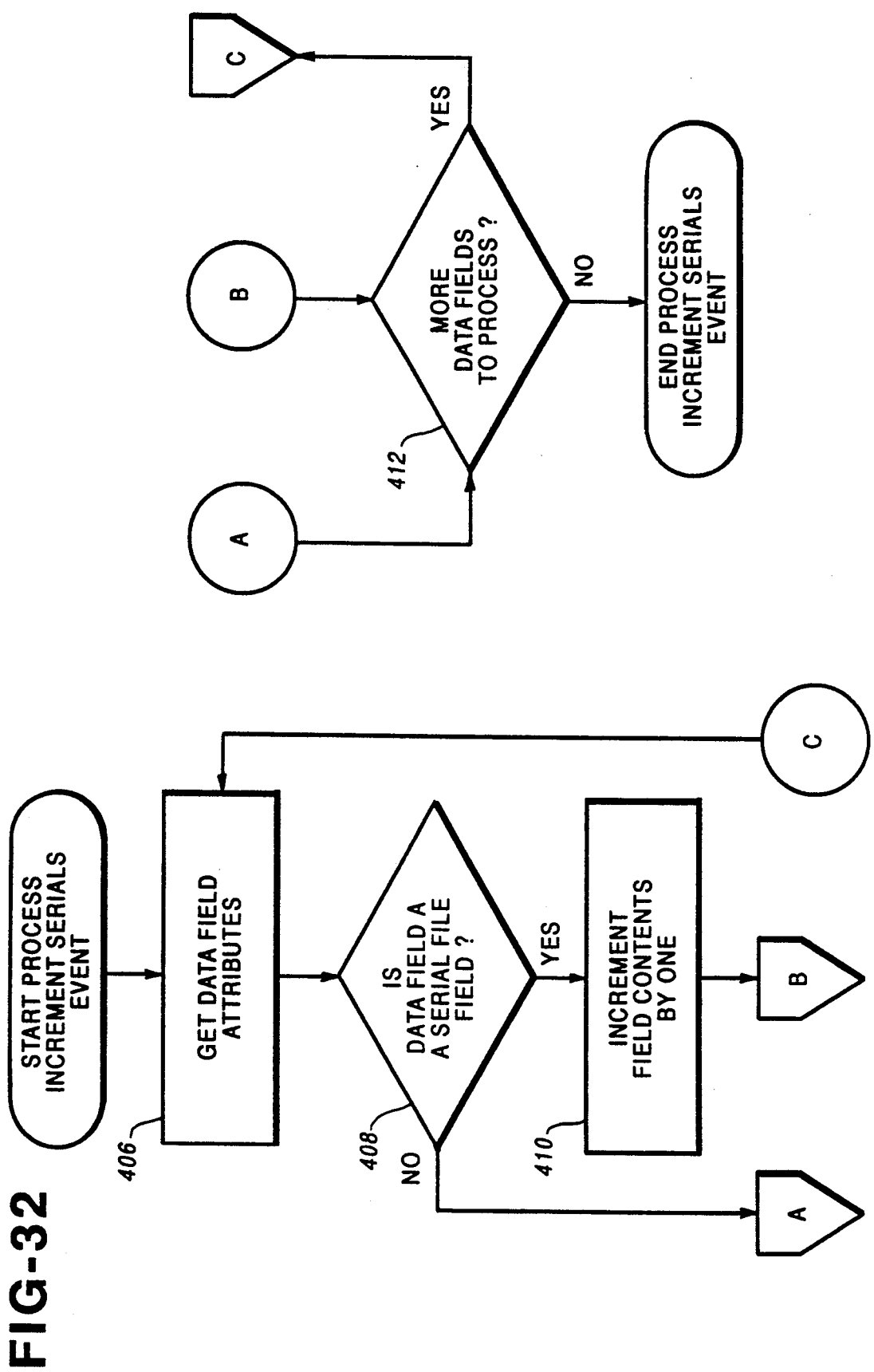
FIG. 32 is a flow chart illustrating a Process Increment Serials Event routine.

The Increment Serials event is processed in accordance with the flow chart depicted in FIG. 32. At a block 406 the processor 13 retrieves the data field attributes specified for this event in the display screen file associated with the consignee. At a block 408 the processor 13 determines whether the data field is a serial file field and if so, the processor 13 proceeds to block 410 to increment the contents of the data field by one. Thereafter, at a block 412 the processor determines whether there are more data fields to process.

Figure 33:
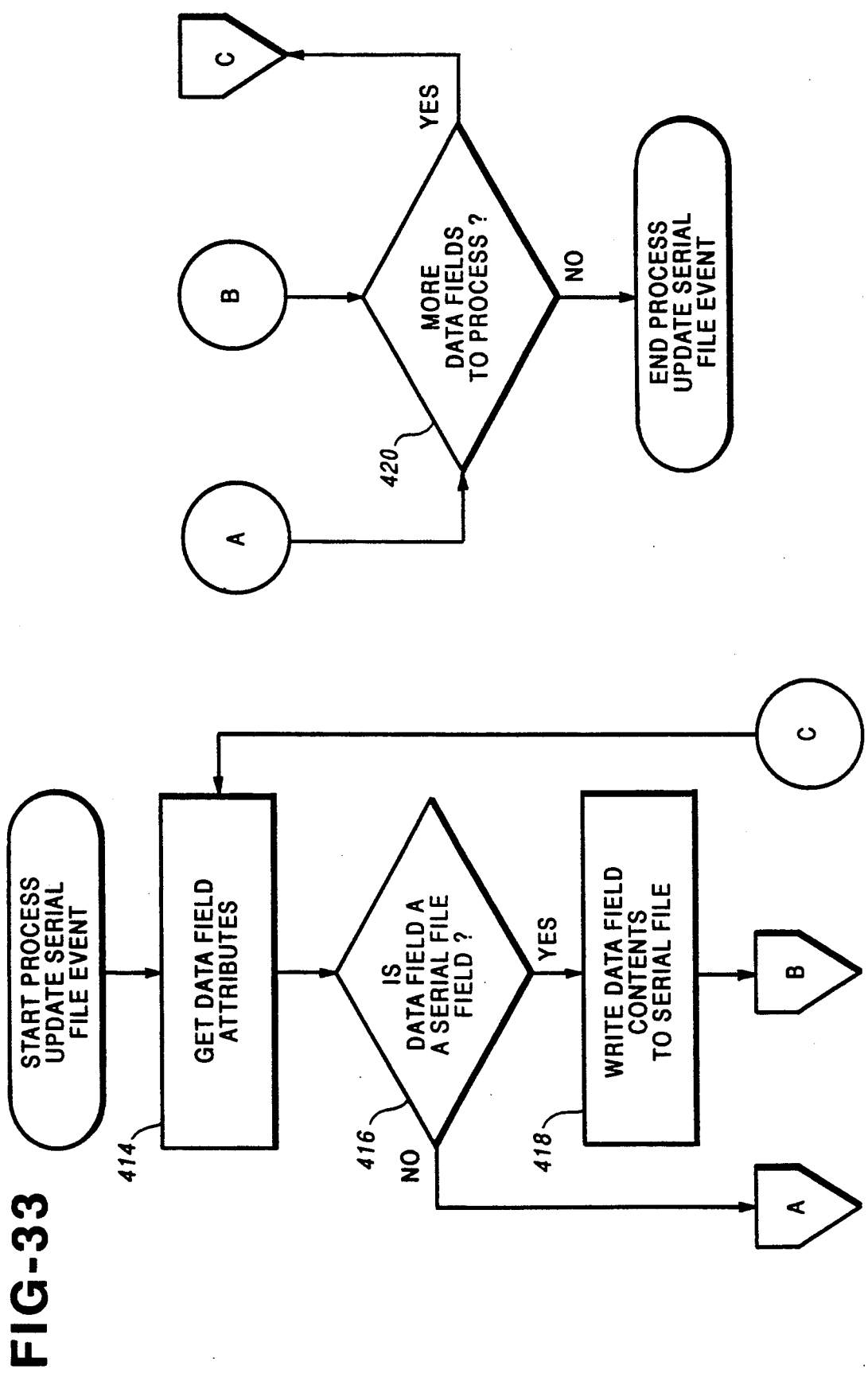
FIG. 33 is a flow chart illustrating a Process Update Serial File Event routine.

The Update Serial File event is processed accordance with the flow chart depicted in FIG. 33. At a block 414 the processor 13 retrieves from the consignee's display screen file 27 the data field attributes designated for this event. At a block 416, the processor 13 determines whether the data field being processed is a serial file field or not. If it is, the processor proceeds to block 418 to write the contents of the data field to the serial file being updated. Thereafter, at a block 420 the processor 13 determines whether there are more data fields to process.

Figure 34:
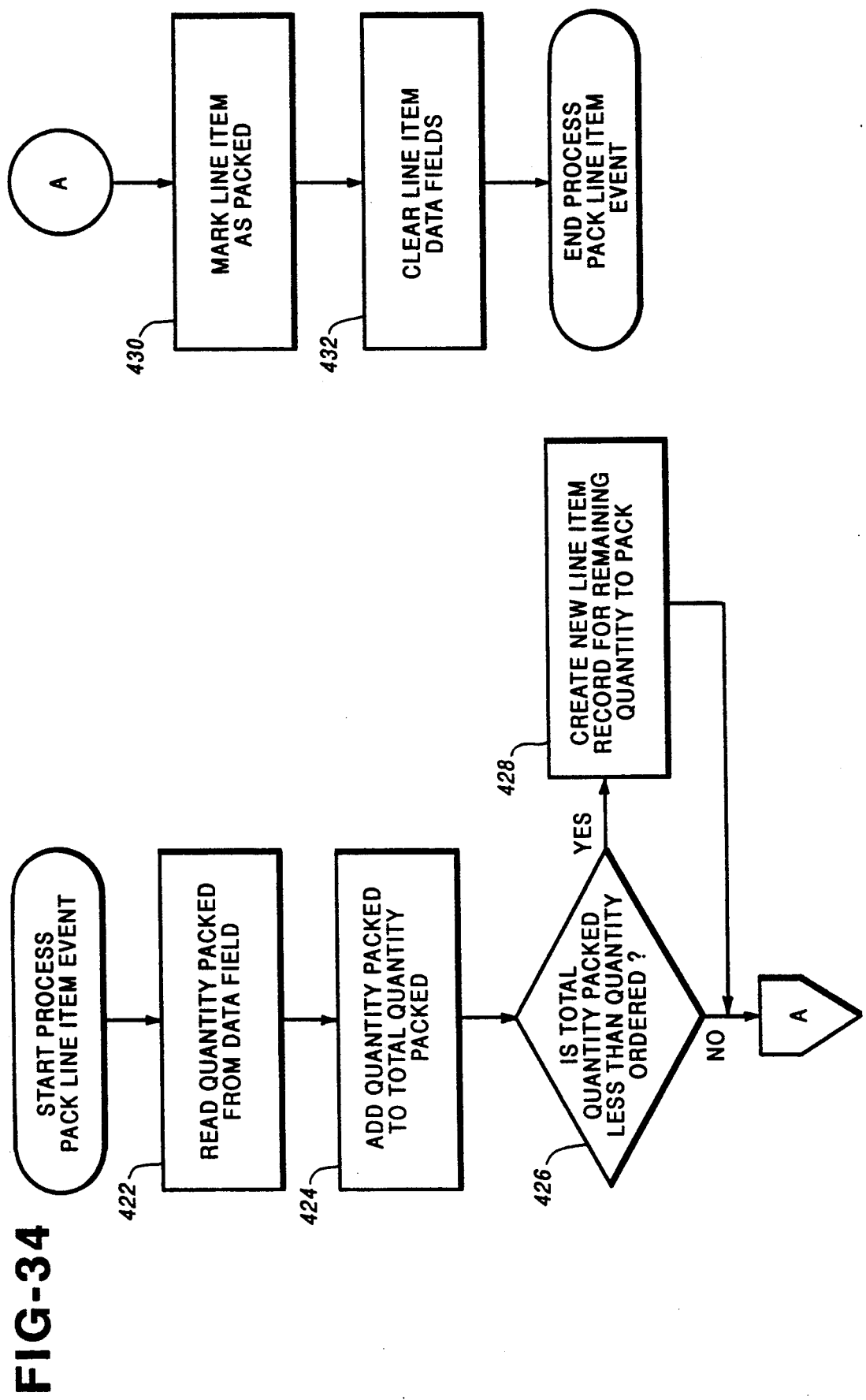
FIG. 34 is a flow chart illustrating a Process Pack Line Item Event routine.

A Pack Line Item event is processed in accordance with the flow chart depicted in FIG. 34. The processor 13 at a block 422 reads the contents of the quantity packed display data field. Thereafter, at a block 424 the processor adds the value read at block 422 to a variable designated Total Quantity Pack that represents the total number of a designated item packed for a purchase order in any container. At block 424 the display data field designated quantity to pack associated with the designated line item is decremented by the quantity packed value. Thereafter, at block 426 the processor 13 determines whether the total quantity packed for the designated item is less than the quantity ordered. If the accumulated total quantity packed is less than the quantity ordered the processor 13 at block 428 creates a new line item record for the remaining quantity to pack. Thereafter, at block 430, the line item record processed at block 424 is marked as packed and at block 432 the display data fields for that line item are cleared from the display 14. As an example of the operation of the Pack Line Item event, assume that ten items A have been ordered in a given purchase order. Before the purchase order is processed the quantity ordered for Item A is equal to ten; the quantity to pack is equal to ten; the quantity packed is zero and the total quantity packed for Item A is zero. If the packing operator packs five items A in a box and enters the number five in the quantity packed display data field of the prompt template, after the processor 13 implements block 424 the line item record for Item A will be such that the quantity ordered is ten; the quantity to pack is five; the quantity packed is five and the total quantity packed is five, this record being marked as packed. Because the accumulated total quantity packed for Item A is five at this point in time which is less than the quantity ordered, a new line item record is created, the new record being associated with Item A and having the quantity ordered value set equal to ten, a quantity to pack value set equal to five, a quantity packed value set equal to zero and a total quantity packed value set equal to five. If the packing operator packs five more items A in a second box, after implementing block 424, the new line item record will be such that the quantity ordered is ten, the quantity to pack is zero; the quantity packed is five and the total quantity packed is ten. At this point a new line item record will not be created since the total quantity packed for Item A is equal to the quantity ordered. It is noted that the total number of line item records associated with a given item is equal to the number of boxes in which a quantity of that item is packed.

An Unpack Line Item event is processed in accordance with the flow chart depicted in FIG. 35. The processor at block 434 first retrieves the line item number to unpack. At block 436 the processor 13 retrieves a line item record associated with the item number obtained at bock 434. At a block 438, the processor 13 adds the quantity packed indicated in the retrieved line item record to the total quantity packed which for the first record found for the item is zero. The total quantity packed is calculated because it is not saved. Thereafter at block 440 the processor 13 deletes this line item record. At block 442 the processor determines whether there are more boxes to unpack for this line item and if so, the processor returns to block 436. When each of the boxes has been unpacked for a given line item, the processor at block 444 creates a new line item record to replace the deleted line item records, the newly created line item record being identical to the line item record that existed before the line item was packed in any box. Although the routine depicted in FIG. 35 unpacks a given item from all boxes packed in association with a given purchase order, with slight modifications to the routine, the Unpack Line Item event can function to unpack a line item from only a single container or box if desired.

Figure 36:
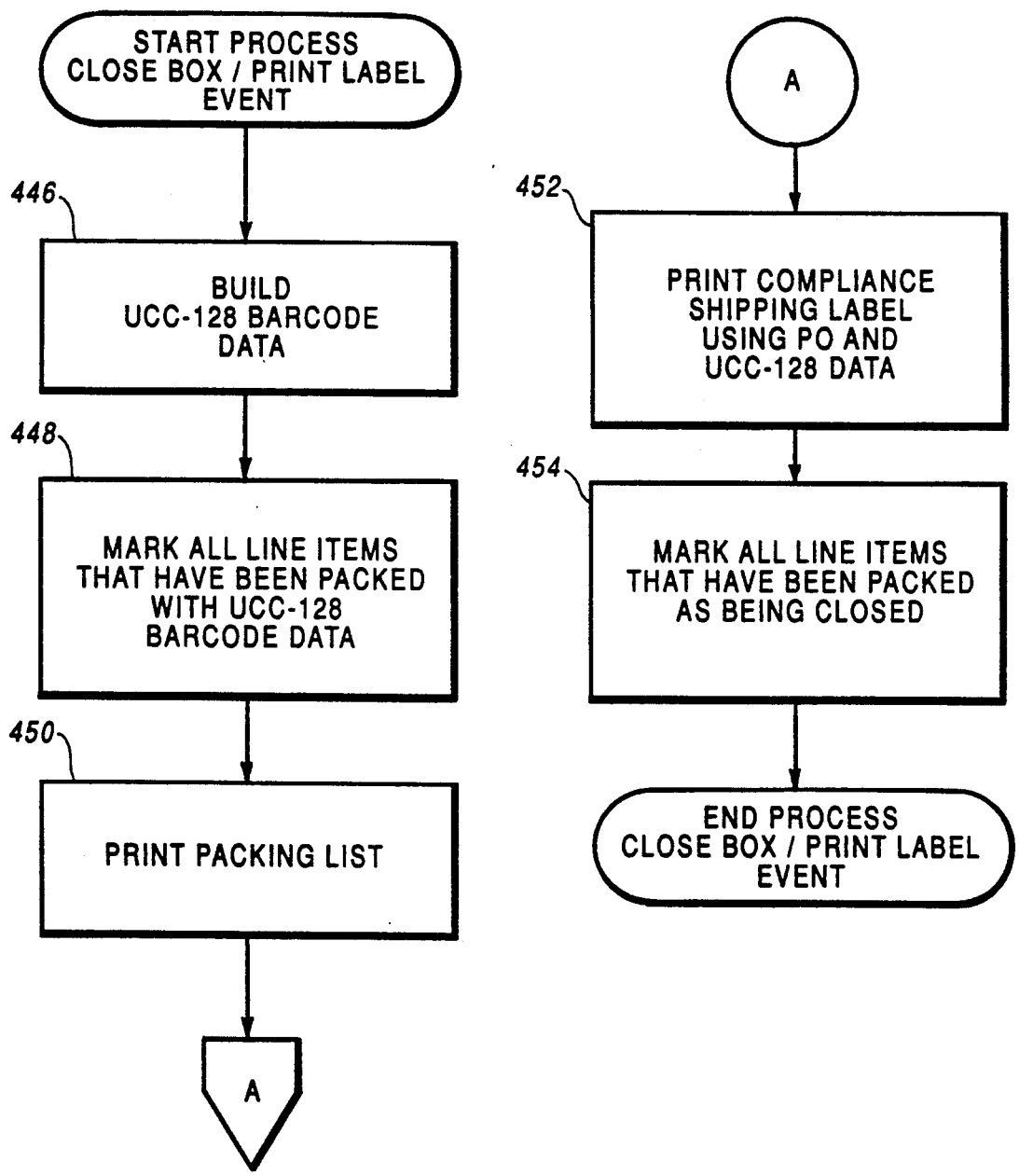
FIG. 36 is a flow chart illustrating a Process Close Box/Print Label Event routine.

In order to process the Close Box/Print Label event, the processor operates in accordance with the flow chart depicted in FIG. 36. More particularly, the processor at a block 446 builds a UCC 128 barcode for the box. Thereafter, at block 448 the processor 13 marks all line item records that have a packed designation with the UCC 128 barcode data built at block 446. Thereafter, the processor 13 at block 450 controls the marking printer to print a packing list for the box and at block 452, the processor 13 controls the printer 40 to print a compliance shipping label using the data designated in the print format from the various system database including the purchase order database as discussed above for the print event and using the UCC 128 barcode data built at block 446. At block 454 the processor 13 marks all of the line item records that have been packed as being closed.

Figure 37:
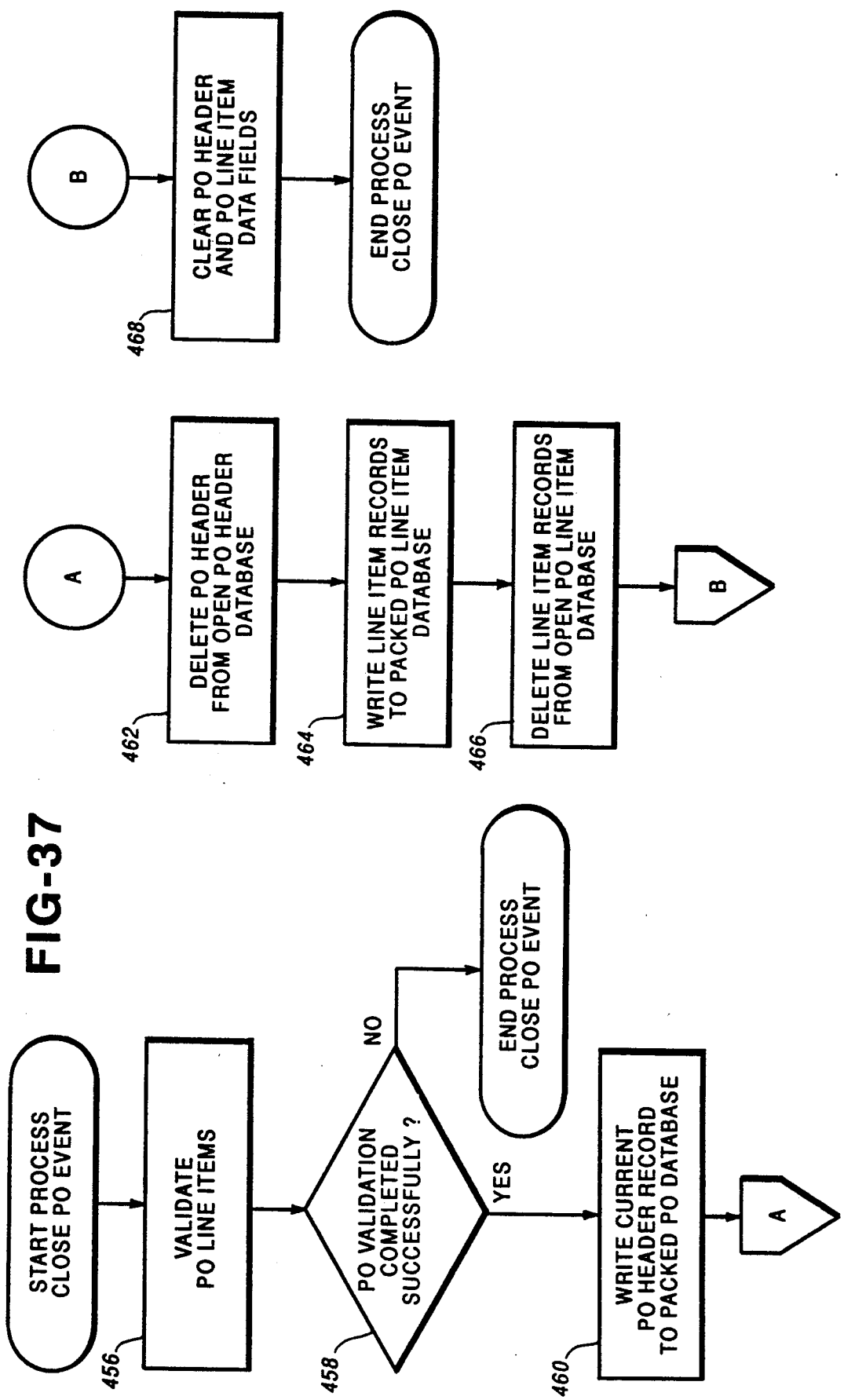
FIG. 37 is a flow chart illustrating a Process Close Purchase Order routine.
Figure 38:
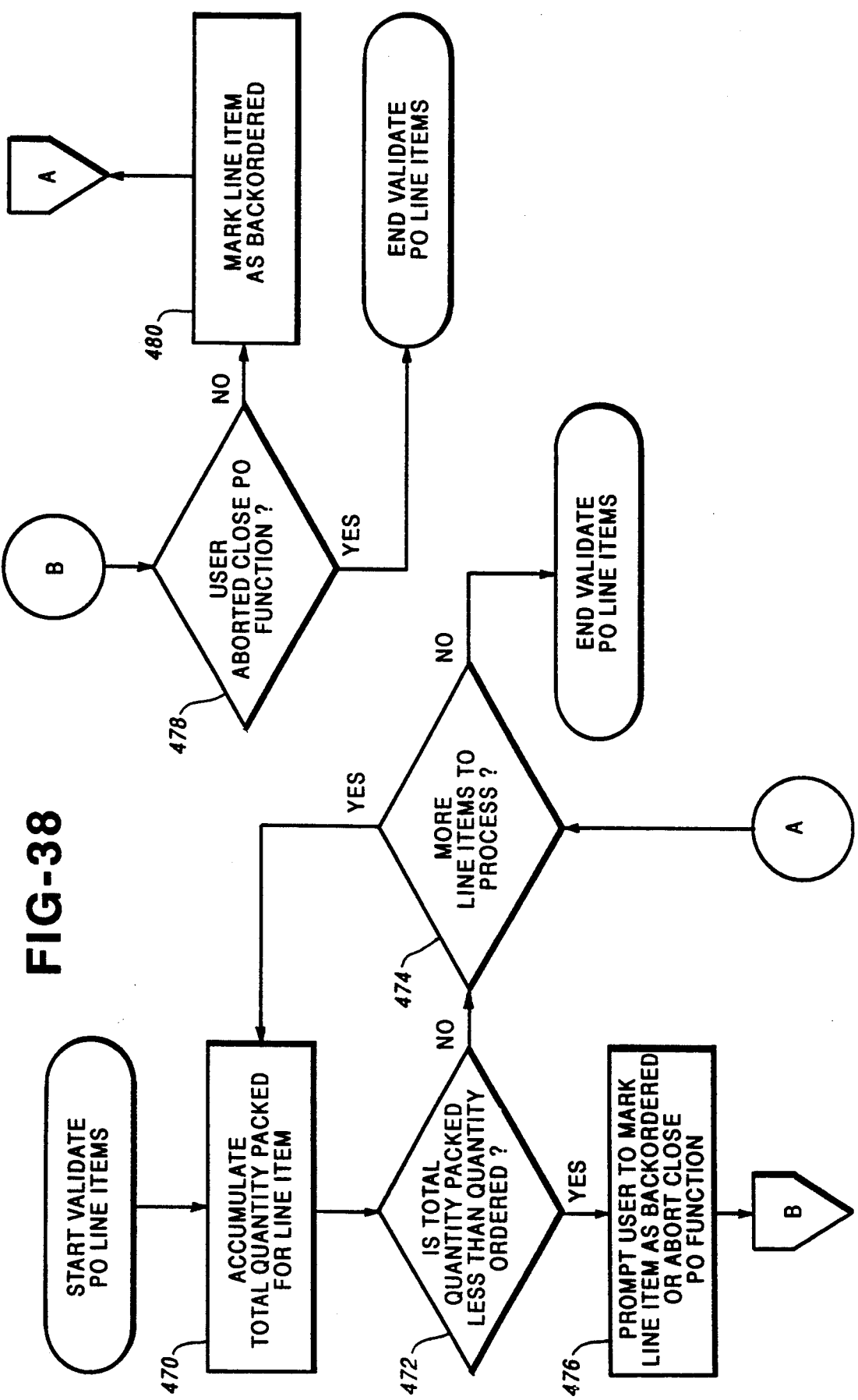
FIG. 38 is flow chart illustrating a Validate Purchase Order Line Items routine.

The Close Purchase Order event is processed in accordance with the flow chart depicted in FIG. 37. More particularly, at block 456 the processor 13 validates the purchase order line items associated with the purchase order to be closed in accordance with the flow chart depicted in FIG. 38. The processor at a block 470 first accumulates the total quantity packed value for the records associated with a given line item. If the total quantity packed value for a given line item is not less than the quantity ordered, the line item is validated and the processor 13 proceeds to block 474 to determine whether each of the line items specified in the purchase order has been processed or not. If for a given line item, the total quantity packed value accumulated at block 470 is less than the quantity ordered as determined at block 472, the processor proceeds to block 476 to prompt the user via the display 14 to mark the item as back ordered or to abort the Close Purchase Order function. If the processor determines at block 478 that the user has not aborted the function but has designated that the line item should be back ordered, the processor proceeds from block 478 to block 480 to mark the line item as back ordered. Thereafter, the processor returns to block 474. This routine ensures that a purchase order will not be designated as closed unless each of the items ordered has been processed as packed or on back order. Returning to FIG. 37, after validating each of the line items in the purchase order, the processor 13 determines at block 458 whether the purchase order validation has been completed successfully or aborted. If the validation of the purchase order was completed successfully, the processor 13 proceeds from block 458 to block 460 to write the current purchase order header record to the packed purchase order database 28. At block 462 the processor deletes the purchase order header from the open purchase order database 43. At block 464 the processor 13 writes the line item records to the packed purchase order line item database 28 and at block 466 deletes the line item records from the open purchase order line item database 45. Thereafter, at block 468 the processor 13 clears the purchase order header and purchase order line item data fields from the display 14 so that the display 14 depicts the empty template associated with the selected consignee.

Figure 39:
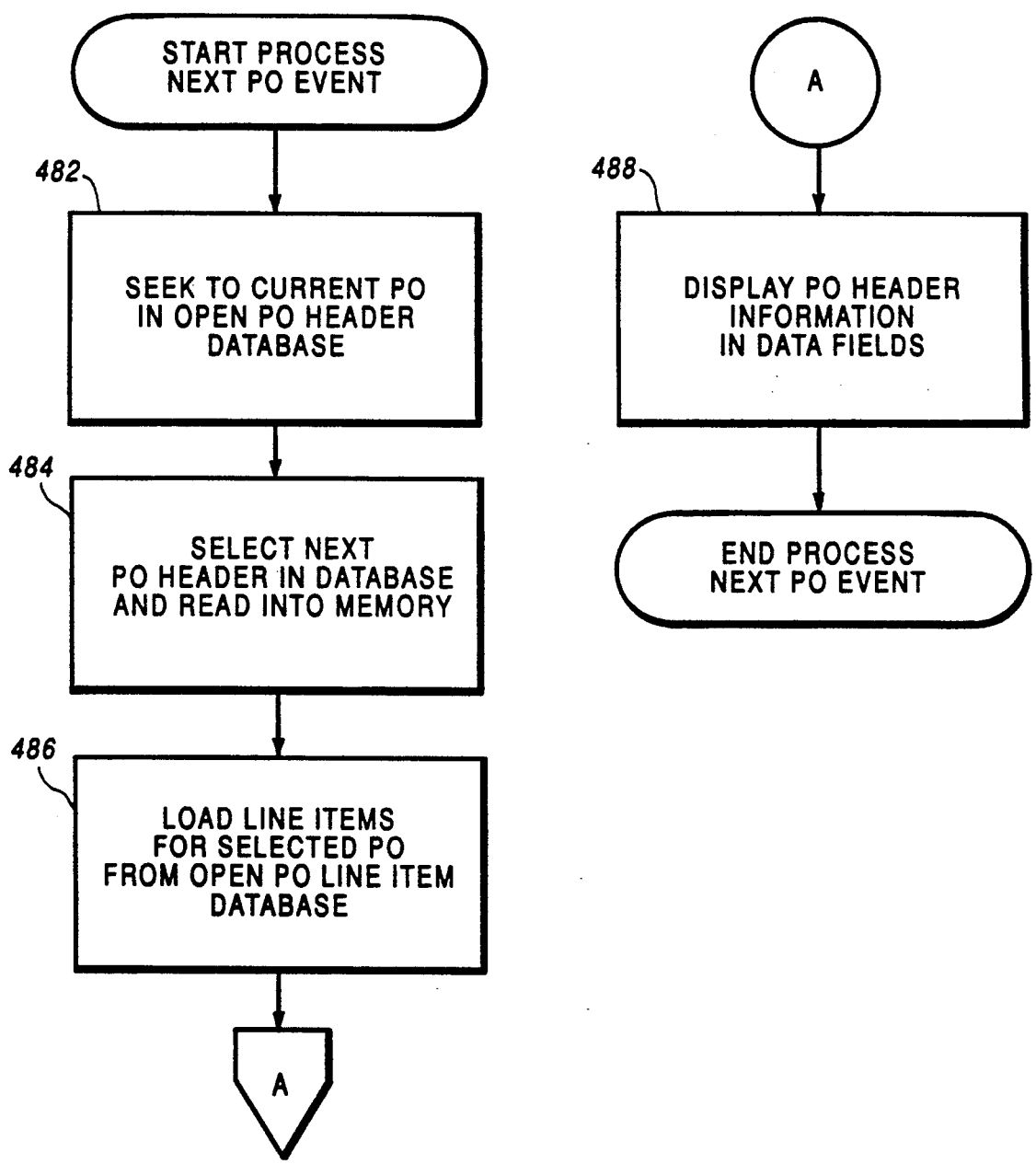
FIG. 39 is a flow chart illustrating a Process Next Purchase Order Event routine.

The Next Purchase Order event is processed in accordance with the flow chart depicted in FIG. 39. At block 482 the processor 13 finds the current purchase order number in the open purchase order header database and at block 484 the processor 13 selects the purchase order header associated with the next purchase order in the database, the processor 13 reading that purchase order header into the scratch pad 17 of the memory 15. Thereafter, at block 486 the processor 13 loads the line item database records associated with that next purchase order from the open database 26 to the scratch pad memory 17. At block 488 the processor 13 displays the purchase order header information, for example the purchase order number in the appropriate display data field of the prompt template depicted on the display 14. It will be appreciated that the Close Purchase Order event and the Next Purchase Order event can be associated in a consignee's display screen file 27 with a single function key input such that whenever that particular function key is actuated or entered by a user the Close Purchase Order event can be actuated followed by the Next Purchase Order event. Thus when the user finishes packing the items for one purchase order, the next purchase order for that consignee will automatically be displayed on the display 14.

The Next Line Item event is processed in accordance with the flow chart depicted in FIG. 40. The processor at a block 490 determines whether a line item is currently being depicted in the line item display data field depicted on the display 14. If not, the processor proceeds to block 494 to select the first nonpacked line item in the line item database stored in the scratch pad memory 17 and proceeds to block 498. At block 498 the processor causes the display 14 to display the line item information in the display data fields associated with this key field. If the processor 13 determines at block 490 that a line item is currently being displayed, the processor at block 492 gets from the scratch pad memory 17 the next nonpacked line item and associated information for display on the display 14. If the processor determines at block 496 that the currently displayed line item was the last line item in the list, the processor 13 proceeds to block 494 to select the first line item with its associated information which will indicate that this item has been packed.

Figure 41B:
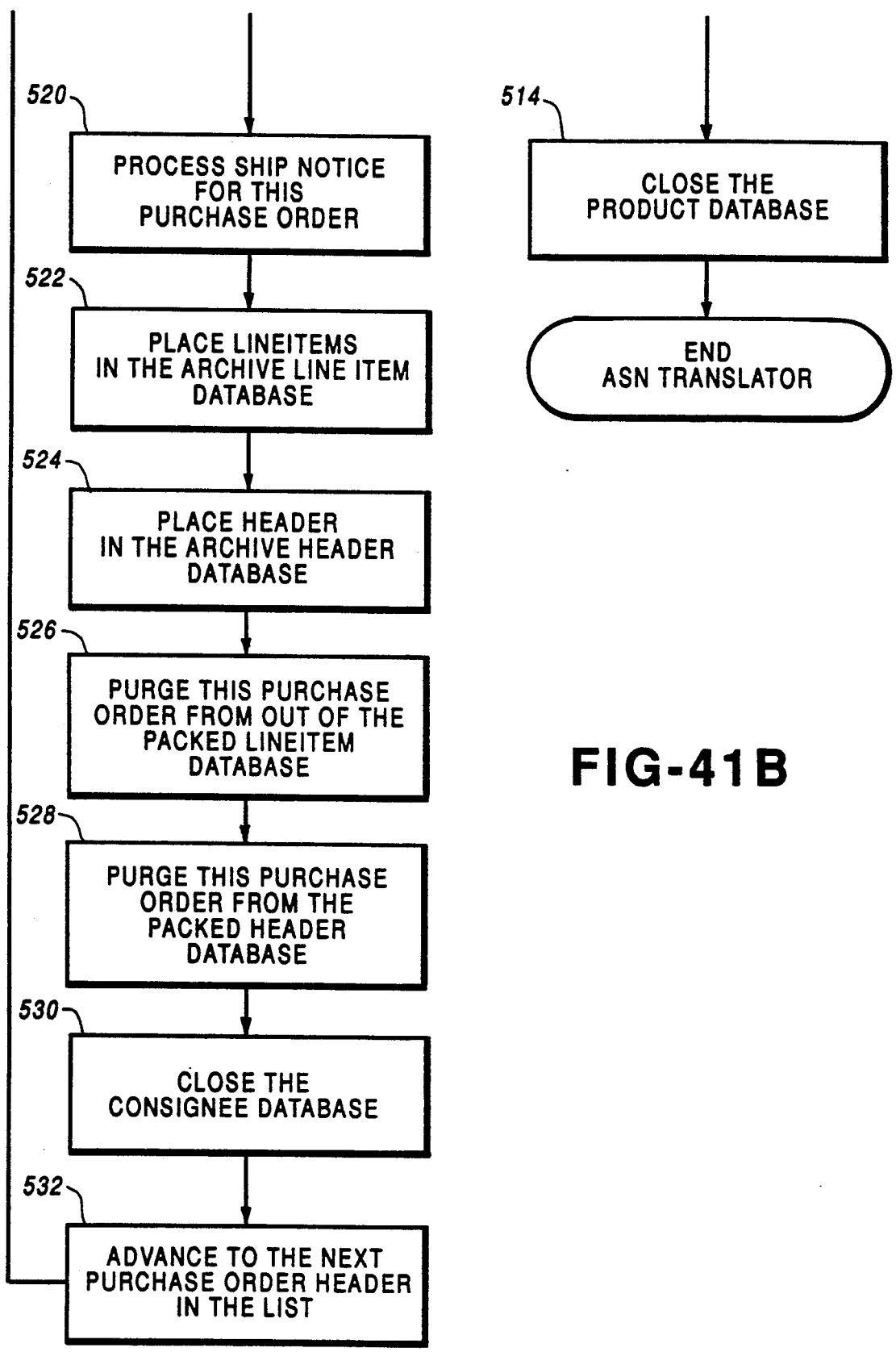
FIG. 41 is a flow chart illustrating an Advance Shipping Notice Translator routine.

The advance shipping notice translator routine 35 is shown in FIG. 41. At the start of this routine, the processor 13 at a block 500 imports the packed purchase order database 28 for processing. This database includes packed or closed purchase orders for one or more consignee. At a block 502 the processor 13 opens a product database and at block 504 the processor opens the consignee database. At a block 506 the processor 13 determines whether there is a purchase order header in the packed purchase order database 28. If not, the processor 13 proceeds to block 508 and block 510 to condense the packed purchase order database 28. Thereafter, at a block 512 the processor 13 closes the database opened at block 504 and at a block 514 the processor closes the database opened at block 502. If the packed purchase order database 28 does, however, contain a purchase order, the processor proceeds from block 506 to block 516 to open a consignee database in the scratch pad 17 for the consignee issuing the purchase order associated with the purchase order header. Thereafter, at block 518 all of the line items for this purchase order are imported into the opened consignee database. At block 520 the processor 13 implements the routine depicted in FIGS. 42A-B to process the advance shipping notice for this purchase order and thereafter proceeds to block 522. At block 522 the processor 13 places the line items from the line item database in the scratch pad 17 into a line item database in the archives 31. Thereafter, at a block 524 the processor 13 places the header data for the purchase order into the header database of the archive 31. At block 526 the processor 13 purges the line items associated with the particular purchase order from the packed purchase order database 28 and at block 528 the header database for this purchase order is purged from the packed purchase order database 28. At block 530 the consignee database opened at block 516 is closed and the processor 13 proceeds to block 532 to advance to the next purchase order header, if one is available, in the packed purchase order database 28.

An advanced shipping notice for a particular purchase order is processed in accordance with the flow chart depicted in FIGS. 42A-B. At a block 534 the processor 13 gets a temporary file name and opens a file in association with that name. At block 536 the processor 13 gets a command count from the Advance Shipping Notice (ASN) configuration file 29 associated with the consignee for which the advance shipping notice is being generated. The ASN configuration file 29 includes a sequence of commands that instruct the translator to execute certain tasks or perform specific functions. At block 538, the processor 13 initializes a loop count to one. At block 540 the processor 13 determines whether the loop count is less than or equal to the command count. If the loop count is less than or equal to the command count the processor proceeds to block 555 to determine whether the command being processed is the import header command and if so, the processor proceeds to block 556 to get a pointer to the purchase order header to bring the header local. Thereafter, the processor proceeds from 556 to block 586 to increment the loop count. If the processor determines at block 558 that the command being processed is the import line items command, the processor proceeds from block 558 to block 560 to get a pointer to the line items for the designated purchase order to bring the line items local. If the command being processed is the initialize system variables command as determined at block 562, the processor proceeds to block 564 to initialize the variables necessary for the generation of the advance shipping notice. If the command being processed is a "DO" command as determined at block 556, the processor proceeds to block 568 to process the list of data segments associated with the command. If the command is a "For Each Container" command, as determined at block 570, the processor 13 proceeds to block 572 to save the data segment list and process it for each container in the shipment associated with a given purchase order. If the command being processed is the "For Each Item" command as determined at block 574, the processor proceeds to block 576 to process a list of data segment instructions for each line item in a shipment. If the command being processed is the "For Each Container Type" command as determined at block 578, the processor proceeds to block 580 to loop through all of the items in the purchase order to sum the weights for each container type that was used in association with the purchase order. At block 584, for each of the container types the data segment list specified in the configuration file is processed. Thereafter, the processor proceeds to block 586 to increment the loop count, thereafter returning to block 540. When the processor 13 determines at block 540 that the loop count is greater than the command count, the processor proceeds to block 542. At block 542 the start of the temporary file processed in accordance with the ASN configuration file commands is found. At block 546 a flat file for the EDI communication interface 37 is opened and at block 548 the contents of the temporary file is copied to the flat file. Thereafter the temporary file is deleted at block 550.

Figure 43A:
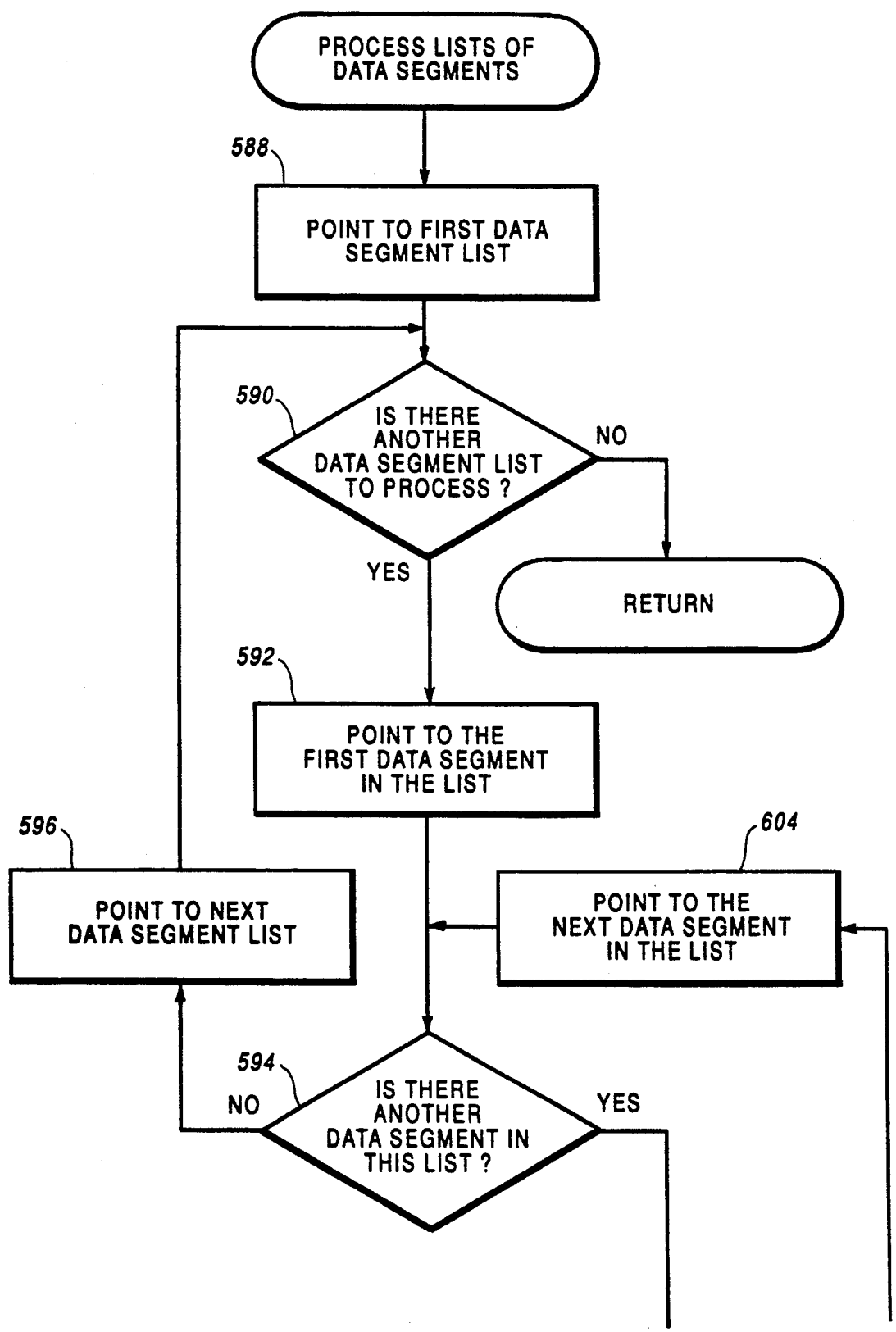
FIG. 43 is a flow chart illustrating a Process Lists of Data Segments routine.
Figure 43B:
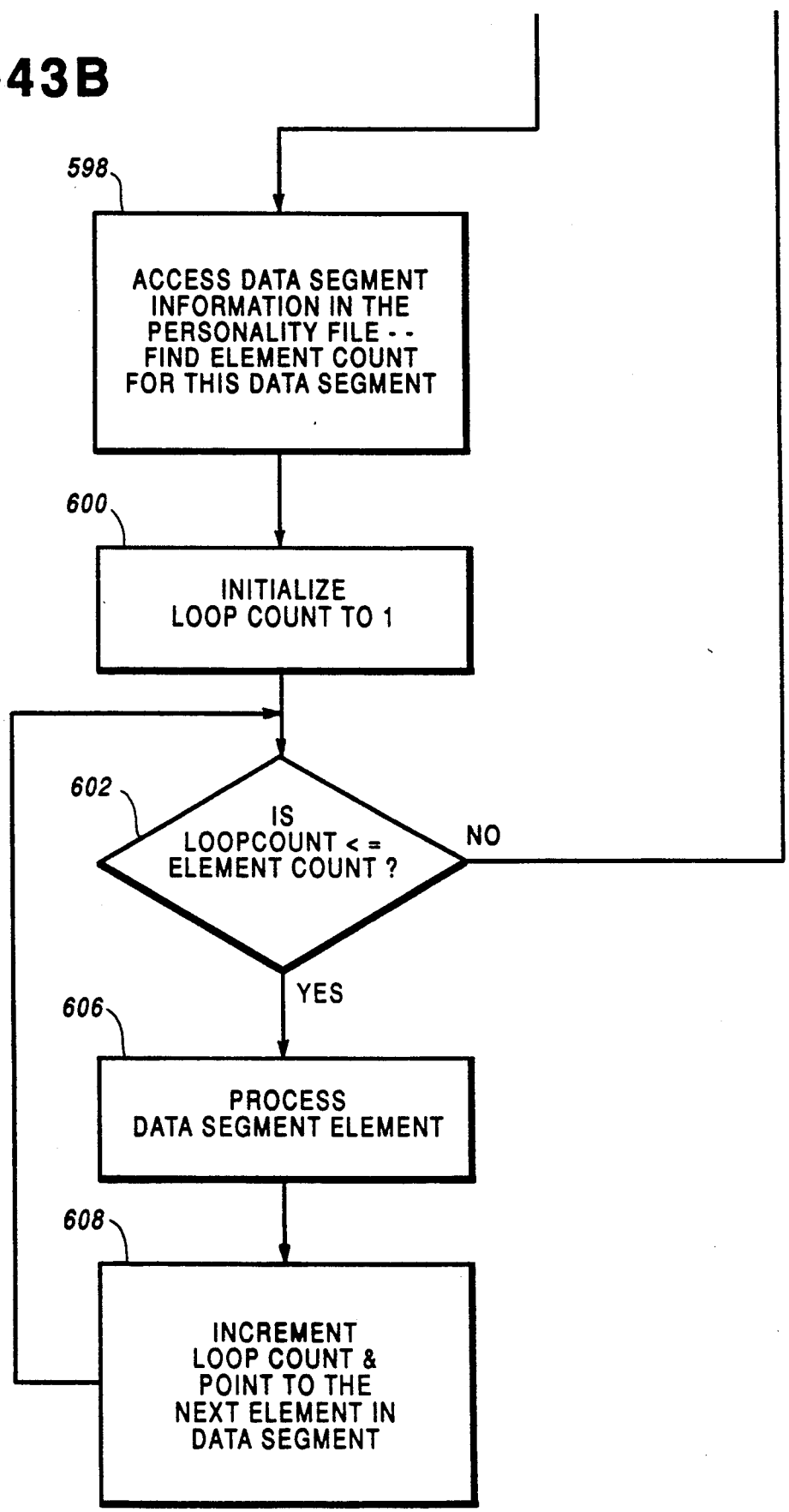

In order to process lists of data segments the processor operates in accordance with the flow chart depicted in FIG. 43. At a block 588 the processor first points to a first data segment list. At block 590 the processor 13 determines whether there is a data segment list to process. If so, the processor proceeds to block 592 to point to the first data segment in the list. At block 594 the processor determines whether there is a data segment in the list and if so, the processor proceeds to block 598. If there is not another data segment in the list as determined at block 594, the processor proceeds to block 596 to increment the pointer to point to the next data segment list, the processor thereafter returning to block 590.

At block 598, the processor accesses data segment information in the configuration file 29 for the particular data segment being processed. At block 600 the processor initializes a loop count and at block 602 determines whether the loop count is less than or equal to the element count. If not, the processor proceeds to block 604 to point to the next data segment in the list, thereafter returning to block 594. If, however, the loop count is less than or equal to the element count, the processor proceeds to block 606 to process a data segment element in accordance with the flow chart depicted in FIGS. 44A-B. Thereafter, the processor increments the loop count at block 608 and points to the next element in the data segment.

Figure 44A:
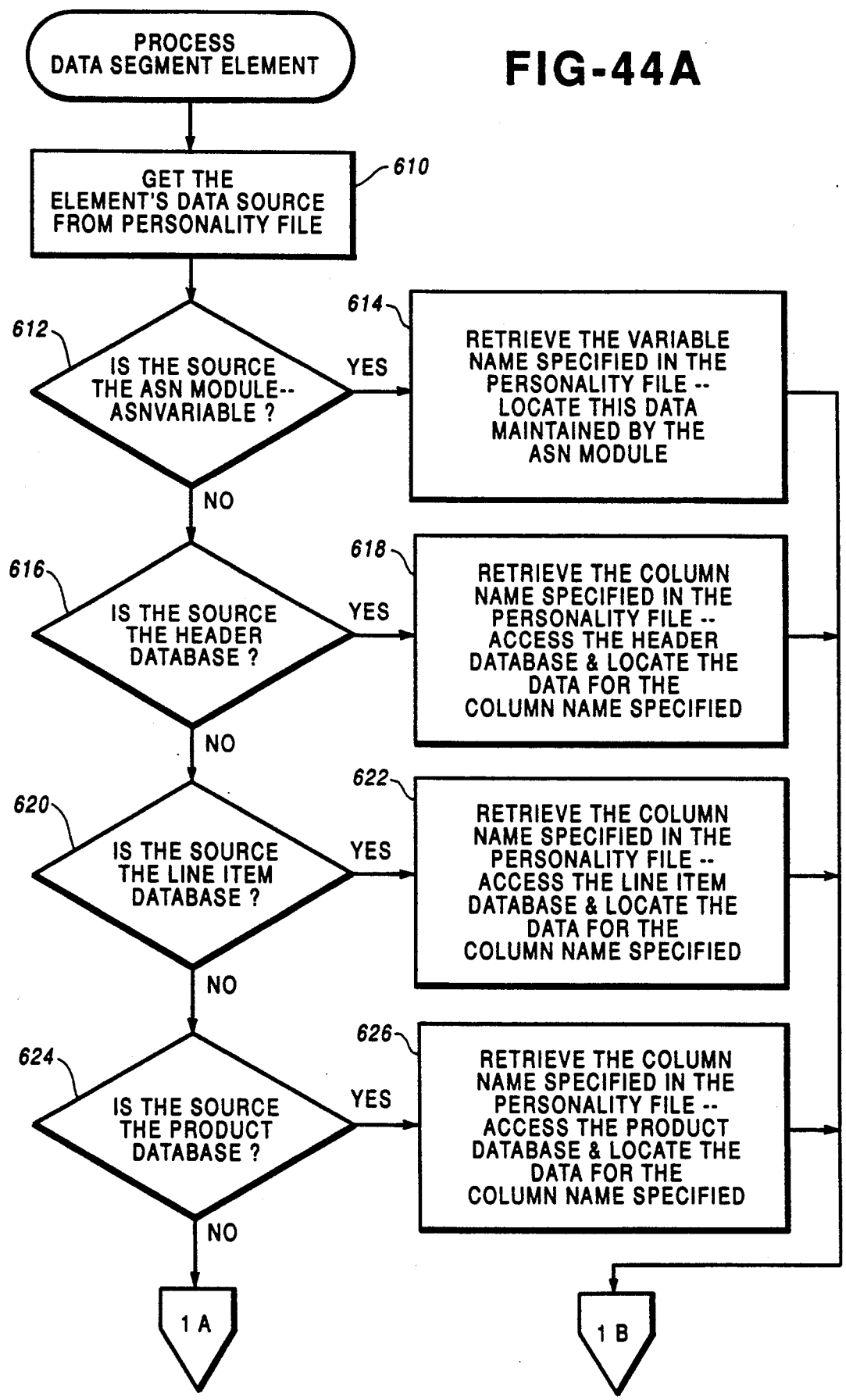

As shown in FIG. 44A, in order to process a data segment element the processor 13 obtains that particular element's data source from the configuration file 29 and at block 612 determines whether the source is an advance shipping notice variable and if so, the processor proceeds to block 614 to retrieve the variable name specified in the configuration file and locates the data. If the processor determines that the source is the header database as determined at block 16, the processor proceeds to block 618 to retrieve the column name specified in the ASN configuration file and locates the data for the column name specified. If the source is determined at block 620 to be the line item database, the processor proceeds to block 622 to retrieve the column name specified in the ASN configuration file and locates the data for the column name specified. If the processor 13 determines that the source is the product database as determined at block 624, the processor proceeds to block 626 to retrieve the column name specified in the configuration file and to locate the data for the column name specified. If the processor determines at block 628 that the source is the consignee database, the processor proceeds to block 630 to retrieve the column name specified in the configuration file and to locate the data for the column name specified. If the processor determines at block 632 that the source is the shipper, i.e. consignee database, the processor proceeds to block 634 to retrieve the column name specified in the configuration file and to locate the data for the column name specified. If the processor determines at block 633 that the source is fixed data, the processor proceeds to block 638 to retrieve the fixed data from the configuration file. If the processor determines at block 640 that the source is a general type of tag, the processor proceeds to block 642 to retrieve the key name specified in the configuration file so as to locate the data for the key name specified under the general tag. If the processor determines at a block 644 that the source is a consignee tag, the processor proceeds to block 646 to retrieve the key name specified in the configuration file and to locate the data for the key name specified under the consignee tag. At a block 648, the processor 13 retrieves data formatting information from the configuration file and formats the data respectively located at block 614, 618, 622, 626, 630, 634, 638, 642 and 646 in accordance with the format information. At block 648 the formatted data is then stored in a temporary output file.

Figure 45:
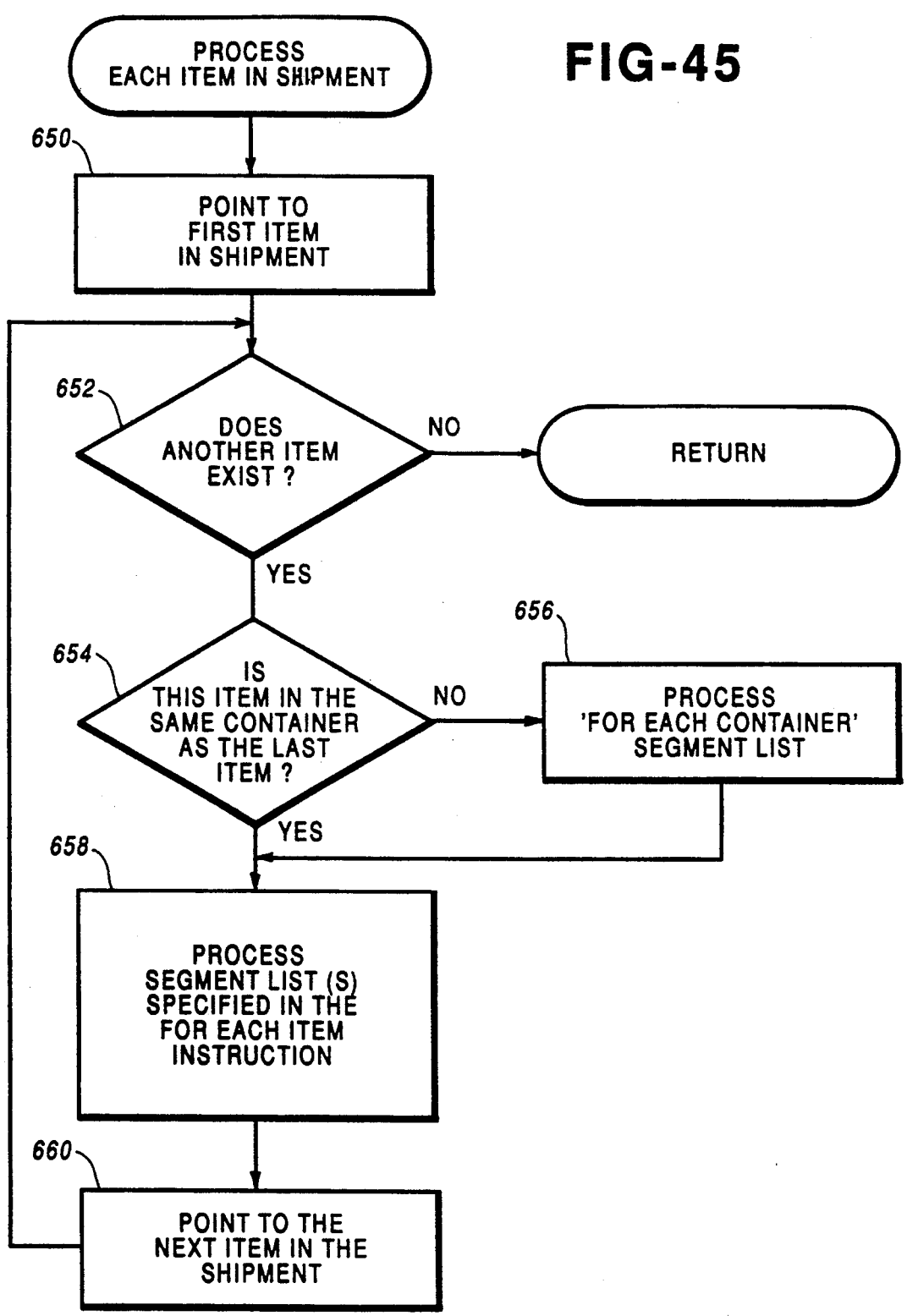
FIG. 45 is a flow chart illustrating a Process Each Item in Shipment routine.

In order to process each item in a shipment, the processor 13 at a block 650 shown in FIG. 45 points to the first line item in the particular purchase order line item database. At a block 652 the processor determines whether another line item exists and if so, the processor at a block 654 determines whether the line item is in the same container as the last line item. If not, at a block 656 the processor 13 processes a "For Each Container" segment list and proceeds to block 658. At block 658, the processor 13 processes the segment list(s) specified in the "For Each Item" instruction and at block 660 the processor points to the next line item in the purchase order.

In view of the above it is apparent that the system of the present invention is very easy to use, automatically prompting the user for the the information required by a consignee to process a purchase order issued thereby. The packing operator, therefore, does not have to keep track of the diverse requirements of each consignee to whom the vendor ships. Because the system leaves little to human error and validates the packing operation, accuracy in processing of purchase orders in accordance with the issuing consignee's requirements is assured. Further, the system of the present invention is easily updated to add a consignee by merely adding data specific to the consignee including consignee specific configuration and display screen files without requiring any modification to the software of the system.

Many modifications and variations of the embodiment disclosed herein incorporating the present invention are possible in view of the above teachings. Thus, it is to be understood that, within the scope of the appended claims, the invention may be practiced otherwise than as described hereinabove.

We claim:

1. A container packing verification and labeling system for use on a computer having a processor, a memory, at least one input device operable by a user to enter data and commands to said computer, a display and a communication interface for electronically receiving data for a plurality of purchase orders from a plurality of consignees to store data for each purchase order in a data file associated with the consignee issuing the purchase order, said computer being coupled to a printer for printing on a web of record members, each record member being affixable to a container, said container packing and verification system comprising:

a plurality of consignee specific configuration files accessible by said processor, said configuration files including information indicating how purchase order data stored in a data file for said specific consignee is to be interpreted;

a nonconsignee specific purchase order translator for controlling, in accordance with a consignee specific configuration file, said processor to store purchase order data from a data file in a predetermined manner in a purchase order database to allow said purchase order database to be accessed by said processor when operating in accordance with a nonconsignee specific purchase order processing controller;

a plurality of consignee specific display screen files accessible by said processor and associated with a plurality of consignees each requiring a different set of input data from a user to process a purchase order issued thereby, each display screen file being associated with a consignee and including data representing information to be depicted on said display to prompt a user to enter only that data required by said associated consignee to process a purchase order issued thereby and said display screen files including data associating particular user entered commands with a consignee specific purchase order processing operation; and a nonconsignee specific purchase order processing controller for controlling said processor to couple to the display prompt information for a specific consignee from an associated display screen file in response to user entered data including data representing the selection of said consignee, said controller controlling said processor in accordance with said display screen file to collect in said memory data entered by a user in association with a purchase order and to compare selected user entered data to said associated purchase order data from said database to validate said use entered data;

and said controller controlling said processor to couple selected user entered data from said purchase order database to said printer for printing said information on a record member.

2. A container packing verification and labeling system as recited in claim 1 wherein said system can be updated to accommodate new consignees without requiring said translator or said controller to be altered by adding consignee specific data accessible by said processor including a shipping address for said new consignee, a configuration file for said new consignee and at least one display screen file for said consignee.

3. A container packing verification and labeling system as recited in claim 1 wherein said display screen file associated with a first consignee includes data representing information identifying a first purchase order processing operation to be performed when a user enters a particular command, said identifying information being depicted on said display with the prompt information for said first consignee.

4. A container packing verification and labeling system as recited in claim 3 wherein said display screen file associated with a second consignee includes data representing information identifying a second purchase order processing operation to be performed when a user enters said same particular command, said second purchase order processing operation being different from said first operation and said identifying information being depicted on said display with the prompt information for said second consignee.

5. A container packing verification and labeling system as recited in claim 1 wherein the prompt data in a display screen file prompts a user to enter different information in each of a plurality of fields depicted on a display, said fields including at least one key field and at least one field associated with said key field and said purchase order processing controller controls said processor to be responsive to data entered by a user in a key field to search said database for data associated with said entered key field data and to automatically enter the associated data found in said search into said associated field or fields on said display.

6. A container packing verification and labeling system as recited in claim 1 wherein said system includes consignee specific data accessible by said processor and identifying shipping addresses for associated consignees and said controller controls said processor to couple a consignee shipping address with said selected user entered data and data from said purchase order database to said printer for printing a shipping label in compliance with the requirements of said consignee.

7. A container packing verification and labeling system as recited in claim 6 wherein said display screen files include data identifying one of a plurality of print formats according to which a shipping label is to be printed for an associated consignee.

8. A container packing verification and labeling system for use on a computer having a processor, a memory, at least one input device operable by a user to enter data and commands to said computer, and a display, said memory storing data for a plurality of purchase orders from a plurality of consignees in at least one database, said system comprising:

a plurality of consignee specific data files accessible by said processor and associated with a plurality of consignees each requiring a different set of input data from a user to process a purchase order issued thereby, each data display screen file being associated with a consignee and including data representing information to be depicted on said display to prompt a user to enter only that data required by said associated consignee to process a purchase order issued thereby and said consignee specific data files including data associating particular user entered commands with a consignee specific purchase order processing operations; and a nonconsignee specific purchase order processing controller for controlling said processor to couple to the display prompt information for a specific consignee from an associated data file in response to user entered data including data representing the selection of said consignee, said controller controlling said processor in accordance with said consignee specific data file to collect in said memory data entered by a user in association with a purchase order and to compare selected user entered data to said associated purchase order data from said database to validate said user entered data; and said controller controlling said processor to couple selected user entered data and data from said purchase order database to said printer for printing said information on a record member, said system being updatable to allow the processing of a purchase order from a new consignee without altering said controller by adding consignee specific data accessible by said processor including at least one consignee specific data file associated with said consignee.

9. A container packing verification and labeling system as recited in claim 8 further including:

a plurality of consignee specific configuration files accessible by said processor said configuration files including information indicating how data entered by said user and in said purchase order database is to be selected and stored in an advance shipping notice data file associated with a purchase order from said specific consignee; and a nonconsignee specific advance shipping notice translator for controlling, in accordance with a consignee specific configuration file, said processor to store selected user entered data and data from said purchase order database in a particular manner in an advance shipping notice data file.

10. A container packing verification and labeling system as recited in claim 8 wherein said consignee specific data file associated with a first consignee includes data representing information identifying a first purchase order processing operation to be performed when a user enters a particular command, said identifying information being depicted on said display with the prompt information for said first consignee.

11. A container packing verification and labeling system as recited in claim 10 wherein said consignee specific data file associated with a second consignee includes data representing information identifying a second purchase order processing operation to be performed when a user enters said same particular command, said second purchase order processing operation being different from said first operation and said identifying information being depicted on said display with the prompt information for said second consignee.

12. A container packing verification and labeling system as recited in claim 8 wherein the prompt data in a consignee specific data file prompts a user to enter different information in each of a plurality of fields depicted on a display, said fields including at least one key field and at least one field associated with said key field and said purchase order processing controller controls said processor to be responsive to data entered by a user in a key field to search said database for data associated with said entered key field data and to automatically enter the associated data found in said search into said associated field or fields on said display.

13. A container packing verification and labeling system as recited in claim 8 wherein said computer is coupled to a printer for printing on a web of record members and wherein said system includes consignee specific data accessible by said processor and identifying shipping addresses for associated consignees and said controller controls said processor to couple a consignee shipping address with said selected user entered data and data from said purchase order database to said printer for printing a shipping label in compliance with the requirements of said consignee.

14. A container packing verification and labeling system as recited in claim 13 wherein said consignee specific display screen files include data identifying one of a plurality of print formats according to which a shipping label is to be printed for an associated consignee.

15. A purchase order processing system for use on a computer having a processor, a memory, at least one input device operable by a user to enter data and commands to said computer, and a display, said system comprising:
- a plurality of consignee specific data files respectively associated with a plurality of consignees, said files including for a specific consignee data representing information to be depicted on said display to prompt a user to enter only that data required by said specific consignee to process a purchase order therefrom and data associating each of a plurality of user entered commands with at least one of a plurality of functions to be carried out by said system to process purchase order information;
- a nonconsignee specific purchase order processing controller for controlling said processor to couple to said display said prompt information for a user selected consignee, said controller including a plurality of function subroutines each associated with one of said functions, said controller controlling said processor to be responsive to a user entered command to implement each function subroutine associated with said command, wherein the data in each of said consignee specific data files associating user entered commands with said functions defines the purchase order processing operation to be performed for each of said plurality of consignees, said operations varying from consignee to consignee.

16. A purchase order processing system as recited in claim 15 wherein said controller includes a function which when implemented by said processor accepts data entered by said user in response to prompts depicted on said display for storage in said memory in association with a specific consignee, said entered data including data representing items packed in a container by said user for a particular purchase order.

17. A purchase order processing system as recited in claim 16 wherein said computer is coupled to a printer for printing a label at least one of said consignee specific data files includes data identifying a print format for a label to be affixed to a container packed in response to a purchase order from, said specific consignee, said controller including a print function subroutine which when implemented by said processor for said specific consignee causes said processor to select accepted user entered data in accordance with said print format and couples said selected data to said printer for printing a label to be affixed to a container packed in response to a particular purchase order.

18. A purchase order processing system as recited in claim 17 wherein said print format represents a packing list label.

19. A purchase order processing system as recited in claim 17 wherein said system stores in said memory an address for said specific consignee and said print format represents a shipping label.

20. A purchase order processing system as recited in claim 17 wherein said print function subroutine when implemented by said processor causes said processor to generate barcode data, to associate said barcode data with said item data stored for said purchase order and to couple said barcode data to said printer for printing on said label.

21. A purchase order processing system as recited in claim 16 wherein said controller includes a function subroutine which when implemented by said processor for a particular purchase order validates said data representing items packed for said particular purchase order.

22. A purchase order processing system as recited in claim 21 wherein said processor operating in accordance with said controller is responsive to data that does not validate to couple to said display an indication that data did not validate.

23. A purchase order processing system as recited in claim 16 wherein said controller includes a function subroutine which when implemented by said processor for a particular purchase order removes from said memory item data previously accepted for storage.

24. A purchase order processing system as recited in claim 15 wherein said system is updatable to process a purchase order for a new consignee by adding to said system a consignee specific data file for said consignee and without requiring modifications to said purchase order controller.

25. A purchase order processing system as recited in claim 15 wherein the prompt data in a consignee specific data file prompts a user to enter different information in each of a plurality of fields depicted on a display, said fields including at least one key field and at least one field associated with said key field and said purchase order processing controller controls said processor to be responsive to data entered by a user in a key field to search said database for data associated with said entered key field data and to automatically enter the associated data found in said search into said associated field or fields on said display.

26. A purchase order processing system as recited in claim 15 wherein said computer further includes a communication interface for electronically receiving data for a plurality of purchase orders from a plurality of consignees to store data for each purchase order in a data file associated with the consignee issuing the purchase order and said system includes
- a plurality of consignee specific input configuration files accessible by said processor, said configuration files including information indicating how purchase order data stored in a data file for said specific consignee is to be interpreted;
- a nonconsignee specific purchase order translator for controlling, in accordance with a consignee specific input configuration file, said processor to store purchase order data from a data file in a predetermined manner in a purchase order database to allow said purchase order database to be accessed by said processor when operating in accordance with a nonconsignee specific purchase order processing controller.

27. A purchase order processing system as recited in claim 26 including:

a plurality of consignee specific output configuration files accessible by said processor said configuration files including information indicating how data entered by said user and in said purchase order database is to be selected and stored in an advance shipping notice data file associated with a purchase order from said specific consignee; and a nonconsignee specific advance shipping notice translator for controlling, in accordance with a consignee specific output configuration file, said processor to store selected user entered data and data from said purchase order database in a particular manner in an advance shipping notice data file.

* * * * *